US012199386B2

(12) United States Patent
Buck, III et al.

(10) Patent No.: US 12,199,386 B2
(45) Date of Patent: Jan. 14, 2025

(54) LOSSY MATERIAL FOR IMPROVED SIGNAL INTEGRITY

(71) Applicant: SAMTEC, INC., New Albany, IN (US)

(72) Inventors: Jonathan E. Buck, III, Hershey, PA (US); Brandon Thomas Gore, Lexington, SC (US); Yasuo Sasaki, Yokohama (JP); Julian J. Ferry, Dillsburg, PA (US)

(73) Assignee: SAMTEC, INC., New Albany, IN (US)

( * ) Notice: Subject to any disclaimer, the term of this patent is extended or adjusted under 35 U.S.C. 154(b) by 389 days.

(21) Appl. No.: 17/608,533

(22) PCT Filed: May 1, 2020

(86) PCT No.: PCT/US2020/031099

§ 371 (c)(1),
(2) Date: Nov. 3, 2021

(87) PCT Pub. No.: WO2020/227124

PCT Pub. Date: Nov. 12, 2020

(65) Prior Publication Data

US 2022/0224060 A1 Jul. 14, 2022

Related U.S. Application Data

(60) Provisional application No. 62/842,802, filed on May 3, 2019.

(51) Int. Cl.

| | |
|---|---|
| ***H01R 13/6599*** | (2011.01) |
| ***H01R 12/75*** | (2011.01) |
| ***H01R 13/6471*** | (2011.01) |
| ***H01R 13/6587*** | (2011.01) |

(52) U.S. Cl.

CPC ..... *H01R 13/6599* (2013.01); *H01R 13/6471* (2013.01); *H01R 13/6587* (2013.01); *H01R 12/75* (2013.01)

(58) Field of Classification Search

CPC ............ H01R 13/6599; H01R 13/6598; H01R 13/6587; H01R 13/6582; H01R 13/6581; H01R 13/658; H01R 13/6471; H01R 12/71; H01R 12/712; H01R 12/72; H01R 12/75

USPC ..................................................... 439/607.02

See application file for complete search history.

(56) References Cited

U.S. PATENT DOCUMENTS

| | | | |
|---|---|---|---|
| 2,996,710 | A | 8/1961 | Platt |
| 3,002,162 | A | 9/1961 | Garstang |
| 3,322,885 | A | 5/1967 | May et al. |
| 5,499,935 | A | 3/1996 | Powell |
| 6,786,771 | B2 | 9/2004 | Gailus |
| 8,007,316 | B2 | 8/2011 | Costello |

(Continued)

FOREIGN PATENT DOCUMENTS

| | | | |
|---|---|---|---|
| CN | 107123901 | A | 9/2017 |
| JP | 2000-353557 | A | 12/2000 |
| JP | 2007-141587 | A | 6/2007 |

*Primary Examiner* — Khiem M Nguyen
(74) *Attorney, Agent, or Firm* — BakerHostetler

(57) ABSTRACT

An electrical contact for an electrical connector includes a contact body and a lossy material located on the contact body. An electrical connector includes contacts with a lossy material located on the contact body. A method of applying a lossy material to a contact for an electrical connector includes providing a contact and applying the lossy material to the contact.

30 Claims, 39 Drawing Sheets

(56) References Cited

U.S. PATENT DOCUMENTS

| | | | | |
|---|---|---|---|---|
| 8,083,553 | B2 | 12/2011 | Manter et al. | |
| 8,272,877 | B2 | 9/2012 | Stokoe et al. | |
| 8,491,313 | B2 | 7/2013 | McNamara et al. | |
| 8,771,016 | B2 | 7/2014 | Atkinson et al. | |
| 9,004,942 | B2 | 4/2015 | Paniagua | |
| 9,219,335 | B2 | 12/2015 | Atkinson et al. | |
| 9,655,241 | B2 | 5/2017 | Ishida et al. | |
| 9,666,990 | B1 | 5/2017 | De et al. | |
| 9,705,255 | B2 | 7/2017 | Atkinson et al. | |
| 9,859,635 | B1 | 1/2018 | Pickel et al. | |
| 10,574,000 | B1 * | 2/2020 | McClinton ......... | H01R 13/6471 |
| 2003/0155143 | A1 | 8/2003 | Fujieda et al. | |
| 2009/0291593 | A1 | 11/2009 | Atkinson et al. | |
| 2010/0294530 | A1 | 11/2010 | Atkinson et al. | |
| 2011/0230095 | A1 | 9/2011 | Atkinson et al. | |
| 2012/0202387 | A1 | 8/2012 | McNamara | |
| 2013/0005192 | A1 | 1/2013 | Lim | |
| 2013/0188325 | A1 | 7/2013 | Garman et al. | |
| 2013/0252445 | A1 | 9/2013 | Barr | |
| 2014/0273629 | A1 | 9/2014 | Canning et al. | |
| 2014/0273671 | A1 | 9/2014 | Cohen | |
| 2015/0236451 | A1 | 8/2015 | Cartier, Jr. et al. | |
| 2016/0149343 | A1 | 5/2016 | Atkinson et al. | |
| 2016/0149361 | A1 | 5/2016 | Canning et al. | |
| 2016/0294121 | A1 | 10/2016 | Daughtry, Jr. et al. | |
| 2017/0047692 | A1 | 2/2017 | Cartier et al. | |
| 2018/0062324 | A1 | 3/2018 | Wu et al. | |
| 2019/0214773 | A1 * | 7/2019 | Orris .................... | H01R 13/514 |
| 2020/0006898 | A1 | 1/2020 | Yang et al. | |
| 2020/0083651 | A1 | 3/2020 | Howell et al. | |
| 2020/0259298 | A1 | 8/2020 | Tyrrell et al. | |
| 2021/0091496 | A1 * | 3/2021 | Cartier, Jr. ........... | H01R 12/714 |
| 2022/0224060 | A1 * | 7/2022 | Buck, III ........... | H01R 13/6599 |

* cited by examiner

LOSSY MATERIAL FOR IMPROVED SIGNAL INTEGRITY

CROSS-REFERENCE TO RELATED APPLICATIONS

This application is the National Stage Application of International Patent Application No. PCT/US2020/031099, filed May 1, 2020 which claims priority to U.S. Patent Application Ser. No. 62/842,802 filed May 3, 2019, the disclosure of each of which is hereby incorporated by reference as if set forth in its entirety herein.

BACKGROUND

1. Field of the Invention

The present invention relates to connectors, connector assemblies, and cable assemblies. More specifically, the present invention relates to manipulating resonance characteristics of connectors and connector assemblies.

2. Description of the Related Art

Electrical connectors typically include an electrically insulative connector housing and a plurality of electrical contacts supported by the connector housing. The electrical contacts typically define mounting ends and mating ends opposite the mounting ends. The mounting ends are often configured to be mounted to a first complementary electrical device, such as a printed circuit board (PCB), electrical cable, or the like. The mating ends can be configured to mate with a second complementary electrical device, such as a complementary electrical connector. Often, the mating ends define a separable interface with complementary electrical contacts of the complementary electrical connector. In some configurations, the electrical contacts can be configured as electrical power contacts that are configured to transmit electrical power between the first and second electrical devices. In other configurations, some of the electrical contacts can be preassigned as electrical contacts, while others of the electrical contacts can be preassigned as ground contacts. Thus, during operation, the electrical connector can transmit electrical signals along the electrical signal contacts between the first and second complementary electrical devices.

One significant consideration when designing electrical connectors is the ability of the electrical connectors to transmit signals at a desired operating frequency while maintaining the integrity of the electrical signals that can be degraded during operation. In some applications, the desired operating frequency is as high possible while mitigating the signal degradation that tends to occur increasingly at high operating frequencies. In other applications, the desired operating frequency is within a range that has a suitable speed for its application and intended to minimize signal degradation. Electrical signal degradation is known to manifest itself in several ways, including crosstalk such as near end crosstalk (NEXT), far end crosstalk (FEXT), insertion loss, skew, common mode issues, stubs on connector contacts and in the PCB, half-wavelength horizontal propagation or resonances, and quarter-wavelength horizontal propagation or resonances; cavity resonances between ground planes on two PCBs, and impedance mismatches within the electrical connector, between the electrical connector and the PCB, and in the breakout region near a connector.

FIG. 1 shows the insertion loss of a conventional connector as a function of operating frequency. Insertion loss of the connector increases at the connector's resonant frequencies. This is a typical resonance characteristic of some connectors. Insertion-loss resonances have many causes, including impedance mismatches within a connector, between a connector and a printed circuit board (PCB), and in the breakout region near a connector; skew/common mode issues; stubs on connector contacts and in the PCB; crosstalk; half- and quarter-wavelength horizontal propagation or resonances; and cavity resonances between ground planes on two PCBs. Design efforts for electrical connectors are ongoing.

U.S. Pat. No. 8,083,553 describes electrically lossy inserts disposed in a wafer for an electrical connector, and positioned near the mating interface of the electrical connector. The electrically lossy inserts are electrically connected to a shield member in the wafer. The lossy inserts are not connected to the electrical contacts of the electrical connector.

U.S. Pat. No. 8,007,316 describes a contact assembly that uses a dielectric material between a conductive body and a conductive layer such that the dielectric material, the conductive body, and the conductive layer form a capacitive element. U.S. Pat. No. 8,007,316 does not disclose a lossy material in the contact assembly.

It is also known to incorporate ceramic ferrites to control unwanted electromagnetic interference (EMI) and unwanted resonances in an electrical connector. However, ceramic ferrites can be difficult to process and can have loose mechanical tolerances so that their application in connectors and cable assemblies is often crude.

SUMMARY

To overcome the problems described above, preferred embodiments of the present invention use lossy materials to modify resonance characteristics of an electrical connector, a connector assembly, or a cable assembly.

In one example, an electrical contact for an electrical connector can include includes a contact body and a lossy material located on the contact body.

The lossy material can be electrically conductive or electrically non-conductive. In one example, the lossy material is electrically non-conductive. Further, the lossy material can be magnetically absorptive. In one example, the lossy material can include carbon microcoils. In one example, the lossy material can be configured to absorb electromagnetic interference substantially at a first predetermined operating frequency, ±5 GHz. The lossy material z electrically lossy or magnetically lossy. The lossy material can be disposed on a tip of the contact body. Alternatively or additionally, the lossy material can be disposed on a base of the contact body. The base can extend from a first end of an intermediate portion of the contact body toward the mounting end of the electrical contact. In some examples, the base can be at least partially defined or entirely defined by the mounting end. The tip can be disposed such that the intermediate portion is disposed between the tip and the mounting end. The mating end can extend from a second end of the intermediate portion opposite the first end, and the tip can define the distal end of the electrical contact. In some examples, the tip can be at least partially defined or entirely defined by the mating end. The electrical contact can be configured as an electrical ground contact that that can be configured for connection to ground, reference, or power. Alternatively, the electrical contact can be configured as a signal contact that transports electrical signals. The lossy material can be tuned to reduce electrical interference at a predetermined operating frequency. In some examples, the lossy material can be located on only one side of the contact body.

An electrical connector can thus include electrical contacts according to examples set forth herein.

For instance, a first electrical contact of the electrical connector can include a lossy material tuned substantially to a first frequency, and a second electrical contact of the electrical connector can include a lossy material tuned substantially to a second frequency that is different than the first frequency. In one example, the lossy material can be included at the respective mating ends of the first and second electrical contacts. The lossy material can be disposed on the tip of the contact body. Alternatively or additionally, the lossy material can be disposed on the base of the contact body. In one example, the first and second electrical contacts can be configured as electrical signal contacts. In this regard, in one example, the lossy material can be disposed only on electrical signal contacts of the electrical connector. Alternatively, the first and second electrical contacts can be configured as electrical ground contacts. In this regard, in one example, the lossy material can be disposed only on ground contacts of the electrical connector. In still other examples, the electrical contacts can be unassigned as signal contacts or ground contacts.

In still other examples, an electrical contact reel can include electrical contacts according to various examples disclosed herein.

According to a preferred embodiment of the present invention, a method of applying a lossy material to a contact for an electrical connector includes providing a contact and applying the lossy material to the contact.

The lossy material can be electrically conductive or non-conductive. The lossy material can be non-conductive and can be magnetically absorptive substantially at a first frequency, ±5 GHz. The lossy material can include carbon microcoils. The lossy material can be electrically lossy or magnetically lossy. The lossy material can be applied to the tip of the electrical contact. Alternatively, the lossy material can be applied to the base of the electrical contact. In one example, the lossy material is applied to only one side of the contact, such as opposite to a wiping surface of the electrical contact at the mating end of the electrical contact.

Providing an electrical contact can include the step of stamping the electrical contact from a metal sheet. The contact can be included in a reel of contacts. The contact can be connected to a ground or can transport electrical signals. Applying the lossy material can include cutting a sheet of lossy material, and moving the electrical contact into physical contact with the cut sheet such that the lossy material is adhered to the electrical contact. The lossy material can be applied to the electrical contact at the mating end of the electrical contact. The lossy material can be tuned substantially to a specific frequency. The lossy material applied to a first electrical contact can be tuned substantially to a first frequency, and the lossy material applied to a second electrical contact can be tuned substantially to a second frequency different than the first frequency. Lossy material can be applied only to electrical contacts that transport electrical signals in one example. Alternatively, lossy material can be applied only to electrical ground contacts that are connected to ground or configured to be connected to ground.

According to a preferred embodiment of the present invention, an electrical connector includes a connector housing and electrical contacts. In one example, the electrical contacts can be supported directly by the connector housing. In another example, the electrical contacts can be supported indirectly by the connector housing. For instance, the electrical contacts can be supported by a respective leadframe housing that, in turn, is supported by the connector housing. The connector housing can include lossy material adjacent to at least one of the electrical contacts in one example.

The lossy material can be located near or at a tip of the at least one electrical contact. In one example, the lossy material can be located at the tip of the at least one electrical contact. Alternatively or additionally, the lossy material can be located on the base of the at least one electrical contact. The lossy material can be electrically conductive or electrically non-conductive. In one example, the lossy material can be electrically non-conductive. Further, the lossy material can be configured to be magnetically absorptive substantially at a first frequency, ±5 GHz. In one example, the lossy material can include carbon microcoils. The lossy material can be electrically lossy or magnetically lossy. The lossy material can be tuned to reduce signal degradation when the electrical signals are transmitted substantially at a specific predetermined operating frequency, ±5 GHz. For instance, the lossy material can be tuned to reduce a maximum amount of signal degradation when electrical signals are transmitted substantially at the specific predetermined operating frequency, ±5 GHz.

BRIEF DESCRIPTION OF THE DRAWINGS

The foregoing summary, as well as the following detailed description of illustrative embodiments of the intervertebral implant of the present application, will be better understood when read in conjunction with the appended drawings. For the purposes of examples of the present disclosure, there is shown in the drawings illustrative embodiments. It should be understood, however, that the application is not limited to the precise arrangements and instrumentalities shown. In the drawings.

DETAILED DESCRIPTION

Figure 1:
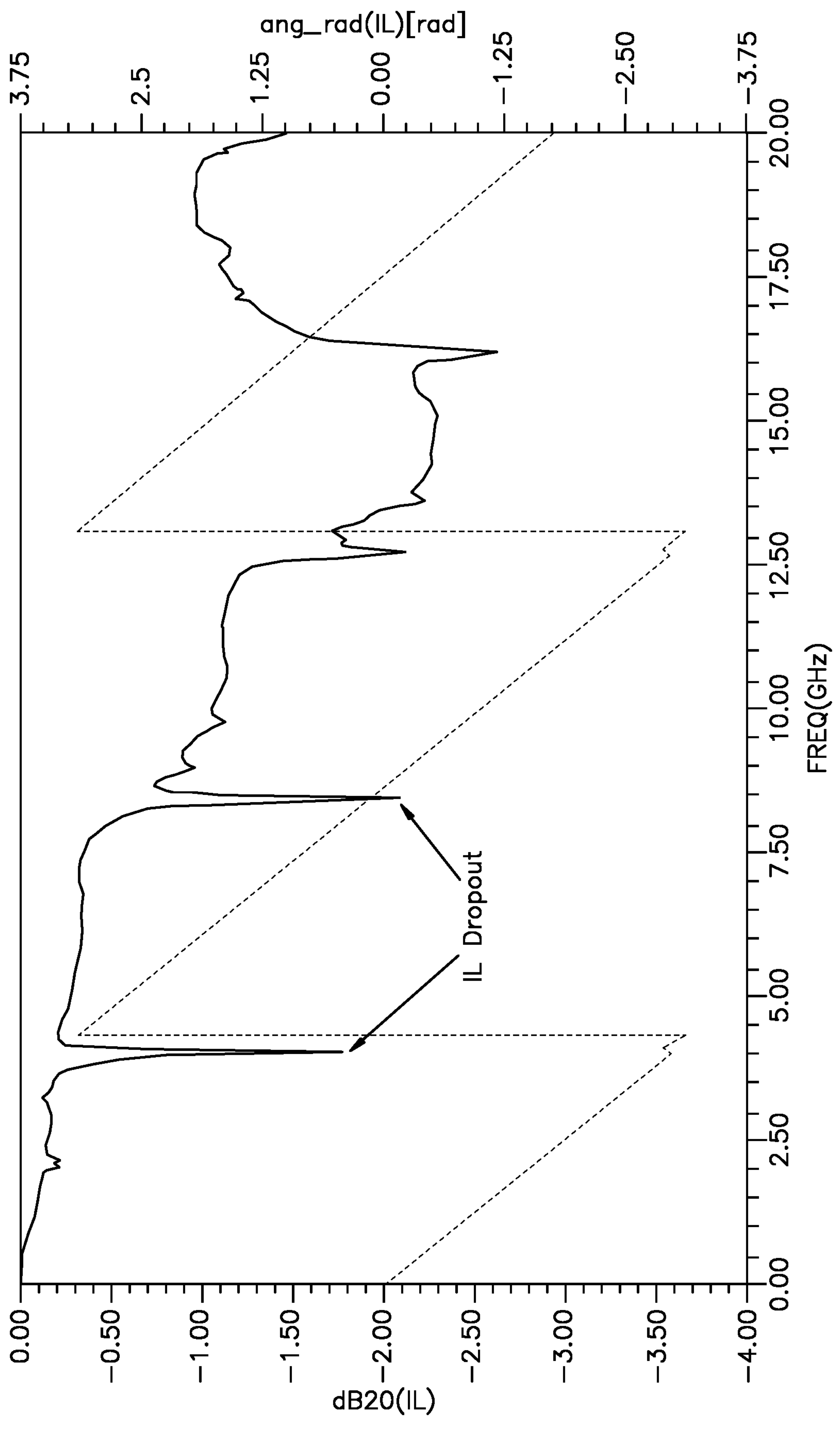
Fig.1 PRIOR ART
FIG. 1 is a graph plotting insertion loss as a function of operating frequency of a conventional electrical connector.

The present disclosure can be understood more readily by reference to the following detailed description taken in connection with the accompanying figures and examples, which form a part of this disclosure. It is to be understood that this disclosure is not limited to the specific devices, methods, applications, conditions or parameters described and/or shown herein, and that the terminology used herein is for the purpose of describing particular embodiments by way of example only and is not intended to be limiting of the scope of the present disclosure. Also, as used in the specification including the appended claims, the singular forms "a," "an," and "the" include "at least one" and a plurality. Further, reference to a plurality as used in the specification including the appended claims includes the singular "a," "an," "one," and "the," and further includes "at least one." Further still, reference to a particular numerical value in the specification including the appended claims includes at least that particular value, unless the context clearly dictates otherwise.

The term "plurality", as used herein, means more than one. When a range of values is expressed, another example includes from the one particular value and/or to the other particular value. Similarly, when values are expressed as approximations, by use of the antecedent "about," it will be understood that the particular value forms another example. All ranges are inclusive and combinable.

Lossy materials can be used to change the resonance characteristics of a connector, a connector assembly, a cable assembly, or a data communication assembly that includes any one or more of the above. In general, a material's electrical and magnetic properties can be defined by permittivity $\varepsilon$ and permeability which are both frequency dependent. Permittivity $\varepsilon$ and permeability $\mu$ are complex numbers:

$$\varepsilon = \varepsilon' - \varepsilon''$$

$$\mu = \mu' - \mu''$$

where the real part (') is related to energy storage and the imaginary part ('') is related to energy loss. Lossy materials can be chosen to have specific permittivity $\varepsilon$ and permeability Dopants can be added to a base material to alter the permittivity $\varepsilon$ and permeability $\mu$. Dopants can alter the magnitudes of the permittivity $\varepsilon$ and permeability $\mu$ of the lossy materials, and thus can selectively increase or decrease the dampening effect of the lossy materials at a given operating frequency of the electrical signals. Thus, the dopants can alter the frequency dependency of the lossy materials, and can shift or tune the frequency at which the lossy material is configured to provide electrical shielding. For instance, the lossy material can be configured to absorb electromagnetic interference (EMI) during operation of the electrical connector. By tuning the frequency dependency of the lossy material, the lossy material can function best to provide electrical shielding or absorption at a predetermined specific frequency or range of frequencies, while allowing energy of different frequencies to pass.

Figure 2:
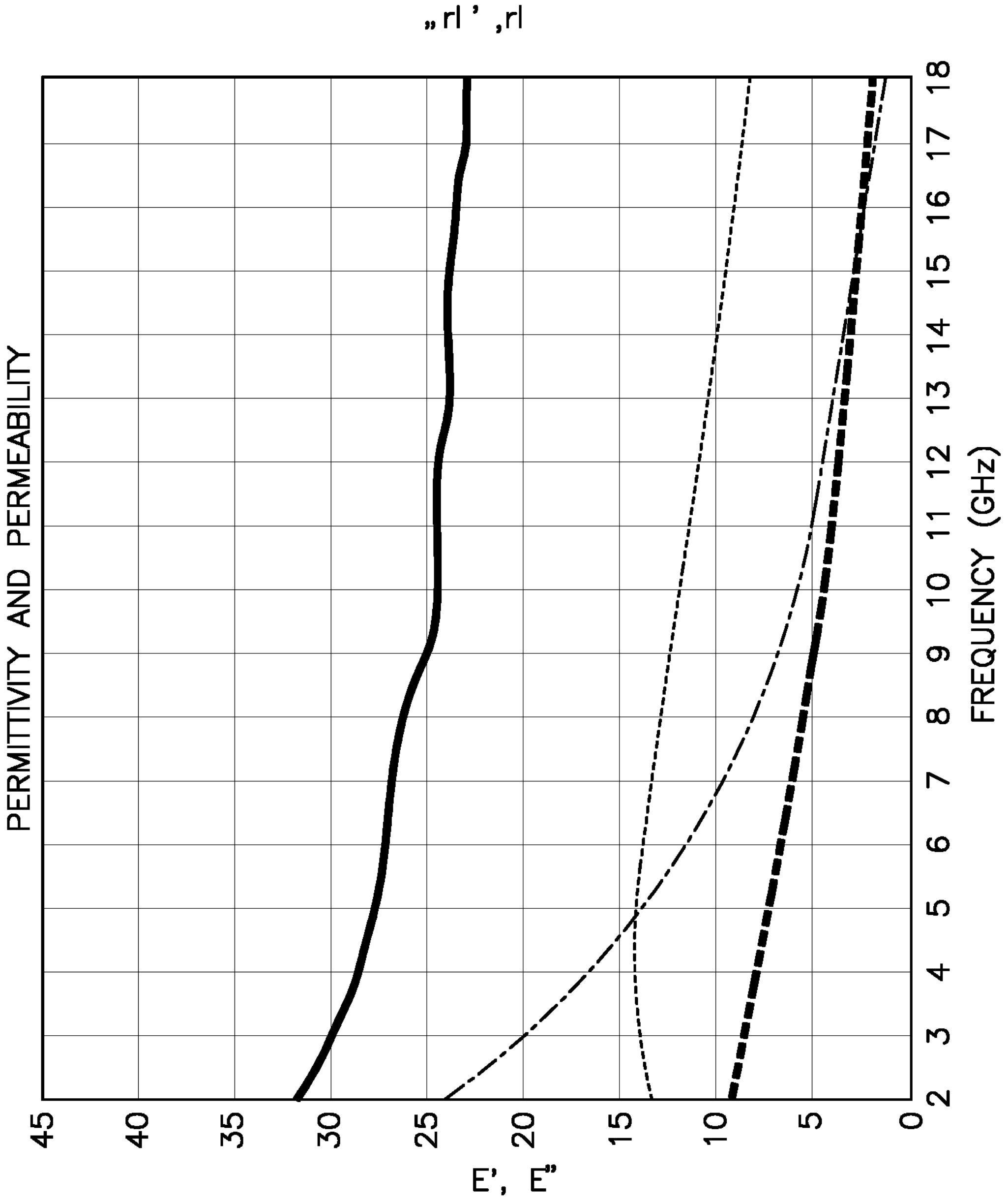
FIG. 2 is a graph that plots permittivity and permeability as a function of operating frequency for an electrical connector that includes a lossy material.

The lossy material can be electrically lossy. Alternatively or additionally, the lossy material can be magnetically lossy. Electrically lossy materials can have good broad-band performance over wide frequency ranges, are often electrically conductive (for instance can be made from carbon), can be easy to simulate, and are available as off-the-shelf moldable materials that can be used in static control and plating. Magnetically lossy materials can have a tunable frequency performance. Further, magnetically lossy materials can have greater volumetric efficiency than electrically lossy materials. Thus, a reduced quantity of lossy magnetic material than electrically lossy material can provide a similar effect to that of the electrically lossy material. Further, magnetically lossy materials can be electrically conductive or electrically non-conductive. Conventional magnetically lossy materials are available as crude molded parts and are more complex to simulate. FIG. 2 is a graph that plots permittivity and permeability as a function of frequency for a typical lossy material. Different lossy materials, of course, will have different plots.

Lossy materials are available in many forms. Lossy materials can be injection moldable. For example, the lossy material can be included in an injection moldable resin that acts a binder for the lossy material. The resin with the lossy material can then be injection molded. Lossy materials can also be dispensable such as epoxies and urethanes. If the lossy material is dispensable, then the lossy materials can be applied to a connector after the connector housing is formed, which is typically formed by injection molding. The lossy material can be applied while the injected-molded housing dries, which is usually is a time during which no additional manufacturing steps can be performed until the housing reaches a certain dryness. The connector housing can be dried using ultra-violet light (UV) or using heat. It is also possible to use a two-phase injection molding process in which the first phase uses an injection molding material without a lossy material and the second phase uses an injection molding material with a lossy material. For example, a first phase can form a housing by injection molding using a material without a lossy material, and in a second phase material with a lossy material can be injection molded to the housing.

As an example, the lossy material can include carbon microcoils (CMCs). The CMCs can include various sizes and shapes, and different types of CMCs can be used together. For example, the CMCs can include a spiral shape with a coil diameter on the order of a micron, a fiber diameter of about 0.01 μm-about 1.0 μm, a coil pitch of about 0.1 μm-about 5.0 μm, and an overall length of about 10 μm-about 10 mm. The spirals can be left handed and/or right handed. The CMCs can have a single-helix structure or a double-helix structure. The fibers of the coils can have a flat shape or a round shape. The coils of the CMCs can be three dimensional. Alternatively, the coils of CMCs can be two dimensional, and thus defined in a single plane. The CMCs can be made by any suitable method, including using different catalysts grains to grow the coils.

In some examples, the lossy material can include CMCs embedded in a dielectric material. For example, the CMCs can be included in a silicon rubber structure. The silicon rubber structure can be configured as a sheet. It is appreciated, however, that other dielectric materials can be used, such as LCP (liquid crystal polymer) or glass reinforced LCP. When the CMCs are mixed with the dielectric material, the CMCs can form a L-C-R circuit network, whereby "L" represents an inductor, "C" represents a capacitor, and "R" represents a resistor. The CMCs and the dielectric material can be used to absorb a portion of the magnetic field produced during operation of an electrical connector. A characteristic of the CMCs in the dielectric material, such as at least one or more up to all of concentration, size, shape, and geometry of the CMCs in the dielectric material can be changed to tune the magnetic absorbing characteristics of the lossy material, including the wavelength (frequency) at which the lossy material is configured to absorb the magnetic field. For example, changing the coil diameter or coil length can tune the frequency at which the lossy material absorbs the magnetic field. Alternatively or additionally, changing the dielectric constant (DK) of the dielectric material of the lossy material can change the frequency at which the lossy material absorbs the magnetic field.

In other examples, the lossy material can be configured as a polymer and a plurality of nanoparticles embedded in the polymer. The polymer can be configured as ethylene tetrafluoroethylene (ETFE) in one example, or any suitable alternative polymer. The particles can be iron in one example, or any alternative material suitable for such that the resulting lossy material is configured to absorb magnetic field at a frequency. The iron particles can be present in a range of approximately 20% to approximately 45% by weight, such as approximately 40% by volume, such that the resulting lossy material is electrically nonconductive. However, it is envisioned that the lossy material can alternatively have a sufficient quantity of iron particles such that the lossy material is electrically conductive. The lossy material can further include graphene embedded in the polymer if desired to increase the electrical conductivity of the lossy material. The iron particles can be iron spheres in one example. For instance all particles can be iron. As an alternative to iron, the lossy material can include ceramic particles embedded in polymer at any desired concentration to produce an electrically nonconductive lossy material. At least one of the size, quantity, shape, and composition of the particles embedded in the polymer can be changed so as to tune the frequency at which the lossy material absorbs the magnetic field.

Some electrical connectors include electrically conductive shields to provide electrical shielding between adjacent signal contacts or differential signal pairs. However, such electrically conductive shields typically function by containing electrical fields and directing electrical currents. Thus, such electrically conductive shields are typically ineffective against magnetic fields, can become a source of resonances at some frequencies, and usually work best when grounded. Lossy materials can be electrically conductive or electrically non-conductive. Further, lossy materials function by containing or absorbing fields and by reflecting and/or dissipating energy internally. Thus, lossy materials can provide shielding with respect to magnetic fields. For instance, lossy material can be configured to absorb magnetic fields. Further, the lossy material can be grounded in some examples. In other examples, the lossy material can be ungrounded.

Figure 3:
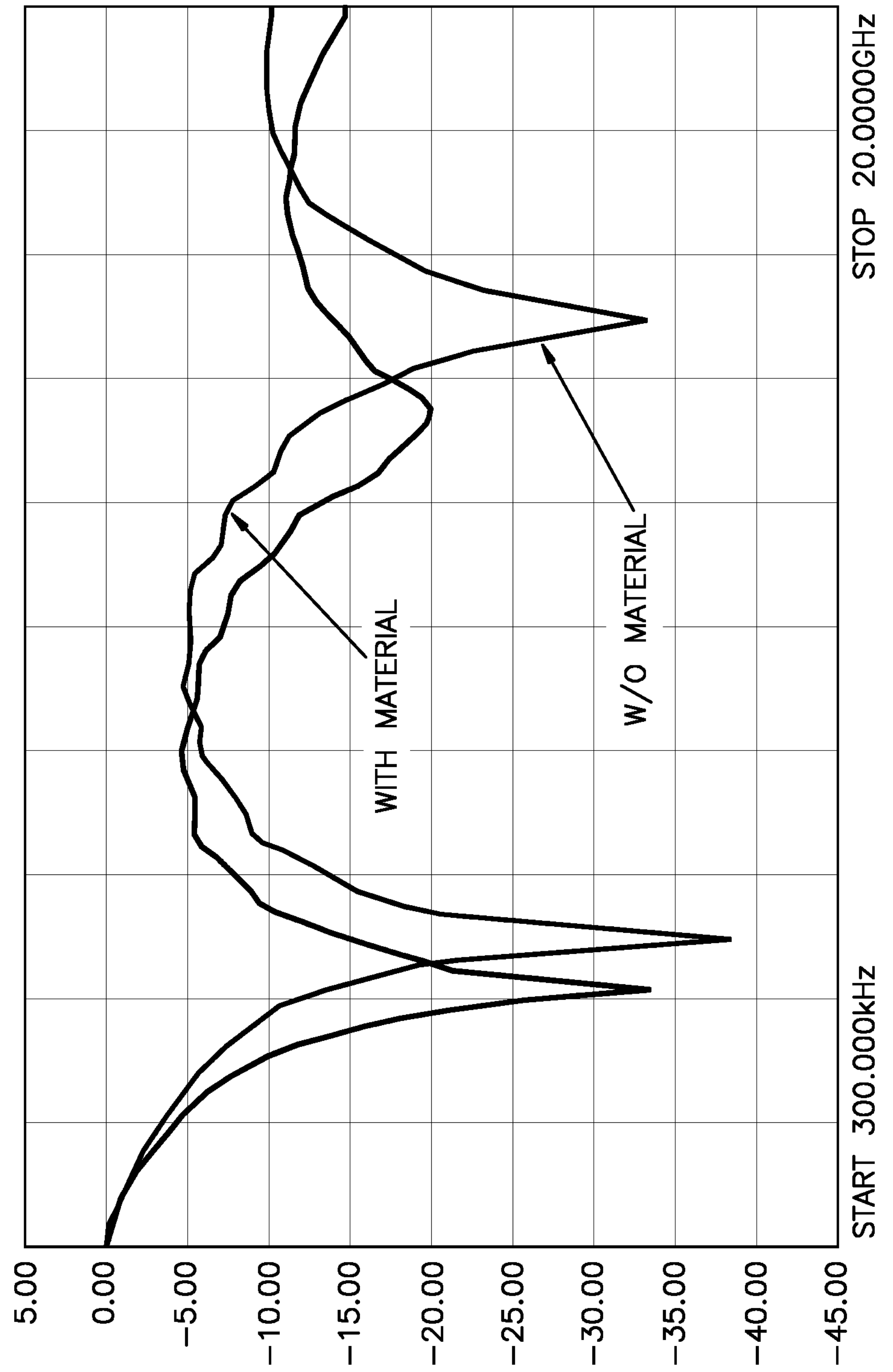
FIG. 3 is a graph that plots insertion loss as a function of operating frequency both with and without lossy material in accordance with the present disclosure.
Figure 4:
FIG. 4 is a graph that plots insertion loss as a function of operating frequency both with and without lossy material in accordance with another aspect the present disclosure.

Lossy materials can be applied to different portions or locations of an electrical connector to alter the electrical connector's resonance characteristics. For example, the addition of a lossy material can shift resonant frequency and/or can reduce the resonant peaks as shown in FIGS. 3 and 4. In FIG. 3, a hot melt, which has a narrow frequency band, is used as the lossy material (identified as "material" in FIG. 3). In FIG. 4, a rubberized sheet, which has a wide frequency band, is used as the lossy material (identified as "material" in FIG. 4). The lossy material can shift the resonant frequency to a frequency that is out of the desired operating frequency range of the electrical connector.

In some examples, and in all examples described herein, the lossy material can be an epoxy. For instance, the epoxy can be an electrically conductive epoxy. Further, the lossy material can be applied to different locations of an electrical connector. In some examples, the lossy material can be dispensed using computer numerical control (CNC). Thus, the application of the lossy material can be easily and quickly customized, thereby applying the epoxy at predetermined locations of the electrical connector, or components configured to be included in the electrical connector, including one or more of a connector housing, one or more electrical contacts, and a leadframe housing.

Figure 5:
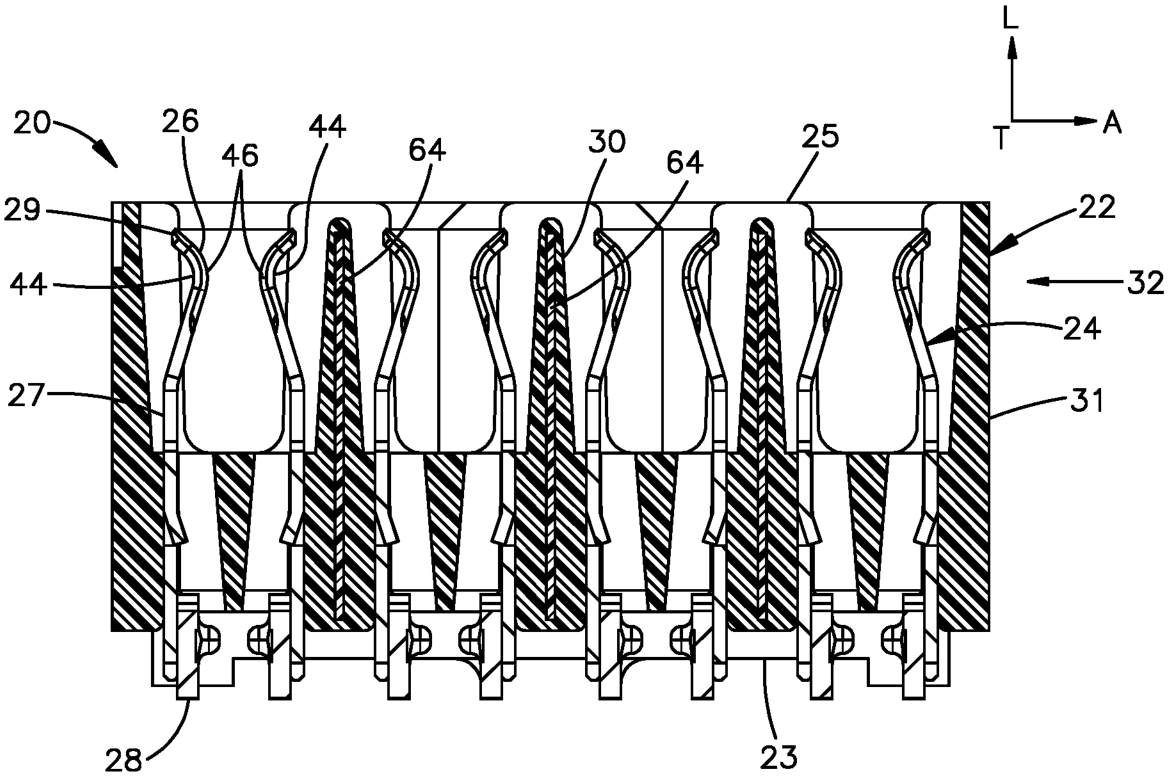
FIG. 5 is a cross-sectional view of an electrical connector with a lossy material vertically oriented in one example.

Referring now to FIG. 5, an electrical connector 20 can include an electrically insulative connector housing 22 and a plurality of electrical contacts 24 that are supported by the connector housing 22. In one example, the electrical contacts 24 can be press-fit or otherwise mechanically attached to the connector housing 22. Alternatively, the electrical contacts 24 can be insert molded in the connector housing 22. Each of the electrical contacts 24 can include a contact body that defines a mating end 26 and a mounting end 28 opposite the mating end 26. Each of the contact bodies, and thus the electrical contacts 24 can further include an intermediate portion 27 that extends from the mating end 26 to the mounting end 28. Thus, the mounting end 28 can extend from a first end of the intermediate portion 27, and the mating end 26 can extend from a second end of the intermediate portion 27 opposite the first end. The contact bodies, and thus the electrical contacts 24, can further define a tip 29 that defines a distal end of contact body. The tip 29 can extend out from the mating end 26, such that the mating end 26 is disposed between the intermediate portion of the contact and the tip 29. The mounting ends 28 can be configured to be mounted to a first electrical device, which can be configured as a substrate. The substrate, in turn, can be configured as a printed circuit board in some examples. Thus, the connector housing 22 can define a mounting interface 23 that is configured to face the underlying substrate when the electrical connector 20 is mounted to the underlying substrate.

The mating ends 26 can be configured to mate with respective electrical contacts of a second electrical connector when the electrical connector 20 is mated with the second electrical connector. In particular, the electrical connector 20 can mate with the second electrical connector along a mating direction. The mating ends 26 can define a separable interface with the respective electrical contacts of the second electrical connector. Thus, the electrical connector 20 can unmate from the second electrical connector along an unmating direction that is opposite the mating direction. Both the mating direction and the unmating direction can be oriented along a longitudinal direction L.

The electrical contacts 24 can be arranged along a row 32, which can be oriented along a lateral direction A that is perpendicular with respect to the longitudinal direction L. The connector housing 22 can include divider walls 30 disposed between the mating ends 26 of adjacent pairs of electrical contacts 24. The pairs of electrical contacts 24 can define differential signal pairs in one example. Alternatively, the electrical signal contacts can be single ended. In this regard, the divider walls 30 can be disposed between adjacent electrical contacts 24, or disposed between any number of adjacent electrical contacts 24 as desired. Thus, it can be said that the divider walls 30 can be disposed between at least first and second electrical contacts 24 of the electrical connector 20. The electrical contacts 24 can be configured as signal contacts. Alternatively, one or more of the electrical contacts 24 can be configured as ground contacts. Alternatively still, the electrical connector 20 can be devoid of ground contacts. The connector housing 22 can further extend along a transverse direction T that is perpendicular with respect to each of the longitudinal direction and the lateral direction A. In some examples, the electrical contacts 24 can be arranged in multiple rows 32 that are spaced from each other along the transverse direction T that is perpendicular with respect to each of the longitudinal direction and the lateral direction A.

The connector housing 22 can define a mating interface 25 that is typically either received in or received by a complementary mating interface of the second electrical connector when the electrical connector 20 is mated with the second electrical connector. In this regard, an electrical connector assembly can include the electrical connector 20, which can be referred to as a first electrical connector, and the second electrical connector. The electrical connector 20 can be mounted to the underlying substrate so as to define a data communication assembly. When the electrical connector is mounted to the underlying substrate and mated with the second electrical connector, the electrical connector 20 can place the substrate and the second electrical connector in data communication with each other. Thus, the electrical contacts 24 can transmit signals between the substrate and the second electrical connector at an operating frequency.

The mating ends 26 and mounting ends 28 can be disposed opposite each other along the longitudinal direction L and oriented along the longitudinal direction L. Thus, the electrical contacts 24 can be referred to as vertical contacts, and the electrical connector 20 can be referred to as a vertical electrical connector. Alternatively, the mating ends 26 and mounting ends 28 can be oriented perpendicular to each other, such that the electrical contacts 24 define right-angle contacts, and the electrical connector 20 can be referred to as a right-angle electrical connector as described in more detail below with respect to FIGS. 8A-9F.

As illustrated in FIG. 5, the electrical connector 20 can include a lossy material 64 that is tuned to absorb magnetic field substantially at the operating frequency of the electrical connector 20. The word "substantially" with respect to frequency includes the stated frequency along with frequencies within five GHz above the stated frequency and five GHz below the stated frequency (+/−5 GHz). In one example, the connector housing 22 can include the lossy material 64. In particular, the connector housing 22 can include a housing body 31 and the lossy material 64 carried by the housing body 31. In particular, the lossy material 64 can be embedded in the housing body 31. Alternatively or additionally, the lossy material 64 can be disposed on an outer surface of the housing body 31. The lossy material 64 can be magnetically absorbing. In one example, the lossy material 64 can be electrically conductive. For instance, the lossy material 64 can have an electrical conductivity greater than 1 Siemens per meter up to substantially 6.1 times 10ˆ7. Alternatively, the lossy material 64 can be electrically non-conductive. For instance, the lossy material 64 can have an electrical conductivity that ranges from 1 Siemens per meter to substantially 1 times 10ˆ−17.

The housing body 31 of the connector housing 22 can be electrically insulative, can support the electrical contacts 24, and can define the mounting interface 23 and the mating interface 25. The housing body 31, and thus the connector housing 22, can support the electrical contacts directly. Alternatively, as will be described in more detail below, the housing body 31, and thus the connector housing 22, can support the electrical contacts indirectly. For instance, the housing body 31 can support at least one leadframe assembly that, in turn, includes at least some or all of the electrical contacts 24.

For instance, as illustrated in FIG. 5, the lossy material 64 can be disposed on at least one of the divider walls, including a plurality up to an entirety of the divider walls 30. In one example, the lossy material 64 can be embedded in the at least one divider wall 30. Thus, the lossy material 64 can be disposed between adjacent pairs of electrical contacts 24 in the manner described above. The lossy material 64 can be configured as an insert, or a coating one example. Alternatively, the lossy material 64 can be insert molded in the divider walls 30. The lossy material 64 can be oriented along the longitudinal direction L and the transverse direction T. The lossy material 64 can have a largest dimension in the longitudinal direction L. The longitudinal direction L can be oriented perpendicular to the mounting interface 23 of the connector housing 22. It should be appreciated, of course, that the lossy material 64 can be sized and shaped in any suitable alternative manner as desired. Alternatively, connector housing 22 can have at least one void defined therein, and the lossy material 64 can be inserted into the at least one void. The at least one void can be a single void or a plurality of voids as desired. Alternatively or additionally, the lossy material 64 can be applied to one or both outer surfaces of the divider walls 30 that face a respective one of the electrical contacts 24.

The lossy material 64 can be aligned with at least a portion of the electrical contacts 24 along the lateral direction A. Thus, a straight line that passes through the at least a portion of the electrical contacts 24 also passes through the lossy material 64. The at least a portion of the electrical contacts 24 can include the mating ends 26. Alternatively or additionally, the at least a portion of the electrical contacts 24 can include the tips 29. Thus, the lossy material 64 can be disposed at the tips 29. In one example, the lossy material 64 can be disposed only at the tips 29. Alternatively or additionally still, the at least a portion of the electrical contacts 24 can include at least a portion of the intermediate portion 27, such as an entirety of the intermediate portion 27. The lossy material 64 can be disposed at the tips of the signal contacts. Alternatively or additionally, the lossy material 64 can be disposed at the tips of the ground contacts. The lossy material can span a majority of the height of the divider walls 30 along the longitudinal direction L. The lossy material at each of the divider walls 30 can be aligned with each other along the lateral direction A.

Figure 6:
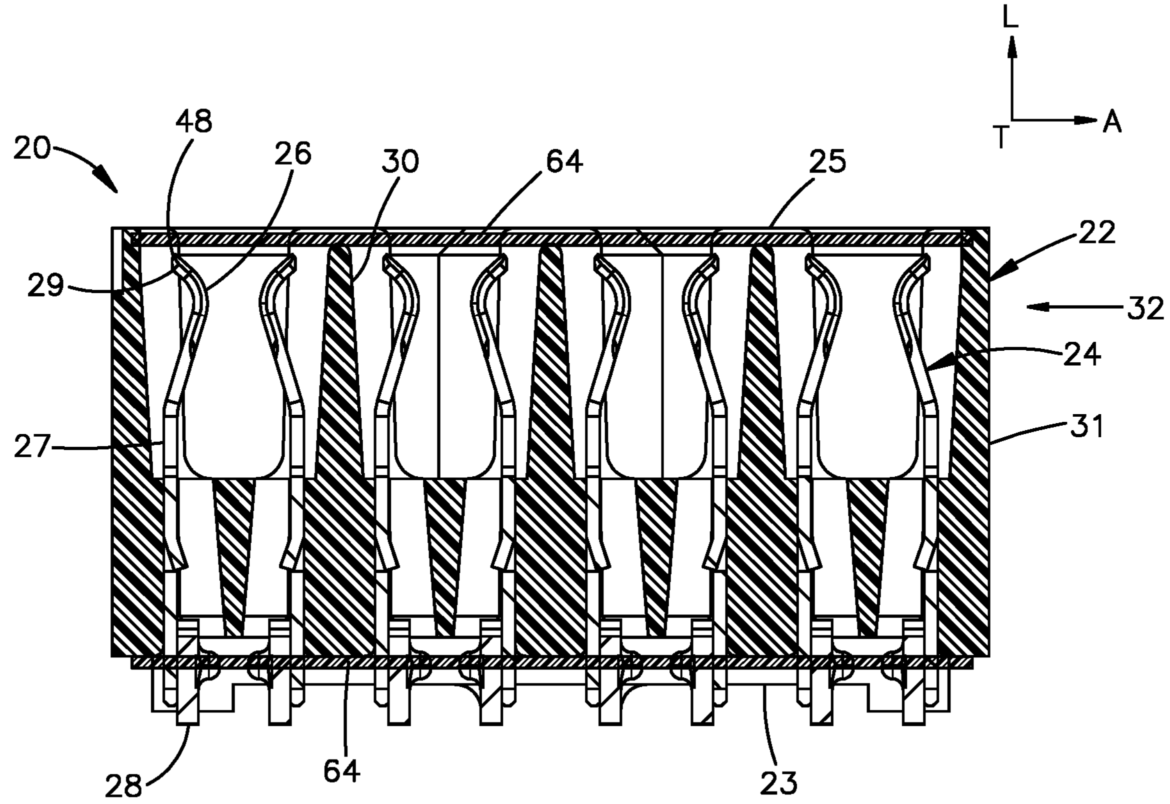
FIG. 6 is a cross-sectional view of the electrical connector illustrated in FIG. 5, but showing the lossy material horizontally oriented in another example.

Referring now to FIG. 6, the lossy material 64 can alternatively or additionally be applied to the connector housing 22 at other locations of the connector housing. For instance, the lossy material 64 can be disposed on one or both of the mounting interface 23 and the mating interface 25. In particular, the lossy material 64 can have a longest dimension that is parallel to the mounting interface 23. Thus, the lossy material 64 can have a longest dimension that is parallel to the underlying substrate when the electrical connector 20 is mounted to the underlying substrate. mounting interface 23. The lossy material 64 can be configured as a plate that is oriented in the lateral direction A and the transverse direction T. In one example, the lossy material 64 can be embedded in one or both of the mounting interface 23 and the mating interface 25. For instance, the lossy material 64 can be insert molded in one or both of the mounting interface 23 and the mating interface 25. Alternatively, the lossy material 64 can be molded so as to define the connector housing 22. Thus an entirety of the connector housing 22 can comprise the lossy material 64. Alternatively, the lossy material 64 can be applied to an external surface of one or both of the mounting interface 23 and the mating interface 25.

Figure 7:
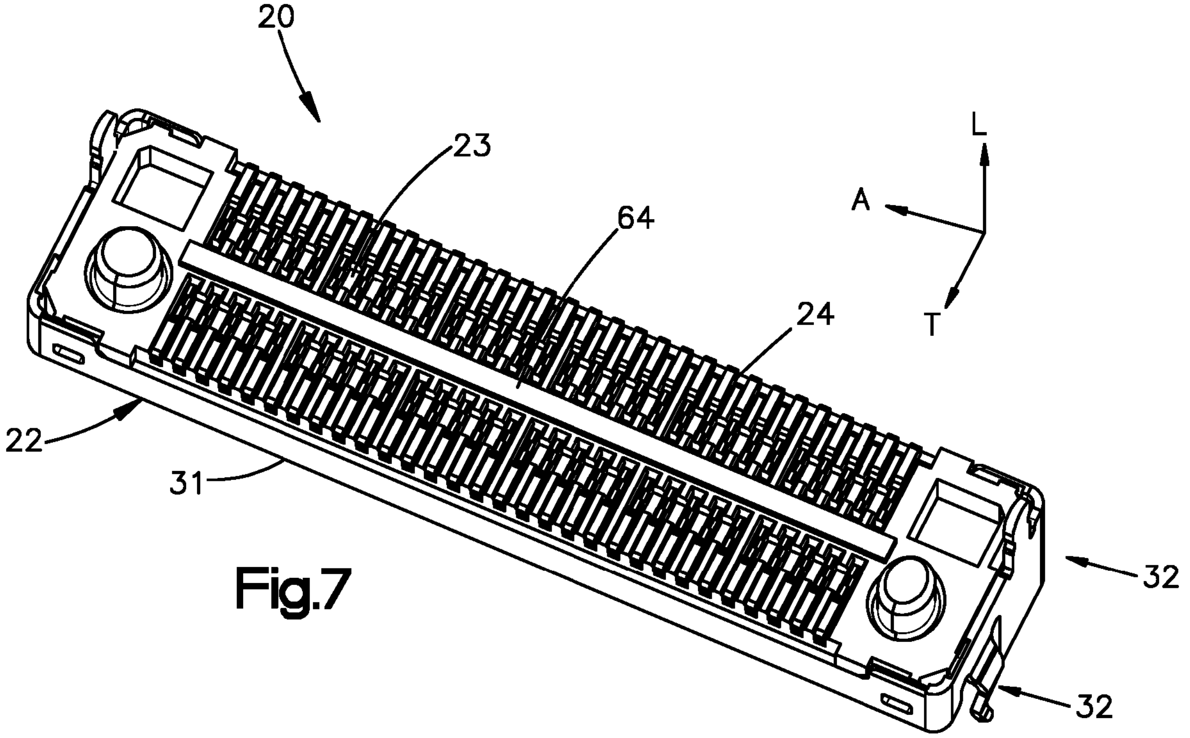
FIG. 7 is a perspective view of an electrical connector including lossy material disposed along a mounting interface of a connector housing of the electrical connector one example.

For instance, referring now to FIG. 7, the lossy material 64 can be disposed on the mounting interface 23 of the connector housing 22. In particular, the lossy material 64 can be applied to an outer surface of the connector housing 22 at the mounting interface 23. Thus, the lossy material 64 can be on a surface of the connector housing 22 that is configured to face the underlying substrate when the electrical connector 20 is mounted to the underlying substrate. Accordingly, the lossy material 64 can face the substrate when the electrical connector 20 is mounted to the substrate. For instance, as described above, the electrical contacts 24 can be arranged in first and second rows 32 that are each oriented along the lateral direction A, and are spaced from each other along the transverse direction T. The lossy material 64 can be disposed on the outer surface of the connector housing at a location between the rows 32. In one example, the lossy material 64 can be disposed equidistantly between the rows 32. Further, the lossy material 64 can be disposed equidistantly between the mounting ends 28 of the electrical contacts 24.

Referring now to FIGS. 8A-9F generally, the electrical connector 20 can be configured as a right-angle connector. In particular, the mating ends 26 and the mounting ends 28 can be oriented substantially perpendicular to each other. In one example, the mating ends 26 can be oriented along the longitudinal direction L, and the mounting ends 28 can be oriented along the transverse direction T. For instance, the mating ends 26 can extend out from the connector housing 22 along the longitudinal direction L, and the mounting ends 28 can extend out from the connector housing 22 along the transverse direction T.

The electrical contacts 24 can be supported by the connector housing 22 indirectly. In particular, the electrical connector 20 can include at least one leadframe assembly 50 that includes a leadframe housing 52 and a respective plurality of the electrical contacts 24 supported by the leadframe housing 52. The at least one leadframe housings 52, and thus the at least one leadframe assembly 50, can be supported by the connector housing 22. In one example, the electrical connector 20 can include first and second leadframe assemblies 50*a* and 50*b*. Each of the first and second leadframe assemblies 50*a* and 50*b* can include respective first and second pluralities of the electrical contacts 24 supported by the respective leadframe housing 52. The electrical contacts 24 of each leadframe assembly 50 can be aligned along a respective row 32 that is oriented along the lateral direction A as described above.

The leadframe assemblies 50*a* and 50*b* can be spaced from each other along the transverse direction T. Thus, the first and second leadframe housings 52 of the first and second leadframe assemblies 50*a* and 50*b*, respectively, can be spaced from each other along the transverse direction T. Each of the leadframe housings 52 can define an inner surface 53 that faces the other of the leadframe housings, and an outer surface 55 opposite the inner surface 53 along the transverse direction T. Further, the rows 32 can be spaced from each other along the transverse direction T. In one example, the electrical contacts 24 can be insert molded in the respective leadframe housing 52. Alternatively, the electrical contacts 24 can be stitched into the respective leadframe housing. While the electrical connector 20 is shown including first and second leadframe assemblies 50*a* and 50*b*, it should be appreciated that the electrical connector can include any number of leadframe assemblies as desired.

The electrical contacts 24 can include a plurality of electrical signal contacts 54 and a plurality of ground contacts 56. For instance, adjacent ones of the electrical signal contacts 54 along the row 32 can define a differential signal pair. The electrical contacts 24 can further include a plurality of electrical ground contacts 56. The electrical ground contacts 56 can be disposed between adjacent differential signal pairs along the row 32. Thus, each leadframe assembly 50 can include a plurality of signal contacts 54 and a plurality of ground contacts 56 in one example. It should be appreciated that the electrical signal contacts 54 can alternatively be single ended. Further, the electrical ground contacts 56 can be disposed at any alternative suitable locations as desired.

Figure 8A:
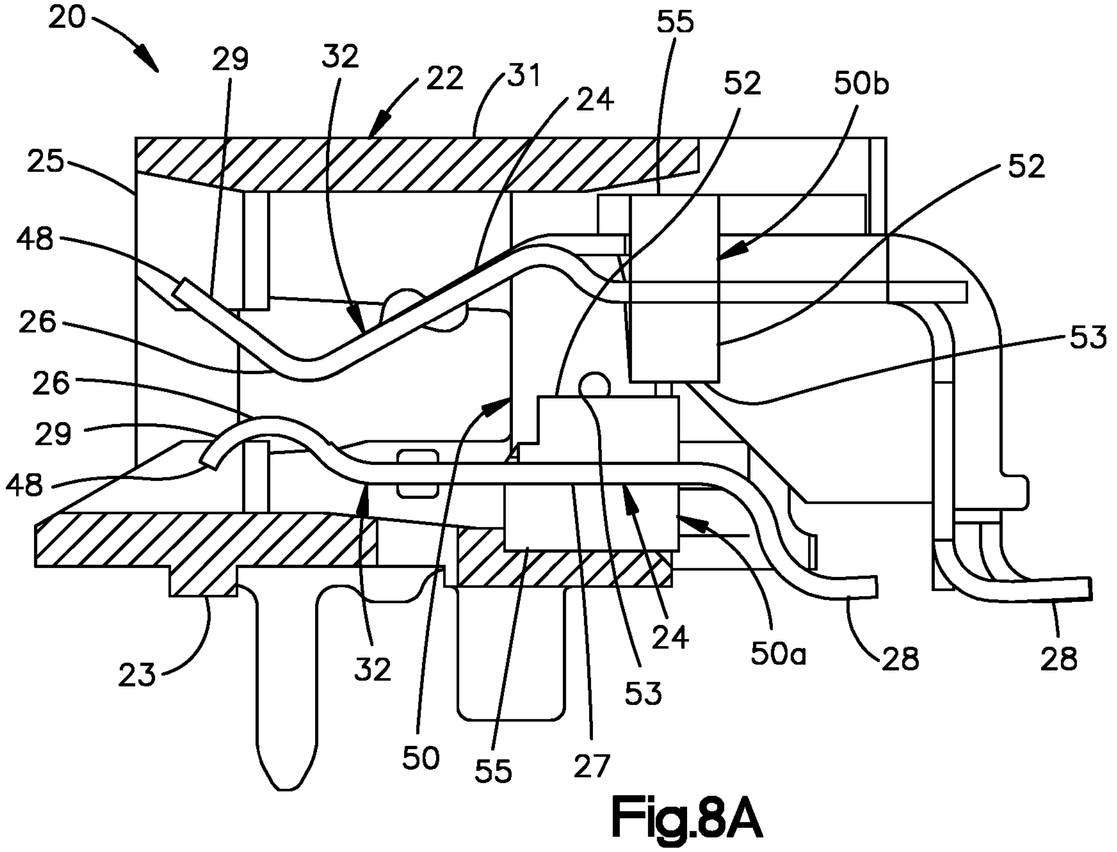
FIG. 8A is a sectional side elevation view of an electrical connector including lossy material in accordance with another example.
Figure 8B:
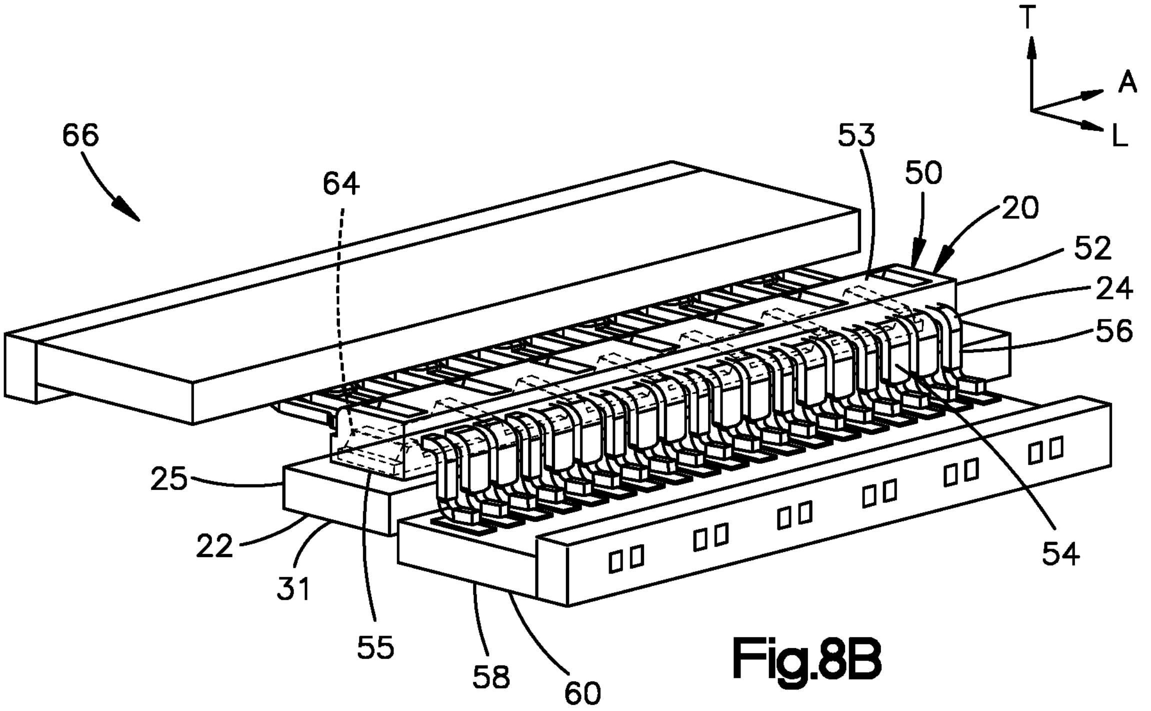
FIG. 8B is a perspective view of a data communication assembly, including the electrical connector illustrated in FIG. 8A shown with portions removed, and shown mounted to a first electrical device and mated to a second electrical device.
Figure 8C:
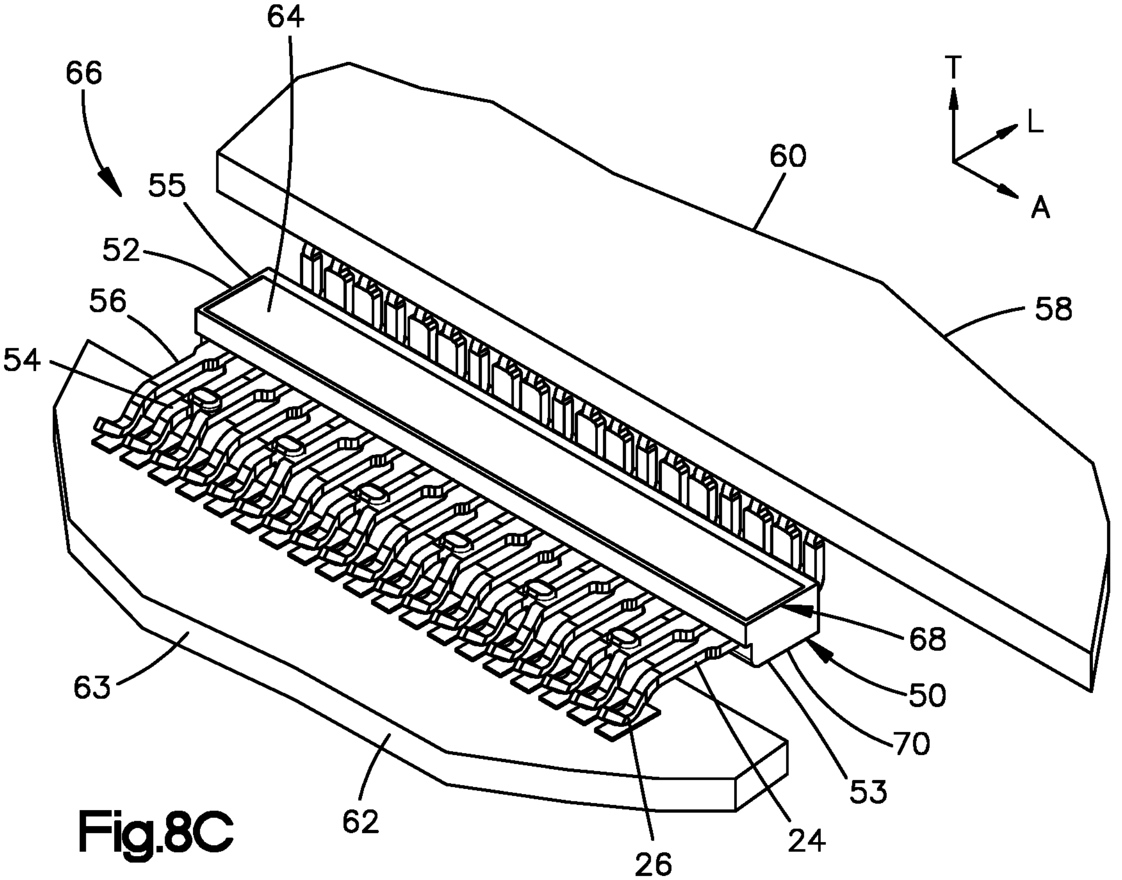
FIG. 8C is another perspective view of a portion of the data communication assembly illustrated in FIG. 8B.

Referring now also to FIGS. 8B-8C, the rows 32 can be arranged such that the mounting ends 28 of the electrical contacts 52 are configured to be mounted to a first electrical device 58. The first electrical device 58 can be a first substrate 60, which can be configured as a first printed circuit board. When the first substrate 60 is received between the mating ends of each row 32, the mating ends 26 can establish an electrical connection with opposed surfaces of the first substrate 60. The first substrate 60 can belong to an electrical connector, such as a QSFP connector in one example. Thus the first electrical device 58 can be configured as a QSFP connector. It should be appreciated, of course, that the first electrical device 58 can be alternatively configured in any suitable manner as desired.

Referring now also to FIGS. 8B-8C, the rows 32 can be arranged such that the mounting ends 28 of the electrical contacts 52 are configured to be mounted to a first electrical device 58. The first electrical device 58 can be a first substrate 60, which can be configured as a first printed circuit board. Thus, the mounting ends 28 are configured to establish an electrical connection with the first substrate 60. The first substrate 60 can belong to an electrical connector, such as a QSFP connector in one example. Thus the first electrical device 58 can be configured as a QSFP connector. It should be appreciated, of course, that the first electrical device 58 can be alternatively configured in any suitable manner as desired.

Referring now also to FIGS. 8B-8C, the rows 32 can be arranged such that the mating ends 26 of the electrical contacts 52 of the rows 32 are spaced from each other so as to receive a second electrical device 62. The second electrical device 62 can be a second substrate 63, which can be configured as a second printed circuit board. When the second substrate 63 is received between the mating ends 26 of each row 32, the mating ends 26 can establish an electrical connection with opposed surfaces of the second substrate 63. The second substrate 63 can belong to an electrical connector, such as a QSFP connector in one example. Thus the second electrical device 62 can be configured as a QSFP connector. It should be appreciated, of course, that the second electrical device 62 can be alternatively configured in any suitable manner as desired.

A data communication assembly 66 can include the electrical connector 20 and the first and second electrical devices 58 and 62 as described above. Thus, when the electrical connector is mounted to the first electrical device 58 and mated to the second electrical device 62, the first and second electrical devices 58 can be placed in electrical communication with each other.

In one example, the electrical connector 20 shown in FIG. 8A-8C can be configured as a UECS-2 electrical connector commercially available from Samtec, having a place of business in New Albany, Indiana, USA. However, the electrical connector 20 can further include the lossy material 64 as will now be described.

Referring now to FIGS. 9A-9E, one or both of the leadframe housings 52 up to all of the leadframe housings of the electrical connector can include the lossy material 64. For instance, one or both of the leadframe housings 52 can define at least one void 68 that is configured to receive the lossy material 64. The at least one void 68 can define a single void or a plurality of voids as desired. The void 68 can extend into any suitable surface of the leadframe housing 52 as desired.

For instance, the void 68 can extend into the outer surface 55 toward the inner surface 53. In one example, the void 68 can terminate in the leadframe housing 52 without extending through the inner surface 53 along the transverse direction. Further, the void 68 can terminate along the lateral direction A without extending through either of the lateral side walls of the leadframe housing 52 that are opposite each other along the lateral direction A. Thus, the void can be configured as a pocket in one example. For instance, the pocket can be open only to the outer surface 55 in one example. Alternatively, the void 68 can extend through the inner surface 53 along the transverse direction T. It should therefore be appreciated that the void 68 can alternatively define a through hole that is open to more than one different surface of the leadframe housing 52. For instance, the through hole can be open to both the inner surface 53 and the outer surface 55 of the leadframe housing 52. Alternatively or additionally, the void 68 can extend through one or both of the lateral side walls of the leadframe housing 52. Further still, the void 68 can terminate without extending through either front or rear walls of the leadframe housing 52 that are opposite each other along the longitudinal direction L. Alternatively, the void 68 can extend through one or both of the front and rear walls of the leadframe housing 52.

The lossy material 64 can be disposed in the void 68. Thus, the lossy material 64 can be disposed between the mating ends 26 and the mounting ends 28 with respect to the longitudinal direction L. The void 68 can be defined by a base 70 that is defined by the leadframe housing 52. The base 70 can define a plurality of raised regions 72. In one example, the electrical contacts 52 can extend through the raised regions. The lossy material can be substantially flush with the at least one surface of the leadframe housing 52 that defines the opening to the void 68. For instance, the lossy material can be substantially flush with the outer surface 55 of the leadframe housing 52 in one example. The term "substantially," "approximately," and derivatives thereof, and words of similar import, when used to described sizes, shapes, spatial relationships, distances, directions, and other similar parameters includes the stated parameter in addition to a range up to 10% more and up to 10% less than the stated parameter, including 5% more and 5% less, including 3% more and 3% less, including 1% more and 1% less. However, with respect to a stated frequency, the term "substantially," "approximately," and derivatives thereof, and words of similar import includes the stated frequency in addition to a range up to 5 GHz more than the stated frequency and up to 5 GHz less than the stated frequency.

Figure 9A:
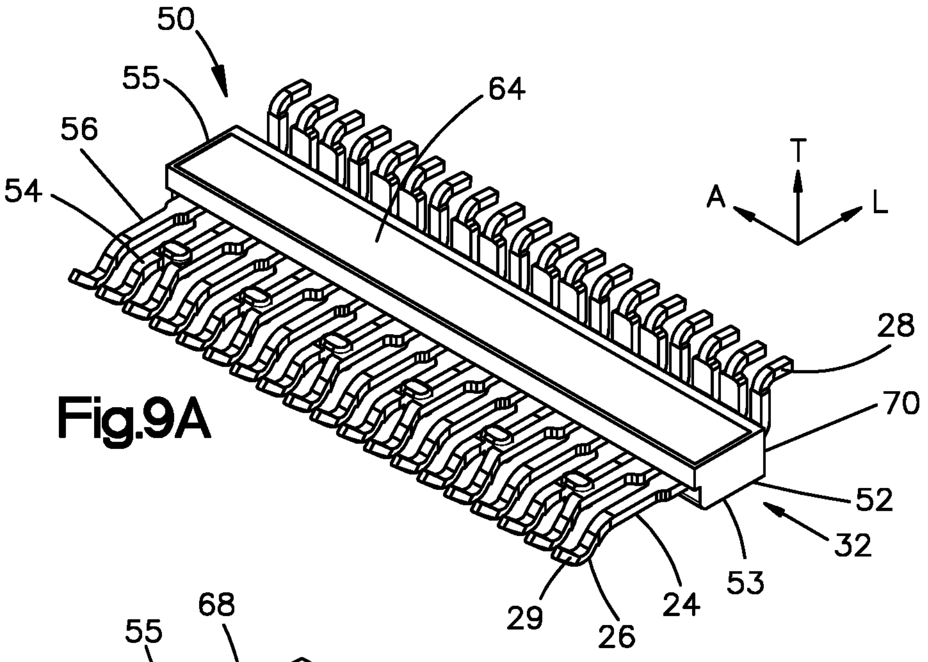
FIG. 9A is a perspective view of a leadframe assembly of the electrical connector illustrated in FIG. 8A.
Figure 9B:
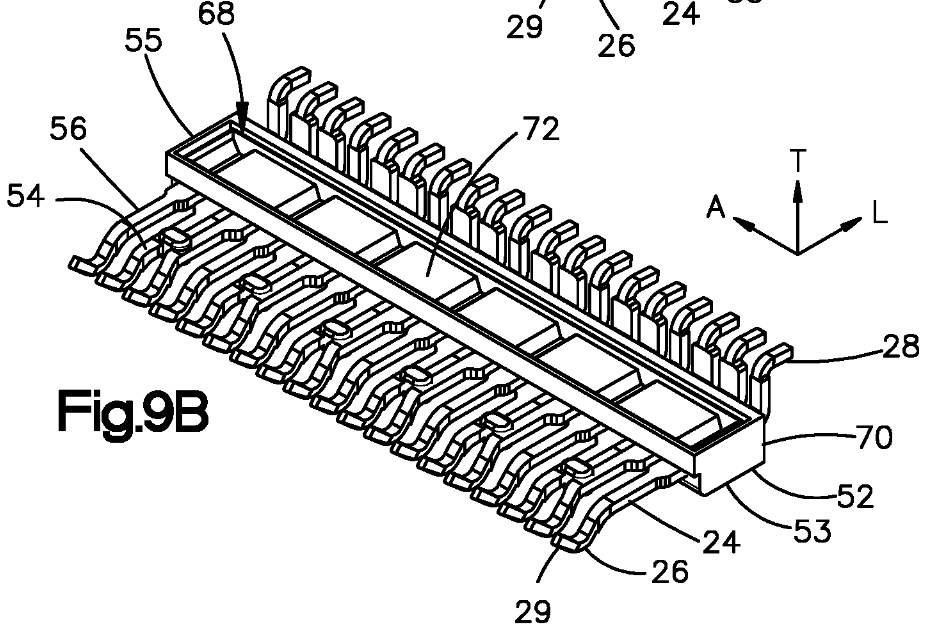
FIG. 9B is a perspective view of a leadframe housing of the leadframe assembly in FIG. 9A, the leadframe housing defining a void configured to receive lossy material.
Figure 9C:
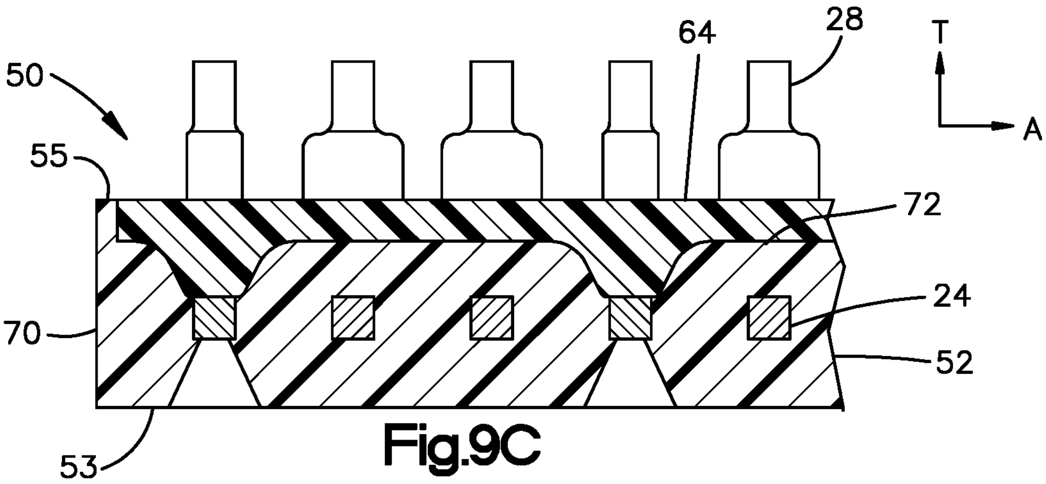
FIG. 9C is a sectional side elevation view of the leadframe assembly illustrated in FIG. 9A, showing lossy material disposed in the void illustrated in FIG. 9B.
Figure 9D:
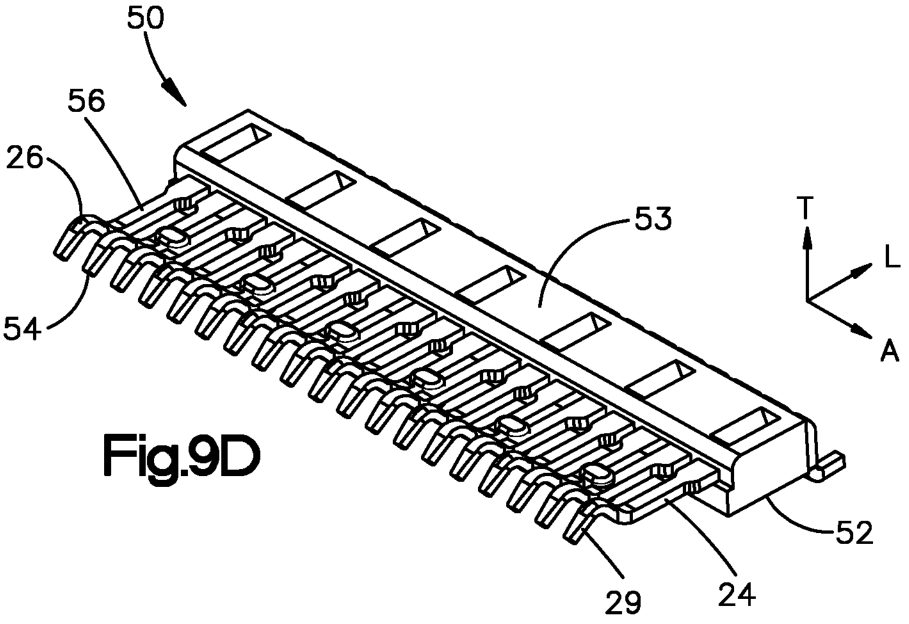
FIG. 9D another perspective view of the leadframe assembly illustrated in FIG. 9A.
Figure 9E:
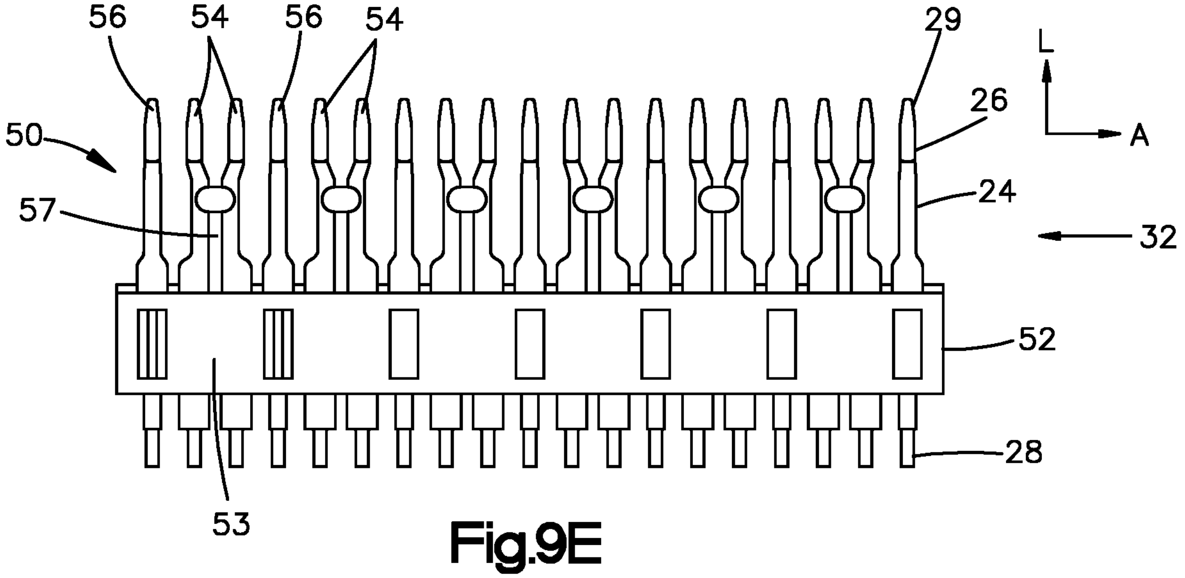
FIG. 9E is a top view of the electrical connector illustrated in FIG. 9A.
Figure 9F:
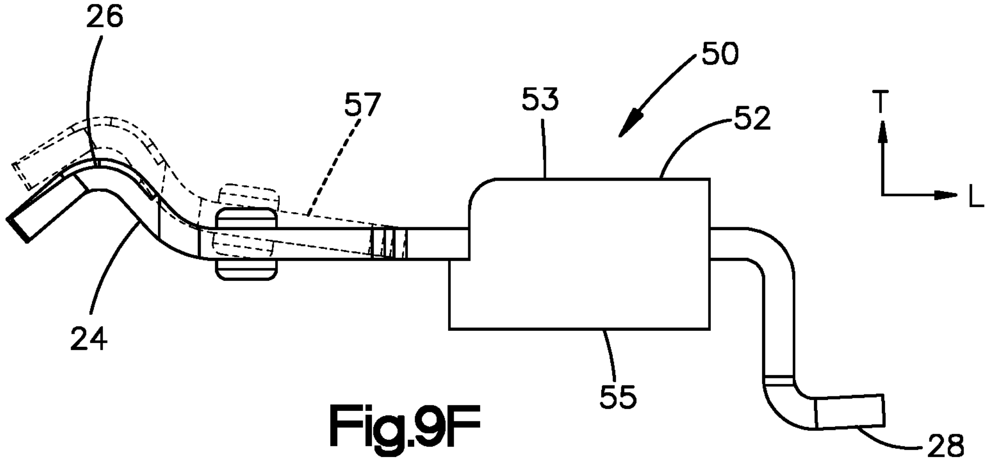
FIG. 9F is a side view of the electrical connector illustrated in FIG. 9A, wherein the electrical contacts are shown in a relaxed position, and in a deflected position as when mated to complementary electrical contacts.

With continuing reference to FIGS. 8A-9F, the leadframe housing 52 can include an insert 57 that projects forward along the mating direction and is configured to be disposed between electrical signal conductors of a respective differential pair. In particular, the insert 57 can contact each of the electrical signal contacts at a location adjacent a concavity and a convexity of the electrical contacts. In one example, the insert 57 can include a forward extending web, and a button at a distal end of the web. The button and the web can be disposed between adjacent electrical contacts 24, and the button can be in abutment with the adjacent electrical contacts 24. Because the insert can be part of the leadframe housing 52, it can be insert molded electrically insulative material monolithic with a remainder of the leadframe housing 52. The insert 57 can control impedance of the differential signal pairs based on its dielectric constant. Thus, the dielectric constant of the leadframe housing 52, and thus of the insert 57, can be selected to provide a desired impedance. In one example, the insert 57 can further include a lossy material disposed thereon or in a void therein. As illustrated in FIG. 9F, the electrical contacts 24 can deflect when mated with a complementary electrical connector. The inserts 57 can remain between the respective adjacent electrical contacts 24 and in abutment with the respective adjacent electrical contacts 24 as the electrical contacts 24 deflect.

Figure 10:
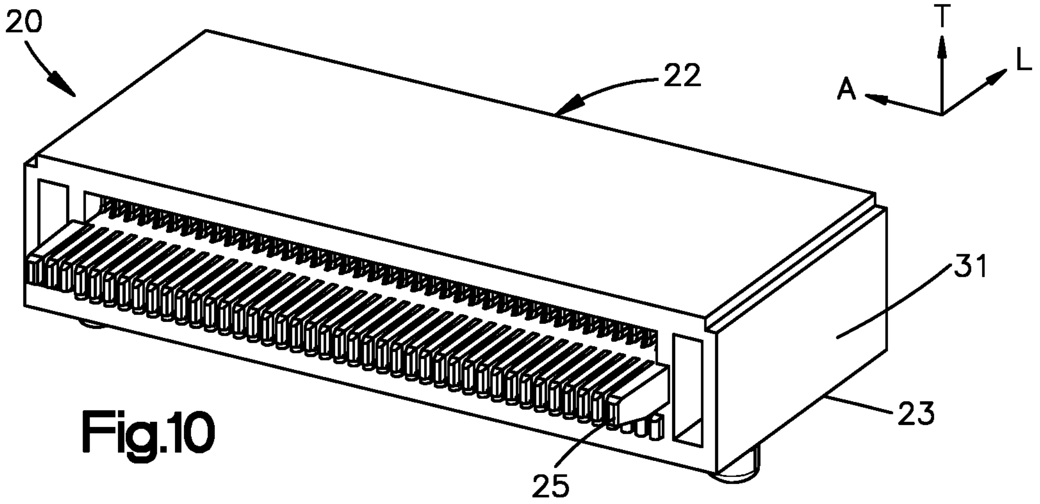
FIG. 10 is a perspective view of an electrical connector housing including a housing body and lossy material disposed on the housing body in one example.
Figure 11A:
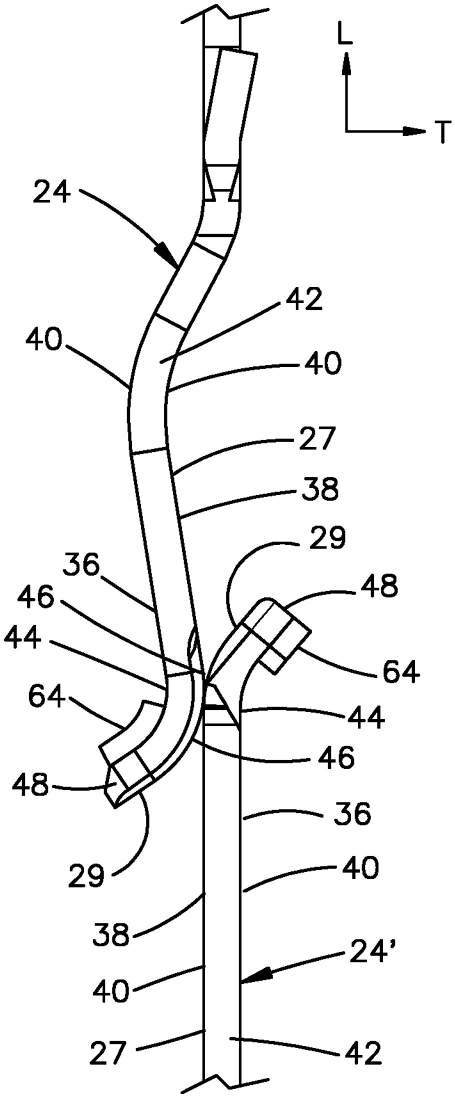
FIG. 11A shows first and second electrical contacts of respective first and second electrical connectors aligned to be mated with each other, wherein the electrical contacts include a lossy material disposed on respective tips of the electrical contacts according to one example.
Figure 11B:
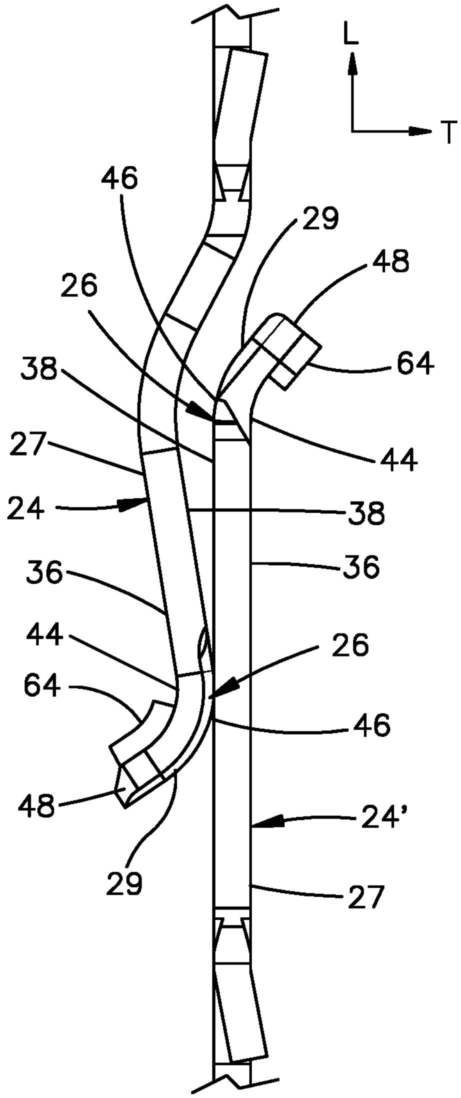
FIG. 11B shows the first and second electrical contacts illustrated in FIG. 11A shown mated with each other.

As illustrated in FIG. 10, it is recognized that instead of or in addition to disposing the lossy material to one or more portions of the electrical connector 20, the connector housing 22 can be made from a lossy material 64. Thus, an entirety of the connector housing 22 can comprise the lossy material 64. While certain examples of electrical connectors including the lossy material 64 have been described, it is recognized that any suitable alternative electrical connector as electrical While the lossy material 64 can be disposed on the housing body 31 as described above, it should be appreciated that the electrical connector can include lossy material 64 at other locations. For instance, referring now to FIGS. 11A-11B, at least one electrical contact 24 of an electrical connector can include lossy material 64 that is disposed on the contact body. For instance, a plurality of electrical contacts 24 up to all of the electrical contacts 24 of the electrical connector can include the lossy material. In one example, the at least one electrical contact 24 can be configured as a ground contact of the electrical connector. Thus, the at least one electrical contact 24 can include a plurality of the ground contacts up to all of the ground contacts of the electrical connector. Alternatively or additionally, the at least one electrical contact 24 can be configured as a signal contact of the electrical connector. Thus, the at least one electrical contact 24 can include a plurality of the signal contacts up to all of the signal contacts of the electrical connector. In one example, the lossy material 64 can be disposed on the mating end 26 of the contact body. Alternatively or additionally, the lossy material 64 can be disposed on the tip 29 of the contact body. As shown in FIGS. 11A-11B, the lossy material 64 can be disposed on the respective tips 29 of both the at least one electrical contact 24 of the electrical connector and on respective tips 29 of a complementary electrical contact 24' of a complementary electrical connector. The electrical contacts 24 can mate with the complementary electrical contacts 24' when the first and second electrical connectors are mated with each other at their respective mating ends 26.

In particular, the mating ends 26 of the electrical contact 24 and the complementary electrical contact 24' can define respective wiping surfaces 34 that are configured to wipe against each other as the electrical contacts 24 and 24' are mated with each other. As illustrated in FIG. 11A, the wiping surfaces 34 can be aligned with each other along the longitudinal direction L when the respective electrical connectors are aligned to be mated with each other in the mating direction. Next, as illustrated in FIG. 11B, the electrical contacts 24 and 24' can be brought toward each other along respective mating directions, thereby causing the wiping surfaces 34 to ride along each other while in abutment with each other. The wiping surfaces 34 ride along each other until the electrical contacts 24 and 24' are mated with each other. The mating ends of the electrical contacts 24 and 24' can deflect away from each other as they mate. In particular, the electrical contacts 24 and 24' can be elastically resilient. Thus, as the bent wiping surfaces 34 ride along each other, the abutment of the wiping surfaces 34 can cause the mating ends 26 of the electrical contacts 24 and 24' to deflect away from each other along the transverse direction T.

Figure 14A:
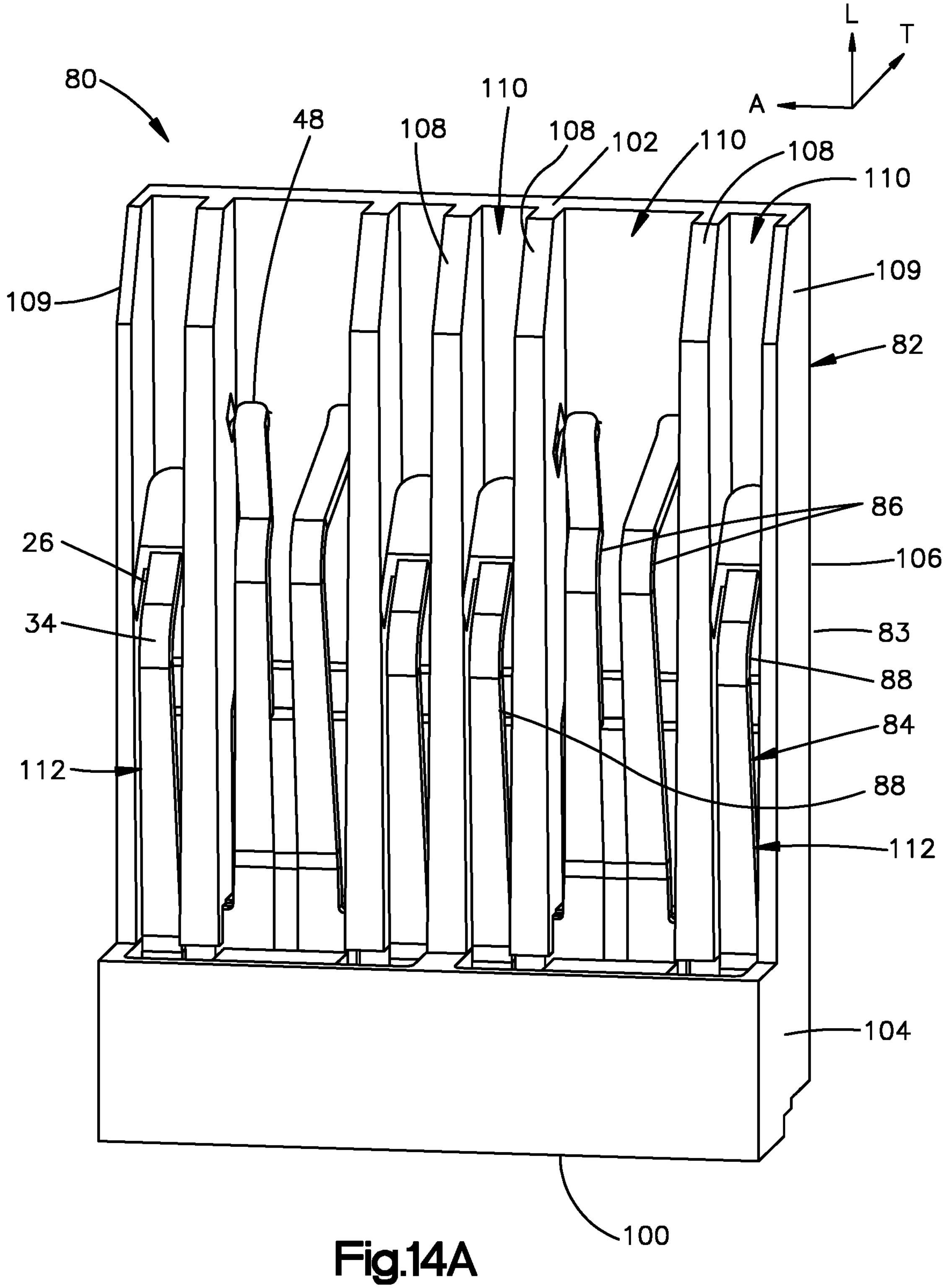
FIG. 14A is an edge card connector including a connector housing and a plurality of electrical contacts supported by the connector housing, and lossy material disposed on the ground contacts in one example.
Figure 14B:
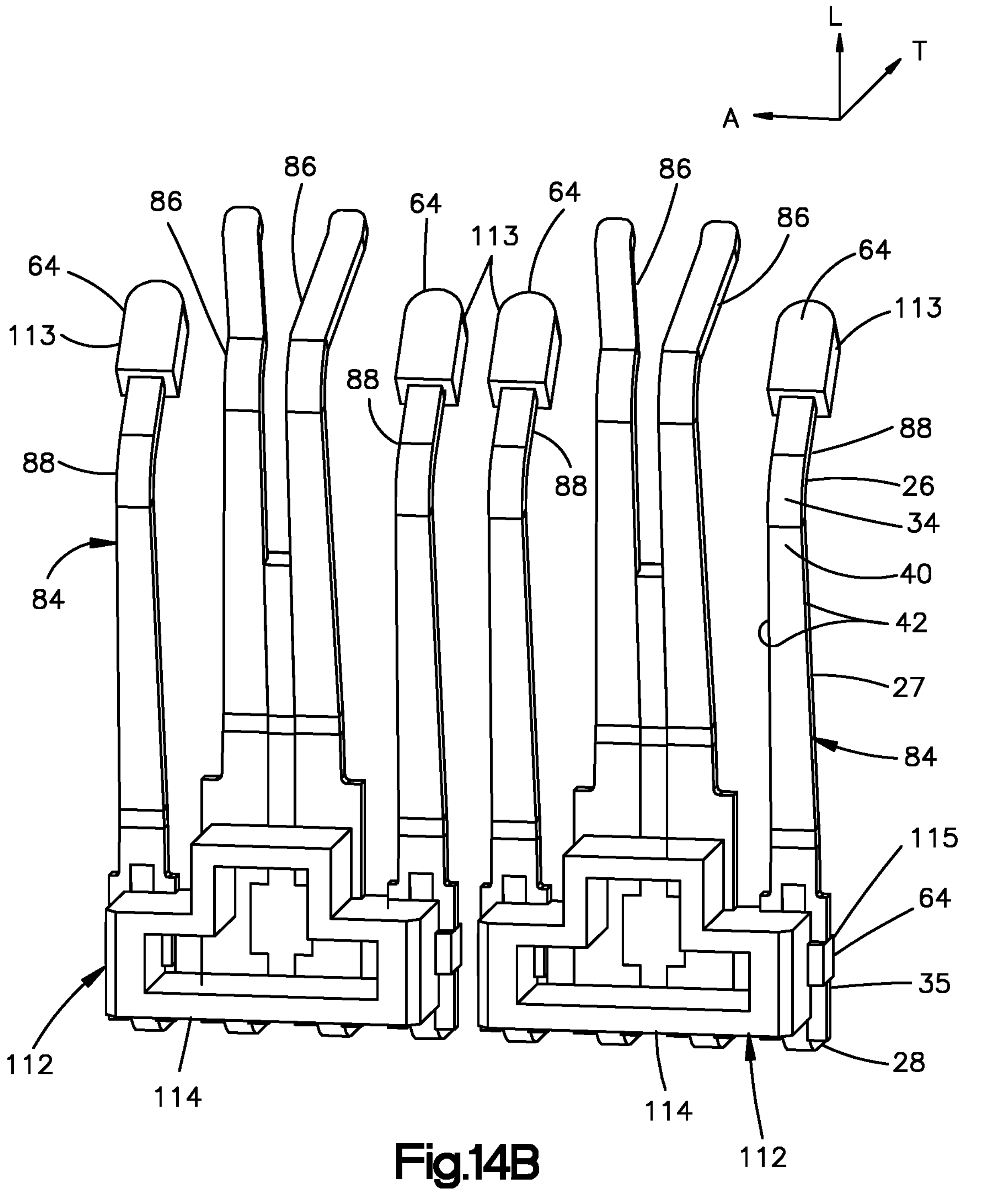
FIG. 14B is a perspective view of leadframe assemblies of the edge card connector illustrated in FIG. 14A.
Figure 14C:
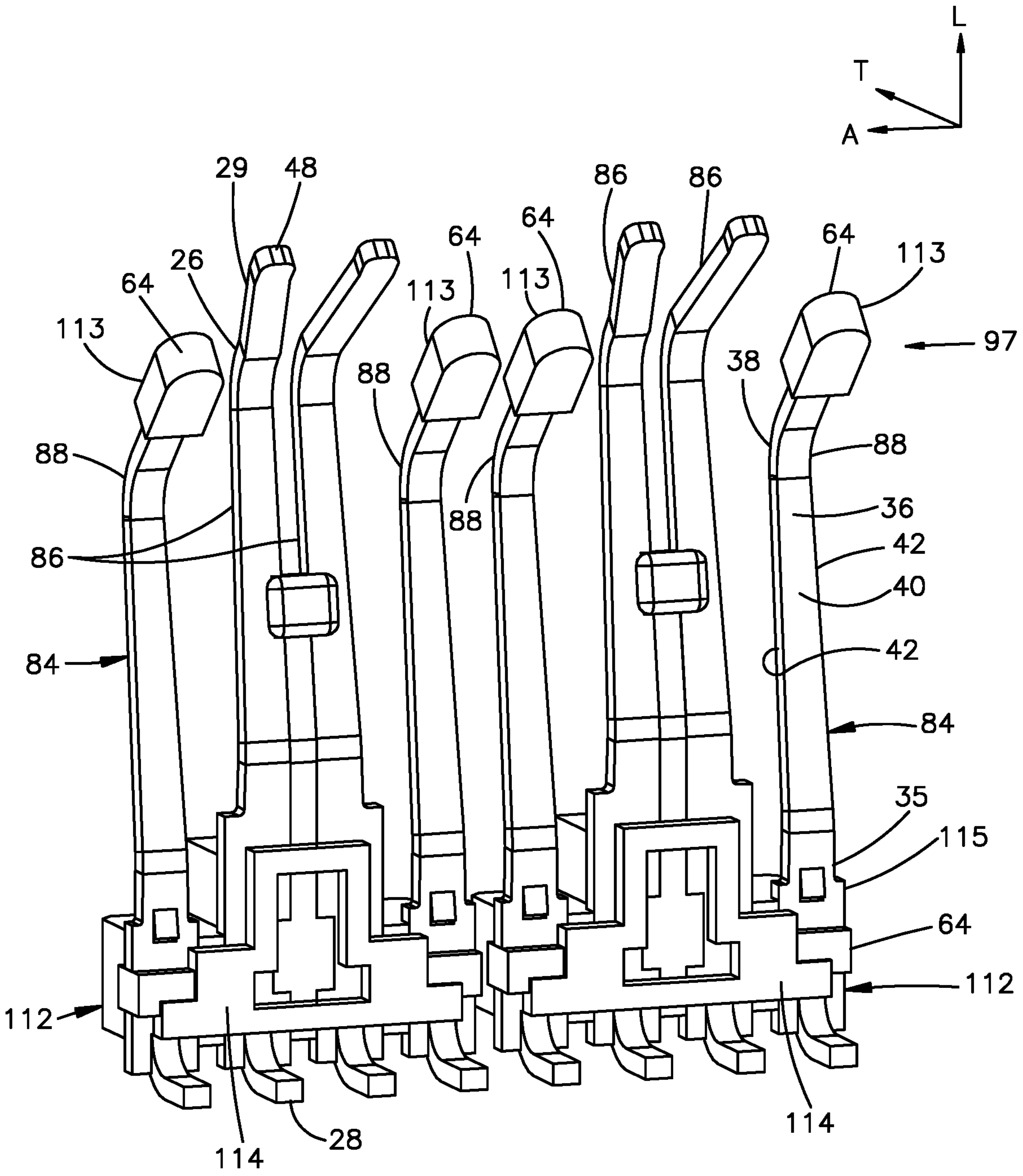
FIG. 14C is another perspective view of the leadframe assemblies illustrated in FIG. 14B.
Figure 14D:
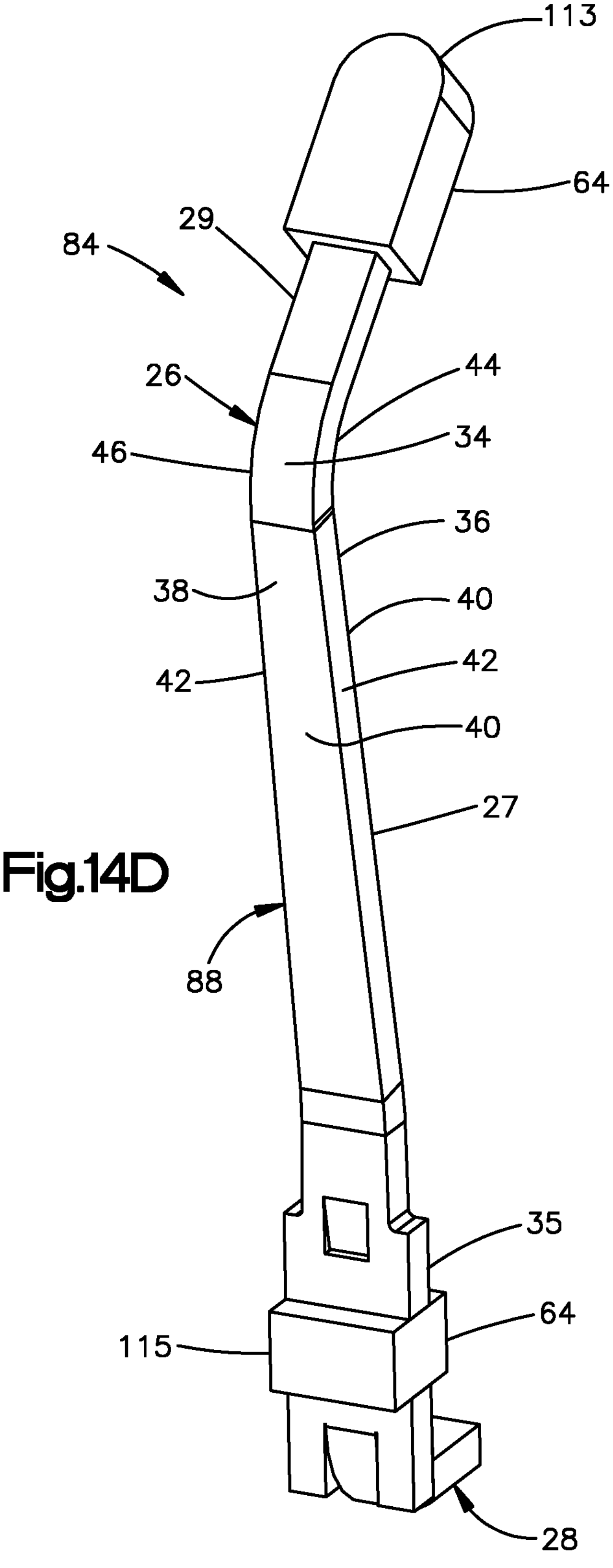
FIG. 14D is a perspective view of a ground contact illustrated in FIG. 16A.

The tips 29 can constructed to flare away from the wiping surfaces 34 as they extend in a direction away from their respective intermediate portion 27. For instance, the tips 29 can extend away from respective portions of the electrical contact 24 that define the wiping surfaces 34. Thus, the tips 29 of the electrical contacts 24 and 24' can be offset from each other along the transverse direction T when the electrical contacts 24 and 24' are aligned to be mated with each other. As a result, the tips 29 of the electrical contacts 24 and 24' can move past each other without contacting each other. The lossy material 64 can be disposed on respective first surfaces 36 of the electrical contacts 24 and 24' that are opposite the wiping surfaces 34. In particular, the lossy material 64 can be disposed on the first surface 36 at the mating end 26. Further, the lossy material 64 can be disposed on the first surface 36 and not the second surface 38 at the mating end 26. Similarly, the lossy material 64 can be disposed on the first surface 36 at the tip 29. In one example, the lossy material 64 can be disposed on the first surface 36 at the tip 29 and not at the second surface 38. Alternatively, as described in more detail below with respect to FIG. 14D, the lossy material 64 can be disposed on the first surface 36 and the second surface 38 at the tip 29. Further, the lossy material can be disposed on edges 42 that extend between the first and second surfaces 36 and 38, which can define broadsides 40 of the electrical contact 24. In one example, the first and second surfaces 36 and 38 can be opposite each other along the transverse direction T. The broadsides 40 of the electrical contact 24 extend between and up to the edges 42 along a plane that is oriented normal to the electrical contact. The plane can also be said to extend along the transverse direction T and the lateral direction A. The edges 42 can be opposite each other along the lateral direction A. The broadsides 40 can define a length that is greater than the length of the edges 42 in the plane. In another example, the broadsides 40 can be opposite each other along the lateral direction A, and the edges 42 can be opposite each other along the transverse direction T.

With continuing reference to FIGS. 11A-11B, the first surface 36 can define a concavity 44, and the second surface 38 can define a convexity 46 that is opposite and aligned with the concavity 44. The convexities 46 of the electrical contacts 24 and 24' can ride along each other when the electrical connectors 24 and 24' are mated with each other. Thus, at least a portion of the convexity 46 of each electrical contact can define at least a portion of the wiping surface 36. The concavity 44 and the convexity 46 of each electrical contact can be opposite each other along the direction along which the first and second surfaces 36 and 38 are opposite each other. Thus, when the first and second surfaces 36 and 38 are opposite each other along the transverse direction T, the concavity 44 and the convexity 46 can be opposite and aligned with each other along the transverse direction T. When the first and second surfaces 36 and 38 are opposite each other along the lateral direction A, the concavity 44 and the convexity 46 can be opposite and aligned with each other along the lateral direction A. In one example, the lossy material 64 can extend along the first surface 36 between the concavity 44 and the distalmost end 48 of the electrical contact. Further the lossy material 64 can extend along a portion of the concavity 44 less than an entirety of the concavity 44, as illustrated at electrical contact 24. Alternatively, the lossy material 64 can be disposed only distal of the concavity 44 as illustrated at the electrical contact 24'.

It has been found that the lossy material 64 disposed at the tips 29 of the electrical contacts can reduce a phenomenon known as a stub effect. In particular, the tips 29 can become a quarter-wave resonator during operation. The lossy material 64 disposed at the tip 29 can absorb at least a portion of the resulting magnetic field emitted from the tip 29. As illustrated at FIG. 5, the convexities 46 of adjacent electrical contacts 24 that define a differential signal pair can face each other. Accordingly, the concavities 44 of electrical contacts 24 of adjacent differential pairs can face each other. Thus, because the lossy material 64 is disposed on the concavities 44, the lossy material 64 can be disposed between adjacent differential signal pairs.

It should be appreciated that the lossy material 64 can be disposed only at the tips 29 in one example. Alternatively, the lossy material 64 can be disposed at other locations of the first surface 36 of the electrical contacts. For instance, the lossy material 64 can alternatively or additionally be disposed at the mating end 26 as described above. Alternatively or additionally still, the lossy material 64 can be disposed at the base 35 of the electrical contact 24 as described below with reference to FIGS. 14A-14D.

Referring now to FIGS. 5-11B generally, the lossy material can be tuned to dampen the resonant frequency of the tips 29 or any other suitable frequency. The lossy material 64 of the electrical contacts of a differential signal pair can be tuned to absorb magnetic fields at first and second different frequencies. In particular, first and second different types of lossy material tuned to absorb magnetic fields at the first and second different frequencies, respectively, can be disposed on first and second signal contacts, respectively, or a differential signal pair. For example, the first type of lossy material configured to absorb frequencies of substantially 10 GHz can be disposed on a first electrical contact 24 of the differential signal pair. The second type of lossy material capable of absorbing frequencies of substantially 15 GHz can be disposed on a second electrical contact 24 of the differential signal pair. While the first frequency can be 10 GHz, and the second frequency can be 15 GHz in one example, it is recognized that the first and second frequencies can be selected as desired to reduce unwanted resonance frequencies.

The lossy material 64 can define any suitable volume, size, and shape as desired. Further, the lossy material 64 can be disposed at any suitable location of the electrical contacts 24. The volume, size, shape, and location of the lossy material 64 can be determined through testing or computer simulations. In some instances, the volume, size, shape, and location can result in manufacturing tradeoffs. The contact with the lossy material can be included any suitable electrical connector. Lossy material can be applied to the signal contacts of the electrical connector that transport, i.e., transmit and/or receive, electrical signals. In some electrical connectors, lossy material can be applied only to the signal contacts.

In one example the lossy material 64 can be a dispensed material such as an epoxy. Alternatively, the lossy material 64 can be a stamped material. With a dispensed material, the lossy material can be applied after the electrical contact 24 is formed or housing body 31, for example, by stamping from a metal sheet. For instance, thin sheets of uncured epoxy can be die cut and applied to a contact through pick and place or other automated process, and then cured after initial attachment to the electrical contact 24 or housing body 31. When attaching the lossy material 64 to the electrical contacts 24, the lossy material 64 can be applied to the electrical contacts 24 in a contact reel and a reel-to-reel stage. It should be appreciated, of course, that the lossy material 64 can be fabricated using any suitable alternative fabrication method.

It is therefore appreciated that the lossy material 64 can be disposed on or in the housing body 31, defined by the connector housing 22, included in a leadframe assembly, carried by an electrical contact, or a combination of one or more of the above. Further, while the leadframe assemblies can define differential signal pairs along the respective row as described above, it is further recognized that leadframe assemblies can define differential signal pairs along columns that are oriented perpendicular to the rows.

Figure 12A:
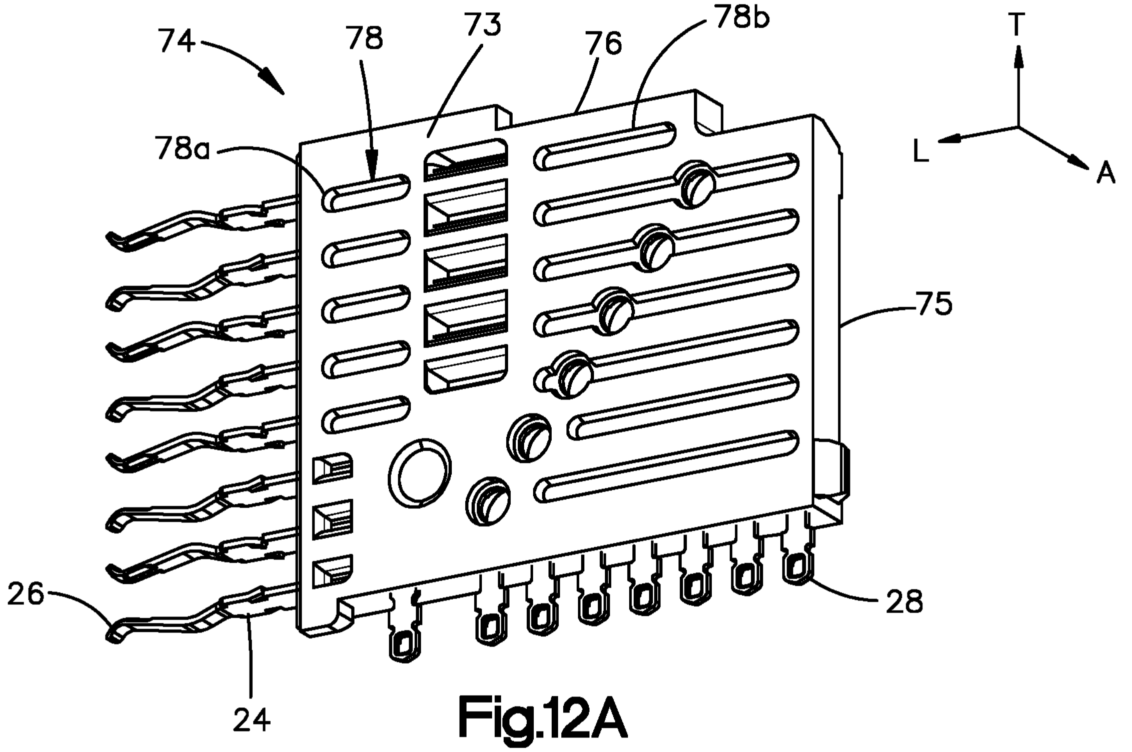
FIG. 12A is a perspective view of a leadframe assembly including a leadframe housing and electrical contacts supported by the leadframe housing, wherein the leadframe assembly is devoid of lossy material.
Figure 12B:
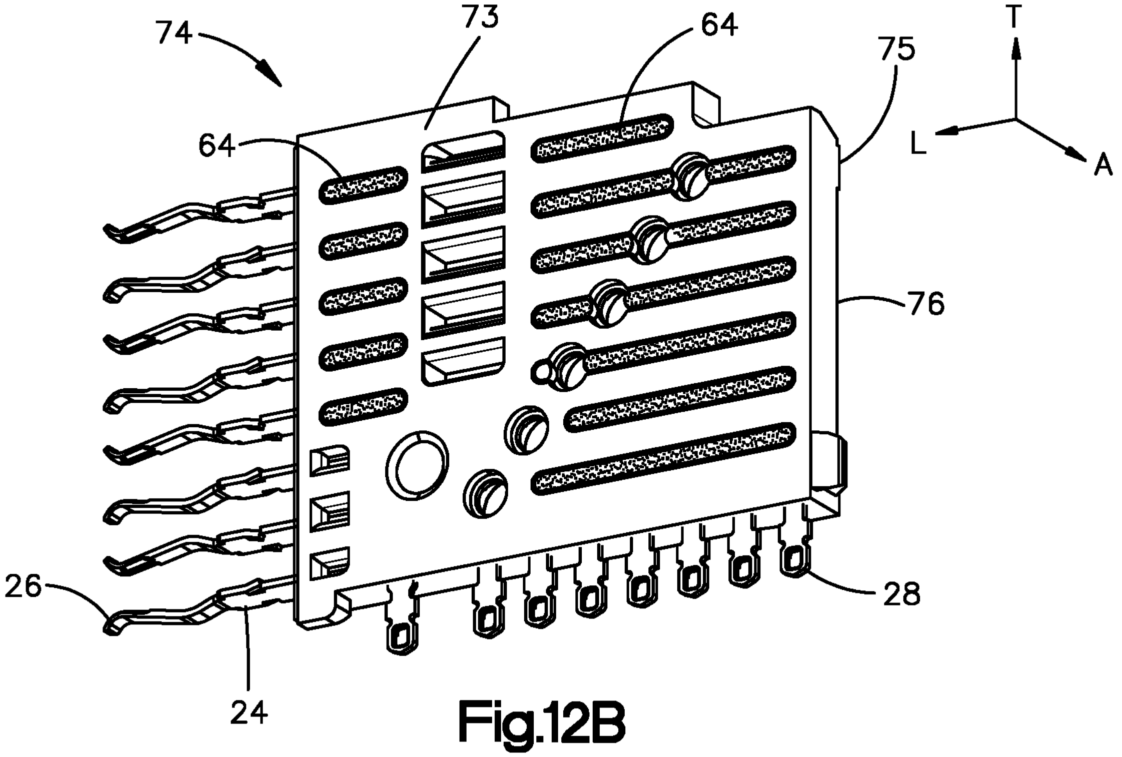
FIG. 12B is a perspective view of the leadframe assembly illustrated in FIG. 12A, but including lossy material in accordance with one example.

For instance, referring to FIGS. 12A-12B, an electrical connector can include a connector housing that supports a plurality of leadframe assemblies 74 constructed in accordance with another example. For instance, the leadframe assembly can include a leadframe housing 76 and a respective plurality of the electrical contacts 24 supported by the leadframe housing 76. The electrical contacts 24 can be right-angle contacts, whereby the mating ends 26 are oriented along the longitudinal direction L, and the mounting ends 28 are oriented along the transverse direction T. The mating ends 26 of the electrical contacts 24 of each leadframe assembly 74 can be aligned along a respective column that is oriented along the transverse direction T, and thus perpendicular to the row. The mounting ends 28 of the electrical contacts of each leadframe assembly 74 can be aligned along the longitudinal direction L, or mating direction. Adjacent signal contacts of each leadframe assembly 74 define respective differential signal pairs. The leadframe assemblies 74 can further include a plurality of ground contacts, such that at least one ground contact is disposed between adjacent differential signal pairs. Alternatively, the leadframe assemblies 74 can be devoid of ground contacts. A plurality of leadframe assemblies 74 can be supported by the connector housing, such that the leadframe assemblies 74 are arranged along the row that is oriented along the lateral direction A.

Each of the leadframe housings 76 can define opposed side surfaces 73 and 75 that are opposite each other along the lateral direction A. As illustrated in FIGS. 12A-12B, the leadframe assemblies 74 can include a plurality of voids 78 that are configured to receive lossy material 64. For instance, the voids 78 can extend in at least one or both of the side surfaces 73 and 75. The voids 78 can terminate in the leadframe housing 76 without extending to the electrical contacts 24 that are supported by the leadframe housing 76. Thus, the voids 78 can be configured as pockets. Further, at least a portion of the voids 78 can be aligned with respective ones of the electrical contacts 24 that are supported by the leadframe housing 76. For instance, the voids 78 can define a plurality of front voids 78*a* that are aligned along the lateral direction with a portion of at least some of the electrical contacts that are oriented along the longitudinal direction L. Thus, the front plurality of voids 78*a* can be elongate along the longitudinal direction L, and in alignment with respective ones of the electrical contacts 52 supported by the leadframe housing 76. The front voids 78*a* can further be aligned with each other along the transverse direction T. As illustrated in FIG. 12B, lossy material 64 can be disposed in the front voids 78*a*, and thus aligned with respective ones of the electrical contacts along the lateral direction A.

The voids 78 can further include rear voids 78*b*. Respective portions of the rear voids 78*b* can be aligned along the lateral direction A with a bent portion of at least some of the respective electrical contacts 24 that are bent as they extend between the mating end 26 and the mounting end 28. oriented along the longitudinal direction L. Thus, the rear voids 78*b* can be elongate along the longitudinal direction L. The rear voids 78*b* can further be aligned with each other along the transverse direction T. Certain ones of the rear voids 78*b* can have different lengths along the longitudinal direction L that are different than other ones of the rear voids 78*b* in some examples.

As described above, the voids 78 can be configured to receive lossy material 64 as illustrated in FIG. 12B. In particular, as is the case with the other voids described herein, the voids 78 can be substantially filled with the lossy material 64. Further, the lossy material 64 can be substantially flush with the at least one of the side surfaces 73 and 75 of the leadframe housing 76 that defines an opening to the voids. In this regard, it should be appreciated that the lossy material 64 can be disposed between columns of electrical contacts along a row, whereby the electrical contacts define differential signal pairs along a direction that is perpendicular to the row. It is recognized that the lossy material 64 disposed in the front voids 78*a* can be tuned to attenuate substantially first frequency, and the lossy material, and the lossy material 64 in the rear voids 78*b* can be configured to attenuate substantially second frequency different than the first frequency. The first frequency can be higher than the second frequency. Alternatively, the second frequency can be higher than the first frequency. Alternatively, the first and second frequencies can be substantially equal to each other.

Figure 13A:
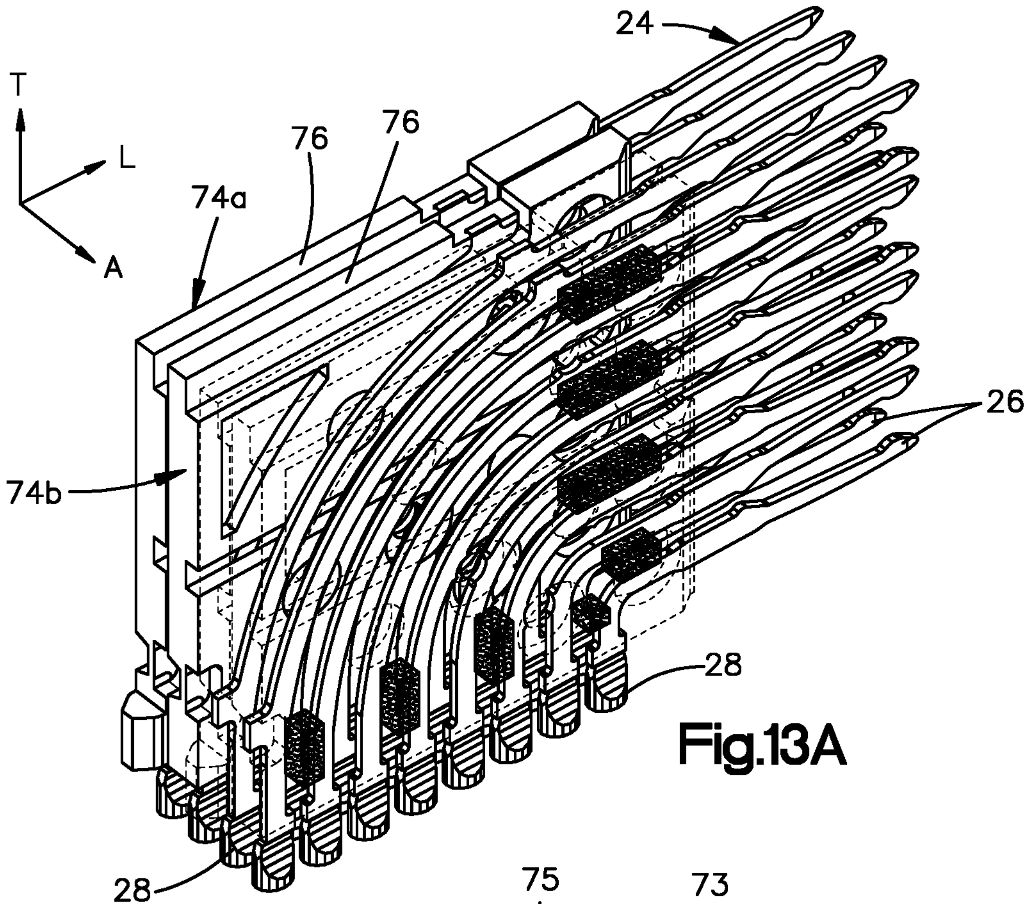
FIG. 13A is a perspective view of a plurality of leadframe assemblies of an electrical connector, including lossy material in one example.
Figure 13B:
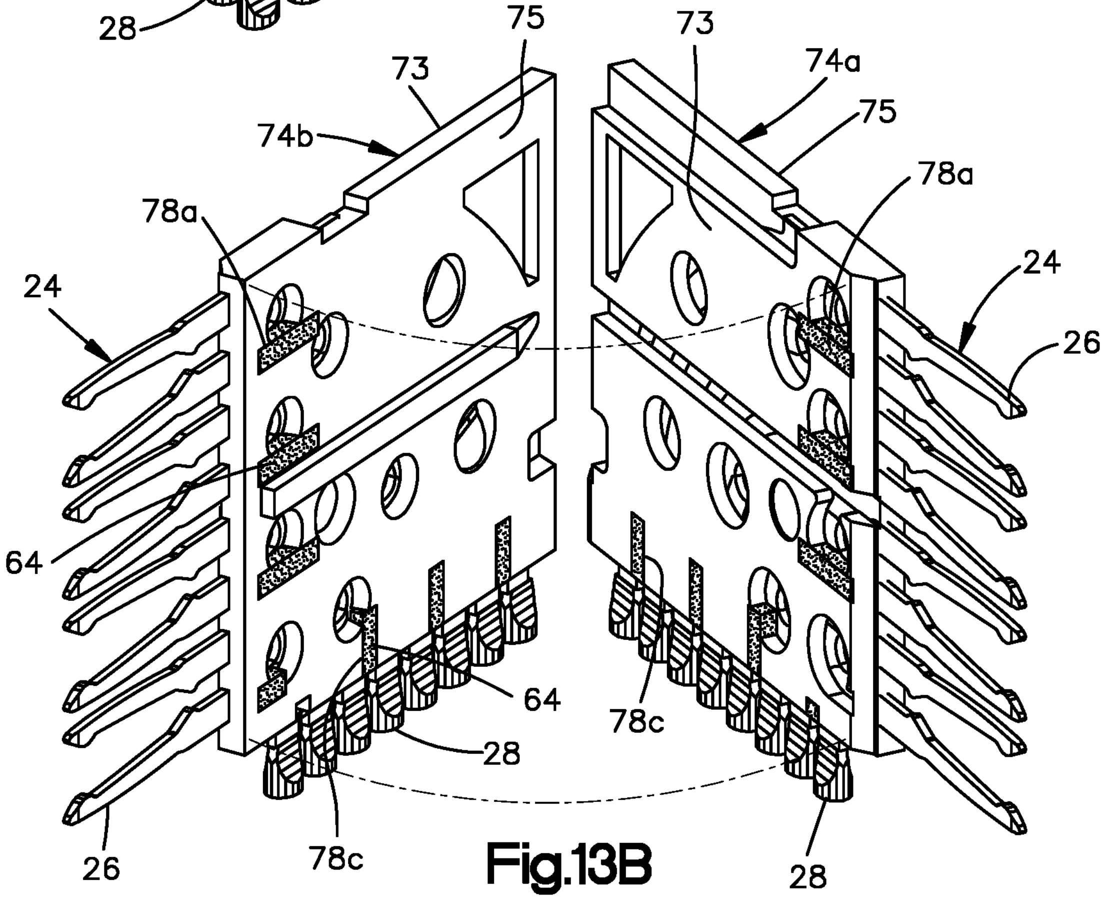
FIG. 13B is an end elevation view of one of the leadframe assemblies illustrated in FIG. 13A.

Referring now to FIGS. 13A-13B, first and second leadframe assemblies 74*a* and 74*b* can be positioned adjacent each other in the connector housing. The voids 78 are positioned at different locations in FIGS. 13A-13B with respect to the voids in FIGS. 12A-12B to illustrated that the voids 78 can be disposed at any suitable location as desired. For instance, the leadframe housings 76 can include lower voids 78*c* that are disposed proximate the mounting interface, whereas the front voids 78*a* can be disposed proximate the mating interface. Thus, the lower voids 78*c* can be elongate along the transverse direction T. Further, the lower voids 78*c* can be aligned along the lateral direction A with portions of respective ones of the electrical contacts 24 that are supported by the leadframe housing 76, the portions oriented along the transverse direction T. The first side surface 73 of the leadframe housing 76 of the first leadframe assembly 74*a* can face the second side surface 75 of the leadframe housing 76 of the second leadframe assembly 74*b* along the lateral direction A.

In one example, the voids 78 in the first side surface 73 of the first leadframe assembly 74*a* can be aligned with the voids 78 in the second side surface 75 of the second leadframe assembly 74*b* along the lateral direction A. Thus, when the lossy material 64 is disposed in the voids 78, the lossy material 64 carried by the leadframe housing 76 of the first leadframe assembly 74*a* can face the lossy material 64 carried by the leadframe housing 76 of the second leadframe assembly 74*b*. In some examples, the lossy material 64 carried by the leadframe housing 76 of the first leadframe assembly 74*a* can be aligned in its entirety with the lossy material 64 carried by the leadframe housing 76 of the second leadframe assembly 74*b*. For instance, the lossy material 64 carried by the leadframe housing 76 of the first leadframe assembly 74*a* can abut the lossy material 64 carried by the leadframe housing 76 of the second leadframe assembly 74*b*. Alternatively, the lossy material 64 carried by the leadframe housing 76 of the first leadframe assembly 74*a* can be spaced from the lossy material 64 carried by the leadframe housing 76 of the second leadframe assembly 74*b* along the lateral direction A.

Referring now to FIGS. 14A-16C generally, an electrical connector in another example can be configured as an edge card connector 80. In this regard, it should be appreciated that any suitably constructed electrical connector can include the lossy material 64 in any manner described herein. Further, the placement of the lossy material 80 described in accordance with any examples herein can be incorporated into any other examples unless otherwise indicated.

Referring now to FIGS. 14A-14D in particular, the edge card connector 80 can include an electrically insulative connector housing 82 including a housing body 83 and a plurality of electrical contacts 84 supported by the housing body 83, and thus the connector housing 82. The electrical contacts 84 can include electrical signal contacts 86. The electrical contacts 84 can further include electrical ground contacts 88. In one example, the edge card connector 80 can include a plurality of leadframe assemblies 112 that each includes a leadframe housing 114 and respective ones of the electrical contacts 84 supported by the leadframe housing 114. Thus, the electrical contacts 84 can be supported by the respective leadframe housing 114 that, in turn, is supported by the housing body 83, and thus the connector housing 82. In this regard, it can be said that the electrical contacts 84 are indirectly supported by the housing body 83, and thus the connector housing 82. Alternatively, the edge card connector 80 can be devoid of the leadframe assemblies 112, such that the electrical contacts 84 can be supported directly by the connector housing 82.

The electrical contacts 84 can define respective mounting ends 28 that are configured to mount to a first complementary electrical component in the manner described above. The electrical contacts 84 can further include mating ends 26 that are configured to mate with a second complementary electrical device in the manner described above. The connector housing can define a mounting interface 100 and a mating interface 102 of the type described above. The edge card connector 80 can be configured as a vertical connector whereby the mounting ends 28 and the mating ends are oriented substantially parallel to each other. Alternatively, the edge card connector 80 can be configured as a right-angle connector whereby the mounting ends 28 and the mating ends are oriented substantially perpendicular to each other. The electrical contacts 84 can each define the wiping surface 34, the first and second surfaces 36 and 38 that define broadsides 40, can define the respective edges 42, the concavity 44, the convexity 46, and the tip 29 as described above with respect to the electrical contacts 24 of the electrical connector 20.

In one example, the electrical contacts 84 can be spaced from each other along at least one row 97 that can be oriented along the longitudinal direction L. The mounting ends 28 and the mating ends can be opposite each other along the longitudinal direction L. While the edge card connector 80 is shown as including one row of electrical contacts 84, it should be appreciated that the edge card connector 80 can include multiple rows of electrical contacts spaced from each other along the transverse direction T.

The mounting ends 28 can be configured to be mounted to a first electrical device such as a first substrate as described above. The mating ends 26 can be configured to mate with a second electrical device, such as a card that can be received by the mating ends 26 so as to place the edge card connector 80 in electrical communication with the second electrical device. Thus, the edge card connector 80 can place the first and second electrical devices in electrical communication with each other in the manner described above. Although FIGS. 14A-16C show examples of the edge card connector 80 and portions thereof, it should be appreciated that any suitable electrical connector can be used.

In one example, the housing body 83, and thus the connector housing 82, can include a base 104 and a wall 106 that extends out from the base 104 along the longitudinal direction L. The wall 106 can define the mating interface 102 of the edge card connector 80. The housing body 83 can further include a plurality of divider walls 108 that define respective cavities 110. The cavities 110 can, in turn, receive the mating end 26 of at least one of the electrical contacts 84. The divider walls 108 can be spaced from each other along the lateral direction A, and can extend from the wall 106 along the transverse direction T. The wall 106, and thus the connector housing 82, can further include lateral outer side walls 109 that are opposite each other, and cooperate with laterally outermost ones of the divider walls 108 so as to define the laterally outermost cavities 110. The cavities 110 can include ground cavities and signal cavities. The ground cavities can receive at least one ground contact 88. In one example, the laterally outermost cavities can be ground cavities. The signal cavities can receive at least one signal contact 86. For instance, the signal cavities can receive respective pairs of signal contacts 86 that define differential signal pairs. The ground cavities can be disposed between adjacent signal cavities, such that the ground contact 88 received therein can be disposed between adjacent differential signal pairs along the row. The signal contacts 86 and the ground contacts 88 can be aligned with each other along the lateral direction A as described above.

The electrical connector can include at least one leadframe assembly 112 that is supported by the connector housing 82. For instance, the at least one leadframe assembly 112 can be supported by the base 104. In one example, the edge card connector 80 includes first and second leadframe assemblies 112, but it should be appreciated that the electrical connector 80 can include any number of leadframe assemblies as desired. Each of the leadframe assemblies 112 can include a leadframe housing 114 and respective ones of the plurality of electrical contacts 84 supported by the leadframe housing 114 in the manner described above. The electrical contacts 84 can be insert molded in the leadframe housing 114, or can be stitched into the leadframe housing 114 as desired. When the leadframe assemblies 112 are supported by the connector housing 80, the respective ones of the electrical contacts 84 can be spaced from each other and aligned with each other along the lateral direction A. Further, the leadframe assemblies 112 can be disposed adjacent each other along the lateral direction A. Thus, the electrical contacts 84 of a first one of the leadframe assemblies 112 can be aligned with the electrical contacts of a second one of the leadframe assemblies 112 along the lateral direction A.

Each of the leadframe assemblies 112 can include at least a pair of signal contacts 86 disposed adjacent each other. The adjacent signal contacts 86 can define a differential signal pair. Alternatively, the signal contacts 86 can be single ended. Each of the leadframe assemblies 112 can further include at least one ground contact 88 positioned adjacent the differential signal pair. For instance, each of the leadframe assemblies 112 can include a pair of ground contacts 88 disposed such that the differential signal pair is disposed between the ground contacts 88 along the lateral direction. Thus, when the leadframe assemblies 112 are positioned adjacent each other, the card edge connector 80 can include a pair of ground contacts disposed between adjacent differential signal pairs along the lateral direction (S-S-G-G-S-S, wherein “G” represents a ground contact and S represents a signal contact). It should be appreciated that the electrical contacts of all electrical connectors described herein can define this this or any alternative contact pattern of electrical signals as described. For instance, the contact pattern can include G-S-G-S or S-S-G-S-S as examples. Alternatively, the edge card connector 80 can be devoid of ground contacts if desired. The edge card connector 80 can include the insert 57 of the type described above with respect to FIGS. 8A-9F.

As will now be described with respect to FIGS. 14A-16C, the edge card connector 80 can include the lossy material 64 at any one or more of a number of suitable locations. For instance, as is the case with the electrical connector 20 described above, the lossy material 64 can be carried by at least one or more up to all of the housing body, one or more of the signal contacts, one or more of the ground contacts, and the leadframe housing. The lossy material 84 can be magnetically absorbing and electrically non-conductive in the manner described above, in one example.

Referring now to FIGS. 14A-14D in particular, the lossy material 64 can be disposed on the tip 29 of at least one electrical contact 84 of the electrical contacts 84. For example, the lossy material 64 can be configured as a cap 113 that is disposed on the respective tip 29 of the at least one electrical contact 84. In one example, the lossy material 64 can be molded onto the electrical contact. Alternatively, the tip 29 can be press-fit into an opening of the cap defined by the lossy material. Alternatively still, the lossy material 64 can be adhesively attached to the electrical contact 24. Alternatively still, the lossy material 64 can be sprayed onto the electrical contact 24. Alternatively still, the electrical contact 24 can be dipped into a liquid bath of the lossy material 64. The lossy material 64 can be disposed on the first surface 36 that is opposite the wiping surface 34. The lossy material 64 can further be disposed on the second surface 38 that define the wiping surface 34. In particular, the lossy material 64 can be disposed distal of the wiping surface 34. Thus, the lossy material can be disposed on the broadsides 40 of the at least one electrical contact 84. Alternatively or additionally, the lossy material 64 can further be disposed on one or both of the edges 42. In one example, the lossy material 64 can be disposed on the distal-most surface of the at least one electrical contact 84.

The lossy material 64 can surround at least three sides of at least a portion up to an entirety of the tip 29 along a plane that is oriented normal to the tip. The plane can alternatively be oriented along the lateral direction A and the transverse direction T. The three sides can be defined by one or both of the broadsides 40 and the edges 38. The broadsides 40 and edges 38 can similarly be defined along a plane that is oriented along the lateral direction A and the transverse direction T. Alternatively, the lossy material 64 can surround all four sides of the at least one electrical contact 84, including both broadsides 40 and both edges 38. However, other arrangements are also possible. For example, the lossy material 64 can be positioned along one, two, three or four sides of the at least one electrical contact 84. Further, the lossy material 64 can encapsulate the tip 29, as it can be disposed on an entirety of the distal-most surface of the electrical contact 84. By placing the lossy material 64 at the tip 29, distal with respect to the wiping surface 34 of the at least one electrical contact 84, the lossy material 64, in addition to reducing the stub effect discussed above, does not mechanically interfere with the mating of the at least one electrical contact 84 to a complementary electrical contact.

Alternatively or additionally, the lossy material 64 can be disposed on a base 35 of the at least one electrical contact 84. The base 35 of the electrical contacts can be supported by, aligned with or disposed in the leadframe housing 114. The base 35 can be included in the intermediate portion of the electrical contact. The mounting end 28 can extend out from the base 35 along the transverse direction toward the complementary first electrical device. In one example, the lossy material 64 can extend along both the broadsides 40 and the edges 42 of at least a portion of the base 35. In this regard, the lossy material 64 be configured as a collar 115 that can at least partially or entirely surround the electrical contacts at the base 35 or any suitable alternative location. Thus, the lossy material 64 can surround the base 35 in a plane that is oriented normal to the base 35. The lossy material 64 that is disposed on the base 35 can be localized only at the base 35, and thus does not extend along the transverse direction to a location that is not disposed in the leadframe housing 114. Alternatively, the lossy material 64 that is disposed on the base 35 can further extend outside the leadframe housing 114. It should be appreciated, however, that the lossy material 64 can be disposed at any suitable position of the at least one electrical contact 84 up to an entirety of the at least one electrical contact 84 as desired. When the electrical contacts 24 are supported directly by a connector housing, the lossy material 64 at the base 35 can be localized to a location, and thus does not extend to a location that outside the connector housing. Alternatively, the lossy material 64 that is disposed on the base 35 can further extend outside the connector housing.

In one example, the at least one electrical contact 84 that includes the lossy material 64 can be defined by at least one ground contact 88. For instance, the at least one electrical contact 84 can be defined by a plurality of ground contacts 88. In particular, the at least one electrical contact 84 can be defined by all of the ground contacts 88. By placing lossy material 64 on the ground contacts 84 instead of the signal contacts 86, there is less attenuation of the desired signal frequency. Alternatively or additionally, the at least one electrical contact 84 can be defined by at least one signal contact 86. For instance, the at least one electrical contact 84 can be defined by a plurality of signal contacts 86. In particular, the at least one electrical contact 84 can be defined by all of the signal contacts 86. Placing lossy material at the base 35 of the ground or signal contacts can help absorb unwanted frequencies near the mounting interface 100, as it is recognized that substrate footprints can be electrically noisy.

The lossy material 64 can have attenuation properties that can be tuned to attenuate a select frequency, within a range of plus or minus 5 GHz in the manner described above. For instance, the lossy material 64 can be configured to attenuate a resonant frequency of the electrical connector and all connectors disclosed herein without attenuating frequencies substantially outside of the resonant frequency (for instance, outside of plus or minus 5 GHz of the resonant frequency). It should be appreciated, of course, that the lossy material 64 can be configured to attenuate other frequencies as desired. The lossy material 64 can further be tuned to attenuate a band of frequencies broader than 10 GHz. The broader band of frequencies can range up to substantially 50 GHz, such as substantially 40 GHz, for instance, substantially 30 GHz, and in one example substantially 20 GHz. Further, the lossy material 64 can be disposed at different locations of the electrical connector and all connectors disclosed herein, for instance as illustrated at FIGS. 14A-16C. Thus, the lossy material can be tuned to attenuate different frequencies at different locations of the electrical connector and all electrical connectors disclosed herein. The attenuated frequencies different can be any frequency disclosed herein.

Figure 15:
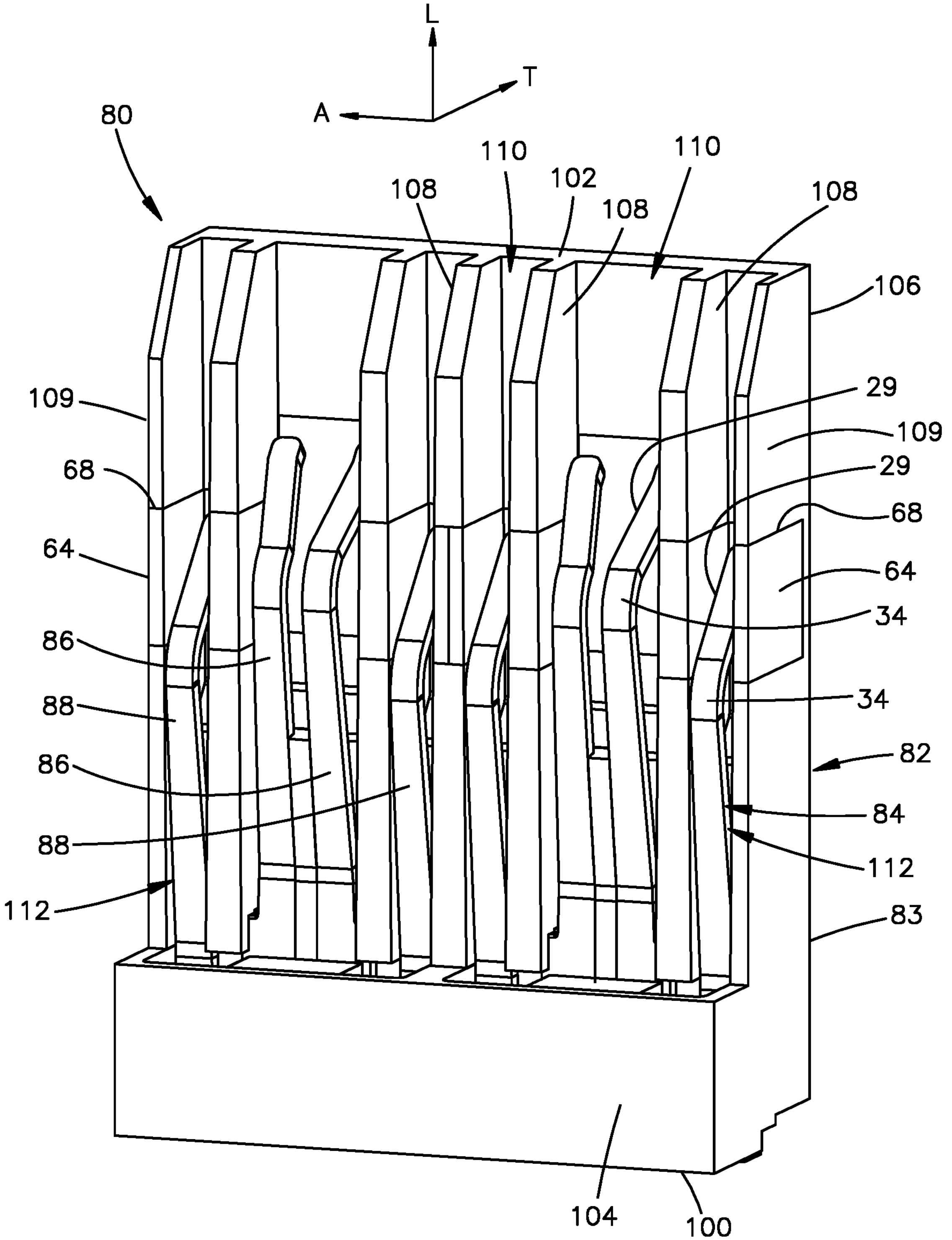
FIG. 15 is a perspective view of an edge card connector with lossy materials disposed on the connector housing in another example.

Referring now to FIG. 15, the connector housing 82 can include the lossy material 64. For instance, the connector housing 82 can define at least one void 68 that extends at least into or through the housing body 83, that contains the lossy material 64. The at least one void can include a plurality of voids 68. Alternatively or additionally, the lossy material 64 can be disposed on an outer surface of the housing body 83. The voids 68 can be aligned with the tips 29 of the ground contacts 88 along the lateral direction A. In this regard, it should be appreciated that the tips 29 of the signal contacts 86 can be offset with respect to the tips 29 of the ground contacts 88 in the mating direction. Thus, the voids 68 and the lossy material 64 can be offset from the tips 29 of the signal contacts 86 along the longitudinal direction. Thus, a straight line oriented along the lateral direction A that passes the voids 68, and thus the lossy material 64, can also pass through the tips 29 of the ground contacts 88 but does not pass through the tips 29 of the signal contacts 86. Alternatively, the tips 29 of the signal contacts 86 can be aligned with the tips 29 of the ground contacts 88 along the lateral direction A. The voids 68 can extend through at least one or more up to all of the divider walls 108 and the outer side walls 109.

Figure 16A:
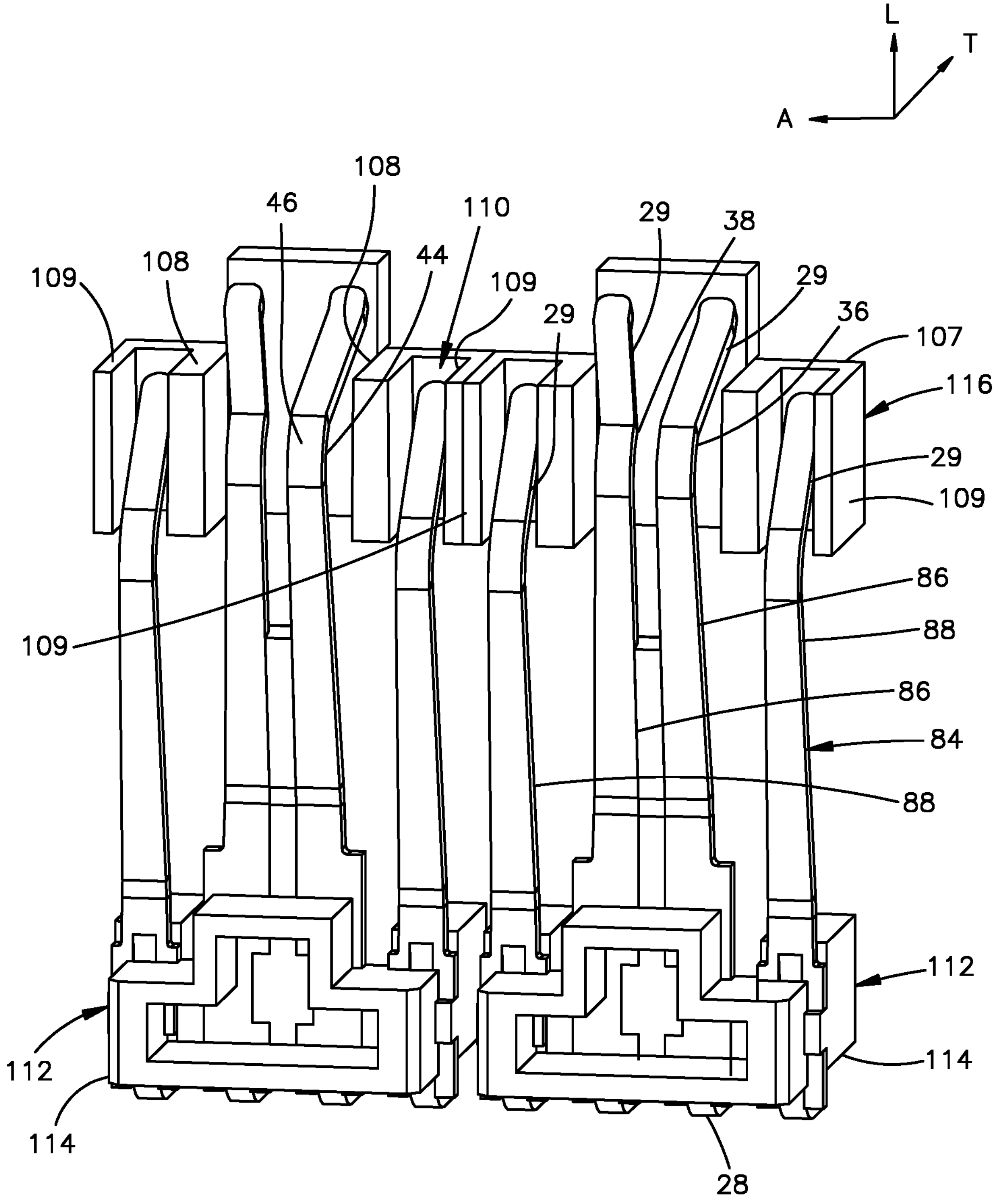
FIG. 16A is a perspective view of a portion of the edge card connector illustrated in FIG. 15, but with lossy materials disposed at other locations.
Figure 16B:
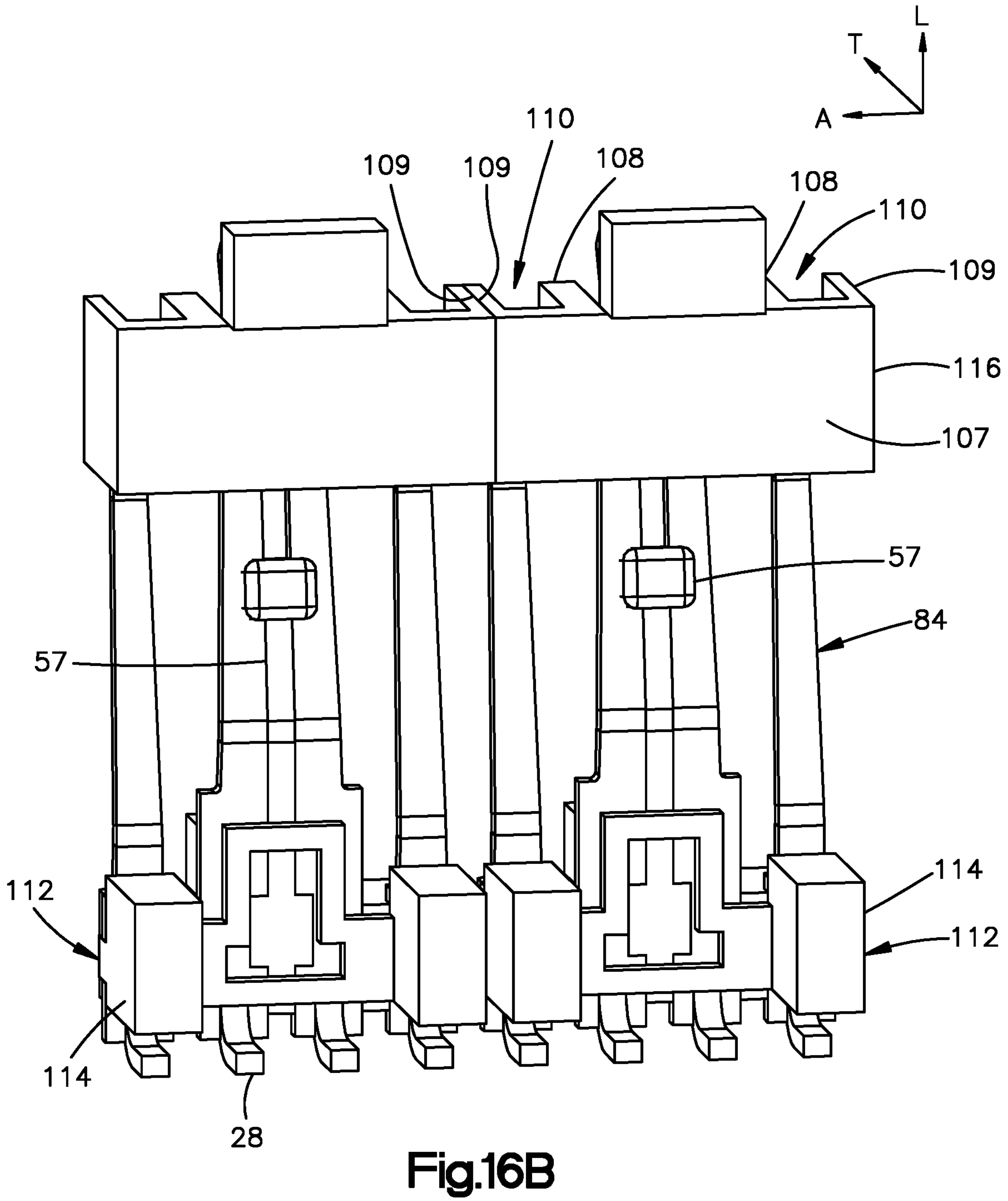
FIG. 16B is another perspective view the edge card connector illustrated in FIG. 16A.
Figure 16C:
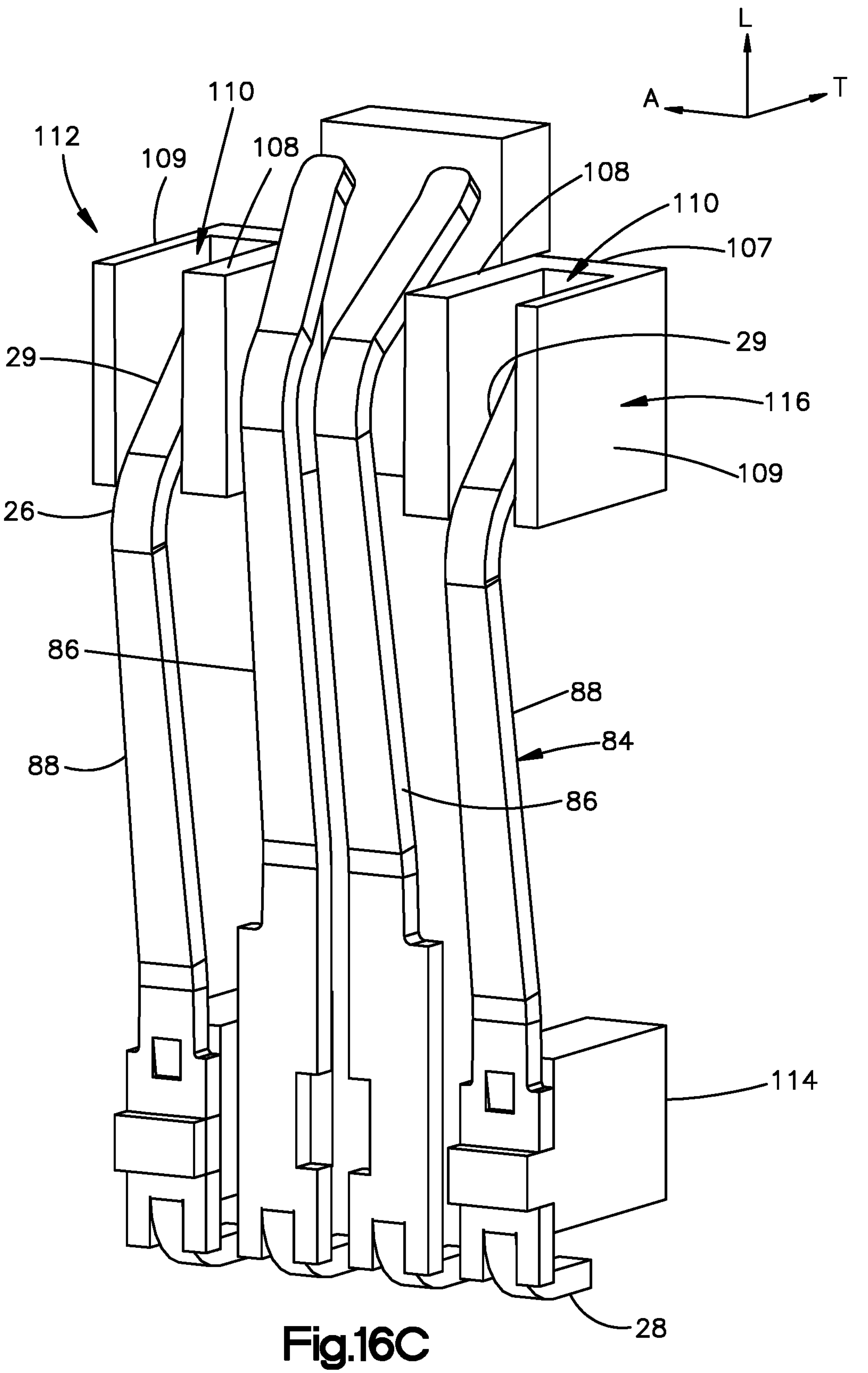
FIG. 16C is a perspective view a select portion of the edge card connector illustrated in FIG. 16A.

Referring now to FIGS. 16A-16C, the electrical connector can include an attenuation wall 116 that can be made of the lossy material 64, or can define pockets that include the lossy material 64. The attenuation wall 116 can be aligned with the tips 29 of either or both the electrical signal contacts 86 and the electrical ground contacts 88 along the transverse direction T. For instance, the attenuation wall 116 can face the first surface 36 of the ground contacts 88 that is opposite the wiping surface 34 of the ground contacts 88. Because the mating ends of some of the signal contacts 86 can be mirror images of others of the signal contacts 86, the attenuation wall 116 can face the first surface 36 of some of the signal contacts 86 and the second surface 38 of others of the signal contacts 86. In one example, the attenuation wall 116 can be localized, and thus does not extend past the concavities 44 and convexities 46 of the electrical contacts 84 toward the mounting ends 28 in this example. The attenuation wall 116 can include a back wall 107, and divider walls 108 and lateral outer side walls 109 of the type described above with respect to the connector housing 82 that extend from the back wall 107 so as to define the respective cavities 110. At least one or more up to all of the divider walls 108 and lateral outer side walls 109 can be aligned with the tips 29 of the signal contacts 86 and ground contacts 88 along the lateral direction A. Thus, a portion of the attenuation wall 116 can further be aligned with the tips 29 of the signal contacts 86 and ground contacts 88 along the lateral direction A. The attenuation wall 116 can be separate from the housing body 83, or can be supported by the housing body 83 as desired.

Figure 17:
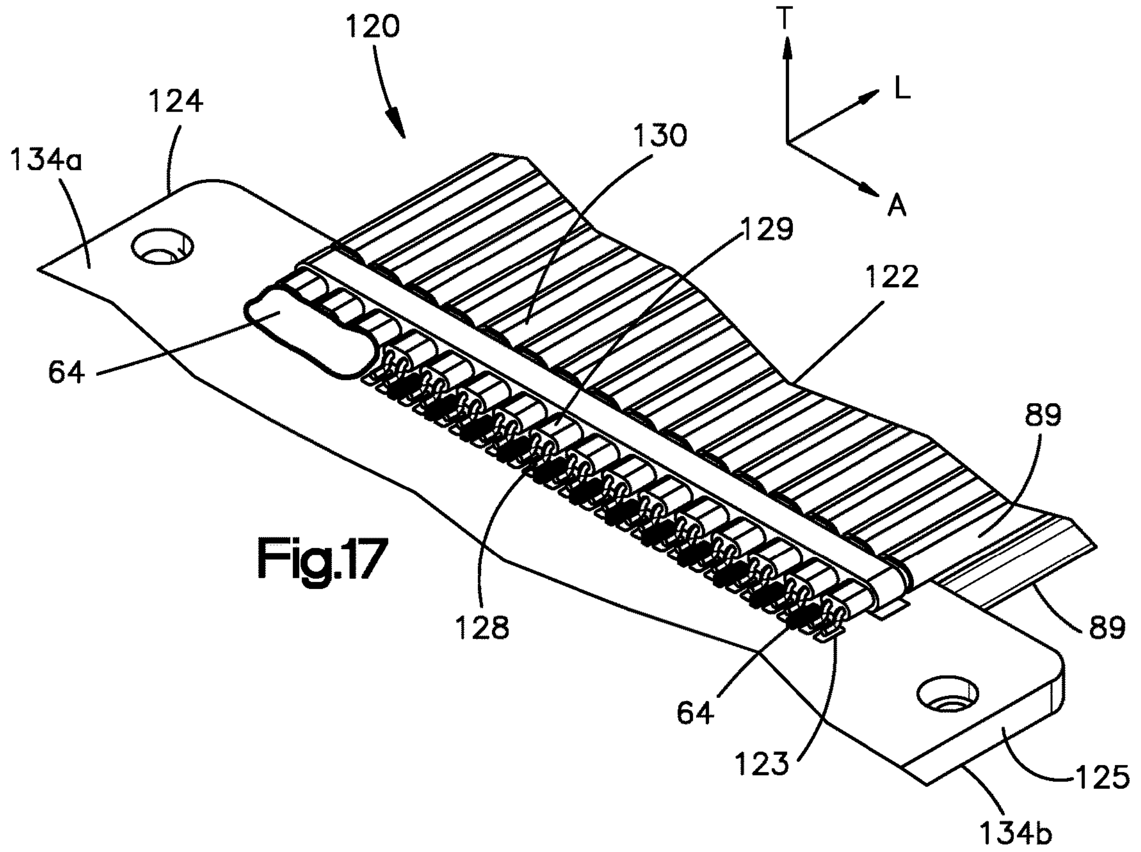
FIG. 17 is a perspective view of a portion of a data communication assembly, showing cable terminations with lossy material according to one example.
Figure 18:
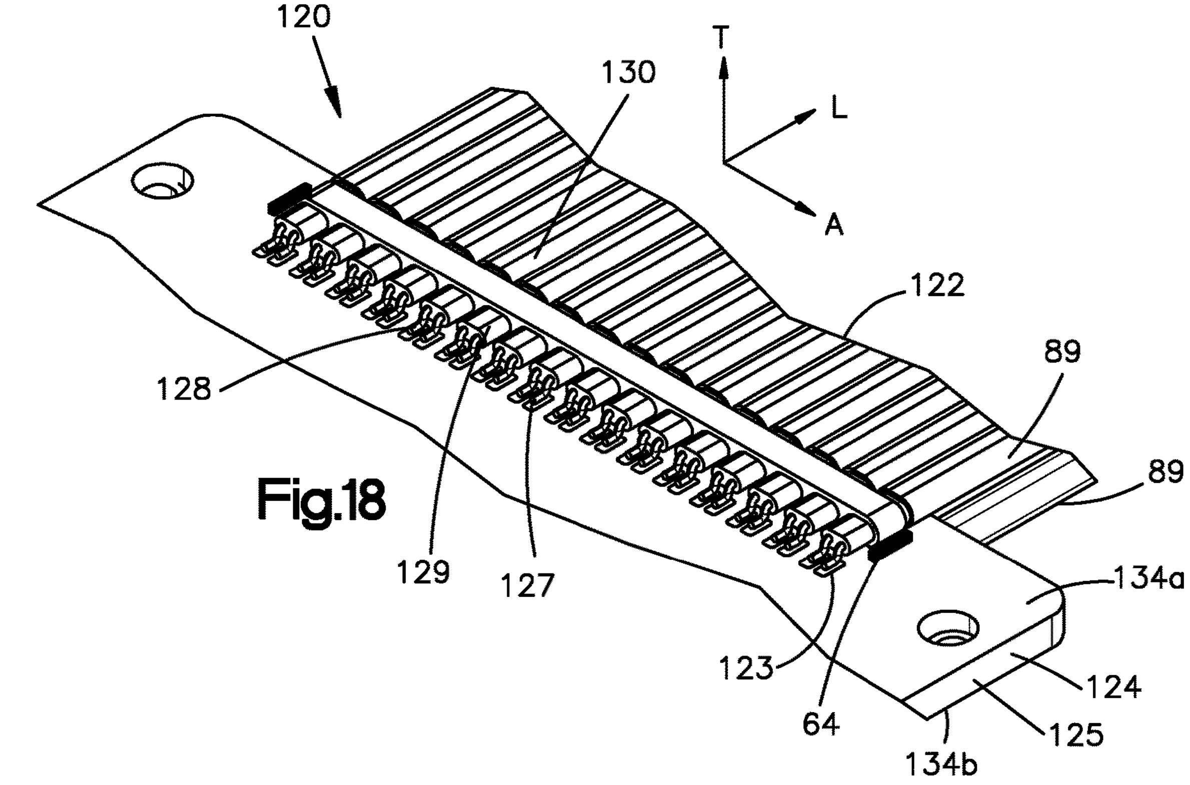
FIG. 18 is a perspective view of the portion of the data communication assembly illustrated in FIG. 17, but showing cable terminations with lossy material according to another example.
Figure 19A:
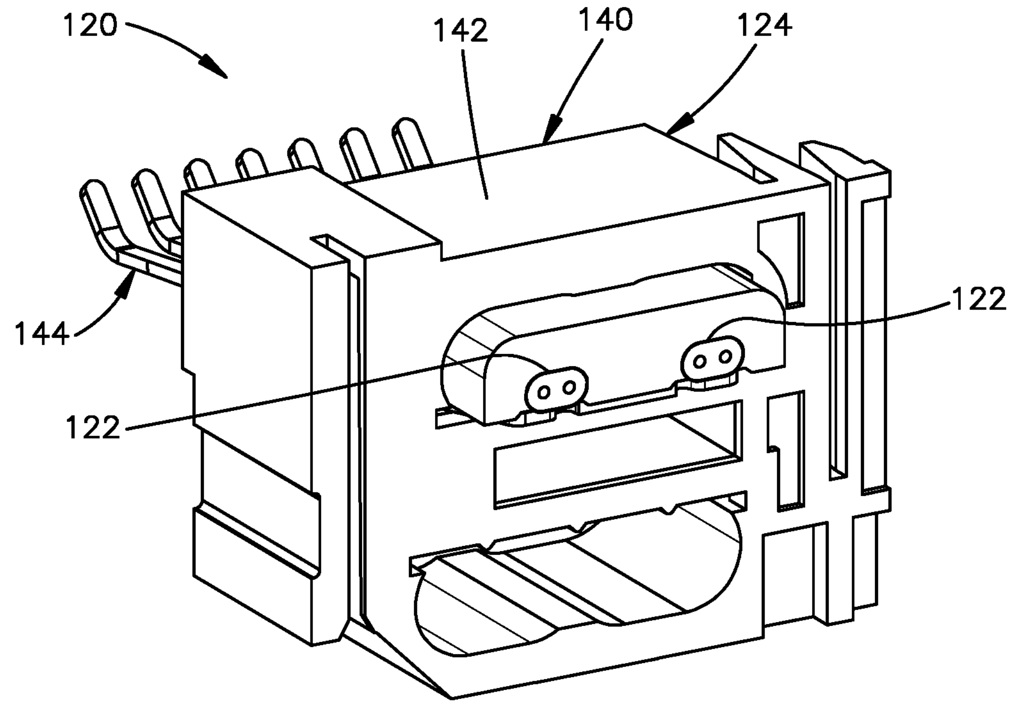
FIG. 19A is a perspective view of an electrical cable connector including lossy material that provides strain relief in accordance with one example.
Figure 19B:
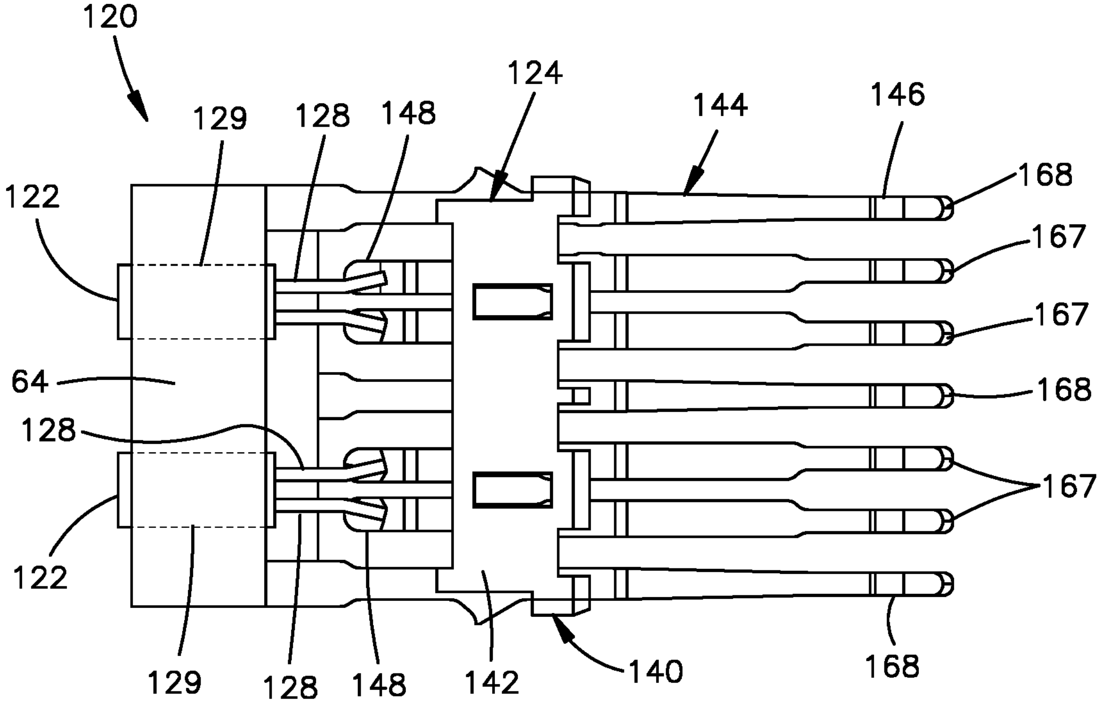
FIG. 19B is a top plan view of a data communication assembly including the electrical cable connector illustrated in FIG. 19A, showing the electrical cables mounted to a substrate.

Referring now to FIGS. 17-18, a data communication assembly can be configured as an electrical cable assembly 120 in one example. The electrical cable assembly 120 can include at least one electrical cable 122 such as a plurality of electrical cables 122, and a complementary electrical device 124. The electrical cables 122 can be mounted to respective electrical contacts that can be configured as electrical contact pads of the electrical device 124. In one example, the electrical device 124 can be defined by a substrate 125, which can be configured as a printed circuit board. It will be appreciated from the description below, however, that the electrical device 124 can be alternatively configured as any suitable electrical device. For instance, the electrical device can be configured as an electrical connector.

The electrical cables 122 can be twinaxial cables that include first and second electrical signal conductors 128 surrounded by a common outer electrically insulative jacket 130. The first and second electrical signal conductors 128 can be disposed in a respective inner electrical insulator and thus electrically insulated from each other inside the outer electrically insulative jacket 130. Further, the first and second electrical signal conductors 128 can define differential signal pairs in one example. The twinaxial cables can further define an electrical shield 129 that is disposed between the inner electrical insulators 127 and the outer electrically insulative jacket 130. Alternatively, the electrical cables 122 can be configured as coaxial cables that include a single electrical conductor surrounded by an outer electrically insulative jacket. Exposed portions of the electrical shields 129 can extend out from the outer electrical insulative jacket 130 along the longitudinal direction L, and can terminate at respective ground contact pads 131 of the substrate 125. Exposed portions of the electrical signal conductors 128 can extend out with respect to the electrical shields 129 along the longitudinal direction L, and can be mounted onto respective electrical contact pads 133 of the substrate 125. The exposed signal conductors 128 can be aligned with each other along the lateral direction A.

The cable assembly 120 can include lossy material 64. For instance, as illustrated in FIG. 17, the electrically nonconductive lossy material 64 can cover the exposed portions of one or more up to all of the electrical signal conductors 128. Thus, the electrically nonconductive lossy material 64 can be disposed on the substrate 125, and can cover the electrical contact pads 93 and at least a portion up to a substantial entirety the exposed portions of the respective electrical signal conductors 128. Alternatively or additionally, the lossy material 64 can be disposed between adjacent pairs of first and second electrical signal conductors 128. The lossy material 64 can be spaced from the exposed portions of the electrical signal conductors 128 and the respective contact pads 123, and can thus be electrically conductive or electrically nonconductive. Alternatively, the lossy material 64 can contact one or more of the exposed portions of the electrical conductors 88 and/or the electrical contact pads 123, in which case it can be desirable for the lossy material 64 to be electrically nonconductive. In one example, the lossy material 64 can be arranged in strips that are disposed between respective pairs of first and second electrical signal conductors 128 along the lateral direction A. Further, the strips can be aligned with the exposed portions of the electrical signal conductors 128 along the lateral direction.

The electrical cables 122 can be configured as at least one cable ribbon 89 mounted onto at least one surface of the substrate 125. In particular, the substrate 125 can define first and second opposed surfaces 134*a* and 134*b* that are opposite each other along the transverse direction T. A first one of the cable ribbons 129 can be mounted to the first surface 134*a*, and a second one of the cable ribbons 129 can be mounted to the second surface 134*a*. As illustrated in FIG. 18, the lossy material 64 can alternatively or additionally be disposed on one or both of the first and second surfaces 134*a* and 134*b* so as to be positioned between the substrate 125 and the cable ribbon 129 that is mounted to the respective one or both of the first and second surfaces 134*a* and 134*b*. For instance, the lossy material 64 can be elongated along the lateral direction A, and can span at least a portion up to an entirety of the width of the respective at least one cable ribbon 129 along the lateral direction A. Without being bound by theory, it is believed that the lossy material illustrated in FIGS. 17-18 can reduce crosstalk during operation of the electrical cable assembly 120.

Referring now to FIGS. 19A-20B, and as described above, the electrical cable assembly 120 in one example can include the at least one electrical cable 122 such as a plurality of electrical cables 122, and the complementary electrical device 124. The complementary electrical device 124 can be configured as an electrical connector 140, which can also be referred to as a cable connector.

The electrical connector 140 can include an electrically insulative connector housing 142 and a plurality of electrical contacts 144 that are supported by the connector housing 142. In one example, the electrical contacts 144 can be press-fit or otherwise mechanically attached to the connector housing 142. Alternatively, the electrical contacts 144 can be insert molded in the connector housing 142. Alternatively still, the electrical contacts 144 can be supported by at respective at least one leadframe housing of a leadframe assembly, that is in turn supported by the connector housing 142 in the manner described above. Each of the electrical contacts 144 can define a mating end 146 and a mounting end 148 opposite the mating end 146. The mounting ends 148 can be configured to be mounted to a first electrical device, which can be configured as the at least one electrical cable such as a plurality of electrical cables 122.

The electrical contacts 144 can include electrical signal contacts 167 and ground contacts 168. Adjacent ones of the electrical signal contacts 167 along a respective row 152 can define differential signal pairs. The electrical contacts 144 can include at least one or more ground contacts 168 between differential signal pairs along the row 152. The mating ends 146 of the electrical contacts 144 can be configured to mate with respective electrical contacts of a second electrical connector when the electrical connector 140 is mated with the second electrical connector.

The mating ends 146 can be configured to mate with respective electrical contacts of a second electrical connector when the electrical connector 140 is mated with the second electrical connector. In particular, the electrical connector 140 can mate with the second electrical connector along a mating direction. The mating ends 146 can define a separable interface with the respective electrical contacts of the second electrical connector. Thus, the electrical connector 140 can unmate from the second electrical connector along an unmating direction that is opposite the mating direction. Both the mating direction and the unmating direction can be oriented along a longitudinal direction L. The mounting ends 148 can be configured to be mounted to a first electrical device, which can be configured as the at least one electrical cable 122 such as a plurality of electrical cables 122.

The electrical cables 122 can be mounted to the electrical connector 140 at a cable termination interface. In one example, the mounting ends 148 of the signal contacts 167 can be configured to be mounted to respective ones of the first and second signal conductors 128 of the electrical cables 122. The mounting ends 148 of the ground contacts 168 can be configured to be mounted to respective electrical shields of the electrical cables 122, or to drain wires if present. In one example, the lossy material 64 can be disposed adjacent the cable termination interface. In one example illustrated in FIGS. 9A-9B, the lossy material 64 can be configured as a strain relief member that is configured to provide strain relief to the signal conductors 128 of the electrical cables 122. The lossy material 64 can cover at least a portion of an overall length of the exposed portion of the electrical shield 129 along with at least a portion of the ground contact 168 to which the exposed portion of the electrical shield is mounted. In this regard, the lossy material can secure the outer insulative jacket 130 to the connector housing. Thus, the lossy material can provide strain relief to the at least one electrical contact. Accordingly, if a tensile force is applied to one or more of the electrical cables 122, the tensile force will be absorbed by the lossy material 64, rather than the connection between the electrical signal conductors 128 and the electrical signal contacts 167. In one example, the lossy material 64 can be molded onto the exposed portion of the electrical shield 129 and the at least a portion of the ground contact 168 to which the exposed portion of the electrical shield is mounted. If desired, the lossy material 64 can alternatively or additionally be configured as described above with respect to FIGS. 17-18.

Figure 20A:
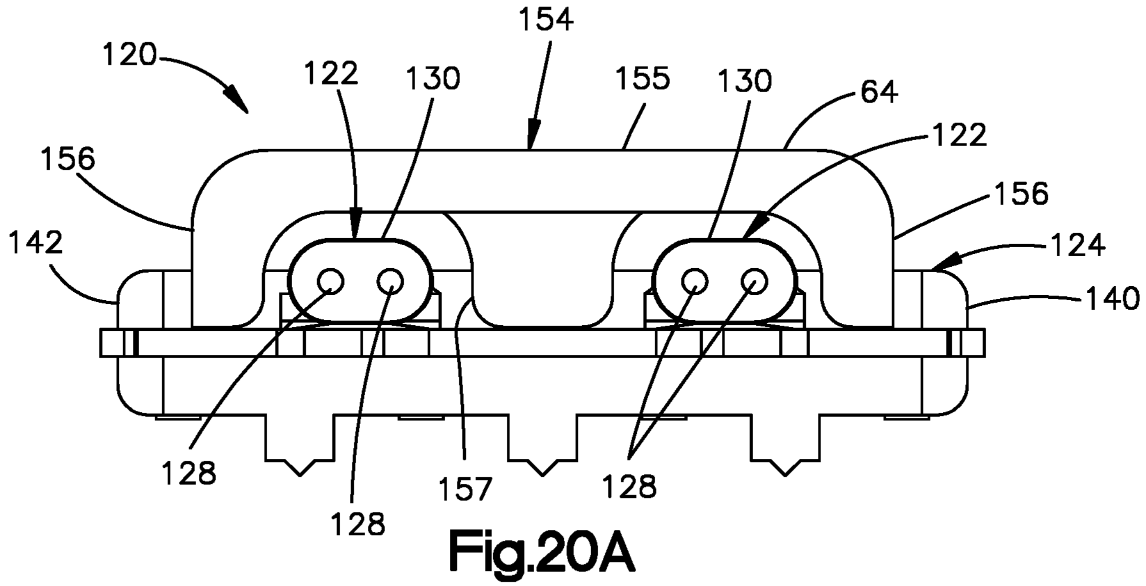
FIG. 20A is an end elevation view of an electrical cable connector including a cover that encapsulates the electrical cables accordance with one example, the housing including a lossy material.
Figure 20B:
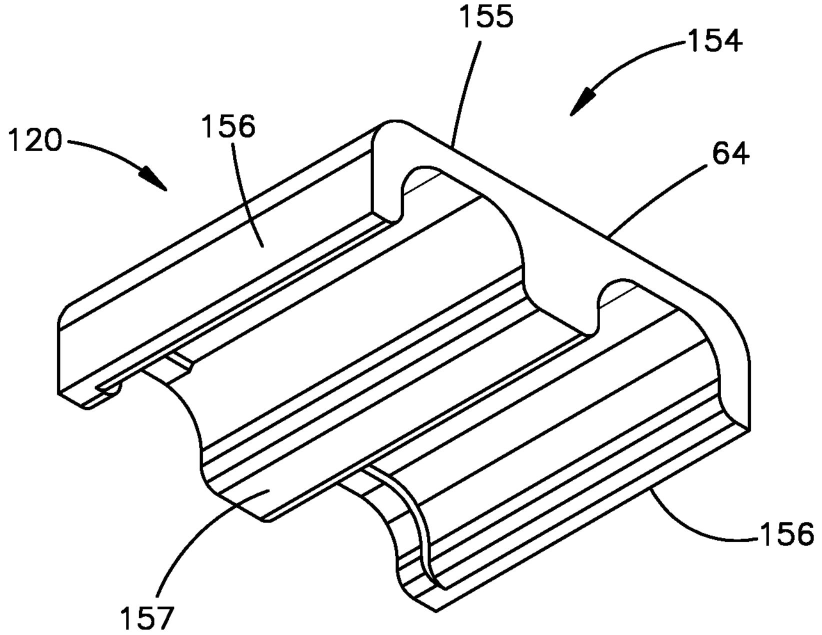
FIG. 20B is a perspective view of the cover illustrated in FIG. 20A.

Referring now to FIGS. 20A-20B, the lossy material 64 can surround one or both of the outer insulative jacket 130, the exposed portion of the electrical shield, and the exposed portions of the electrical signal conductors 128 as desired. In particular, the lossy material 64 can be configured as a protective cover 154 that is configured to be mounted onto the electrical connector. The protective cover 154 can have an upper wall 155, and a pair of opposed side walls 156 that extend down from the upper wall 155 toward the electrical connector 140 when the cover 154 is mounted to the electrical connector 140. The side walls 156 can be opposite each other along the lateral direction A. The cover 154 can further include a divider wall 157 that extends down from the upper wall 155 between the side walls 156. For instance, the divider wall 157 can be equidistantly spaced from the side walls 156 with respect to the lateral direction A. The divider wall 157 can extend along a portion up to an entirety of an overall length of the cover 154 along the longitudinal direction L. The cover 154 can define at least a pair of cavities 158 that extend from the divider wall 177 to the opposed side walls 156, respectively.

During operation, the electrical connector 140 can include the cover 154 mounted thereon, such that the cover 154 cooperates with a portion of the electrical connector to surround one or more up to all of a portion of the outer electrical insulative jacket 130, the exposed portion of the electrical shield, and at least a portion up to an entirety of of the exposed portion of the electrical signal conductors 128 of one or more of the electrical cables 122. For instance, one or more up to all of a portion of the outer electrical insulative jacket 130, the exposed portion of the electrical shield, and at least a portion of the exposed portion of the electrical signal conductors 128 of a first one of the electrical cables 122 can be disposed in a first one of the cavities 158, and one or more up to all of a portion of the outer electrical insulative jacket 130, the exposed portion of the electrical shield, and at least a portion up to an entirety of the exposed portion of the electrical signal conductors 128 of a second one of the electrical cables 122 can be disposed in a second one of the cavities 158. The divider wall 177 can be disposed between adjacent cables 122 mounted to the electrical connector. The cover 154 can be mechanically rigid, and thus configured to provide a mechanical barrier that protects the cable termination interface.

Referring now to FIGS. 21A-24 in general, it is further recognized that near-end cross-talk (NEXT) can be reduced by applying the lossy material to one or more surfaces of an ungrounded electrically conductive substrate of an electrical shield that is disposed between adjacent rows of signal contacts. For instance, the lossy material can be configured to absorb electromagnetic interference that is generated during operation of the electrical connector. It has been found that NEXT can be reduced when the electrically conductive substrate, and thus the electrical shield, is ungrounded (meaning that the no portion of the electrical shield including the electrically conductive substrate is in contact with any electrically grounds of the electrical connector or any grounded electrically conductive structures mated with or mounted to the electrical connector). Further, it has been found that NEXT can be reduced when the electrically conductive substrate, and thus the electrical shield, is not mechanically connected to any other electrically conductive structures of the electrical connector. Of course, it is appreciated that the electrically conductive substrate can alternatively be grounded if desired. However, the ability to reduce NEXT with an ungrounded electrical shield is a surprising result, as ungrounded electrical shields in an electrical connector typically act as antennas that tend to degrade signal integrity, including cross-talk, at data frequencies greater than 5 GHz.

Figure 21B:
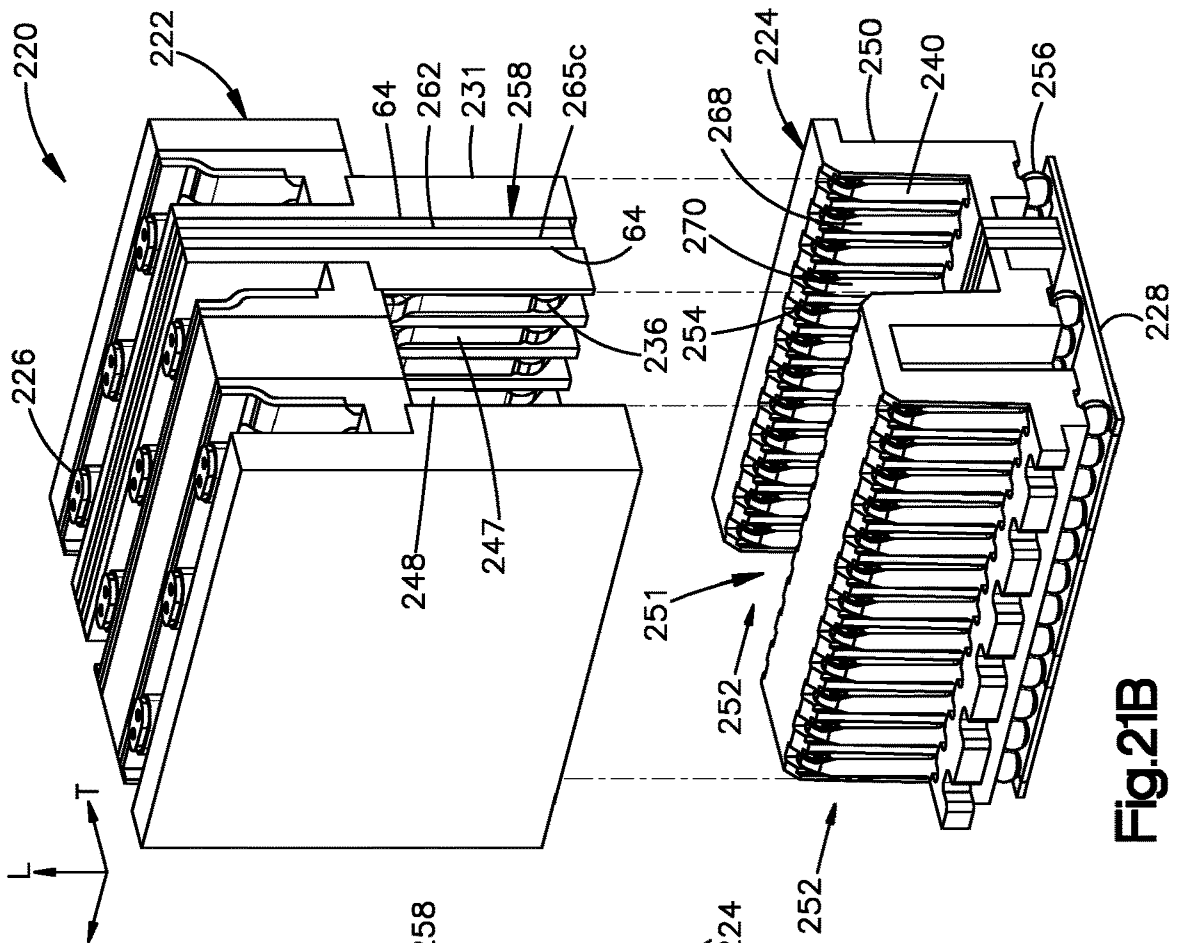
FIG. 21B is an exploded perspective view of the electrical connector assembly illustrated in FIG. 21A.
Figure 21A:
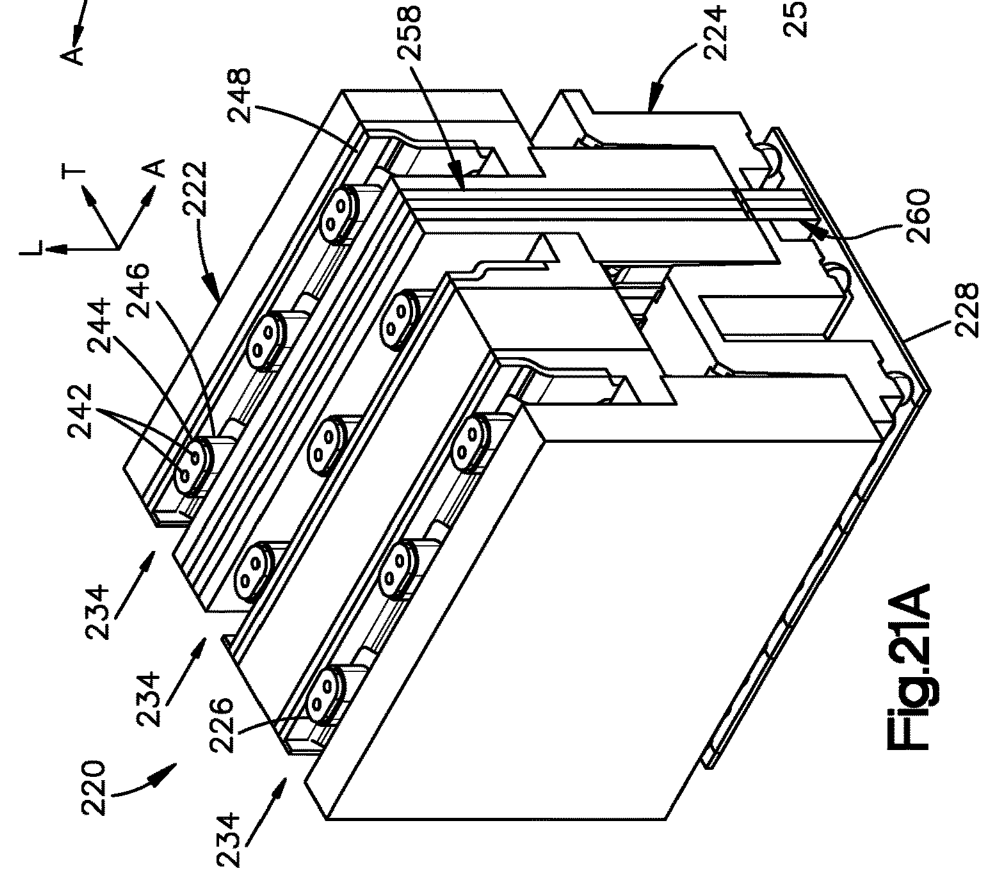
FIG. 21A is a perspective view of an electrical connector assembly including first and second electrical connectors mated to each other and mounted to cables and a substrate, respectively, the first and second electrical connectors including first and second electrical shields, respectively.

Referring now to FIGS. 21A-21B, an electrical connector assembly 220 can include a first electrical connector 222 and a second electrical connector 224 that is configured to be mated to the first electrical connector 222 along the longitudinal direction L, which can define a mating direction. Each of the first and second electrical connectors 222 and 224 can be configured to be mounted to respective first and second electrical devices. For instance, the first electrical connector 222 can be mounted to at least one electrical cable 226 so as to place the first electrical connector 222 in electrical communication with the at least one electrical cable 226. In this regard, the first electrical connector 222 can be referred to as a cable connector. The second electrical connector 224 can be configured to be mounted to an underlying substrate 228 that can be configured as a printed circuit board (PCB). When the first and second electrical connectors 222 and 224 are mounted to the at least one electrical cable 226 and the substrate 228, respectively, the first and second electrical connectors 222 and 224 place the at least one electrical cable 226 and the substrate 228 in electrical communication with each other. Thus, the electrical connector assembly 220 can further include that at least one electrical cable 226 and the substrate 228.

Figure 22:
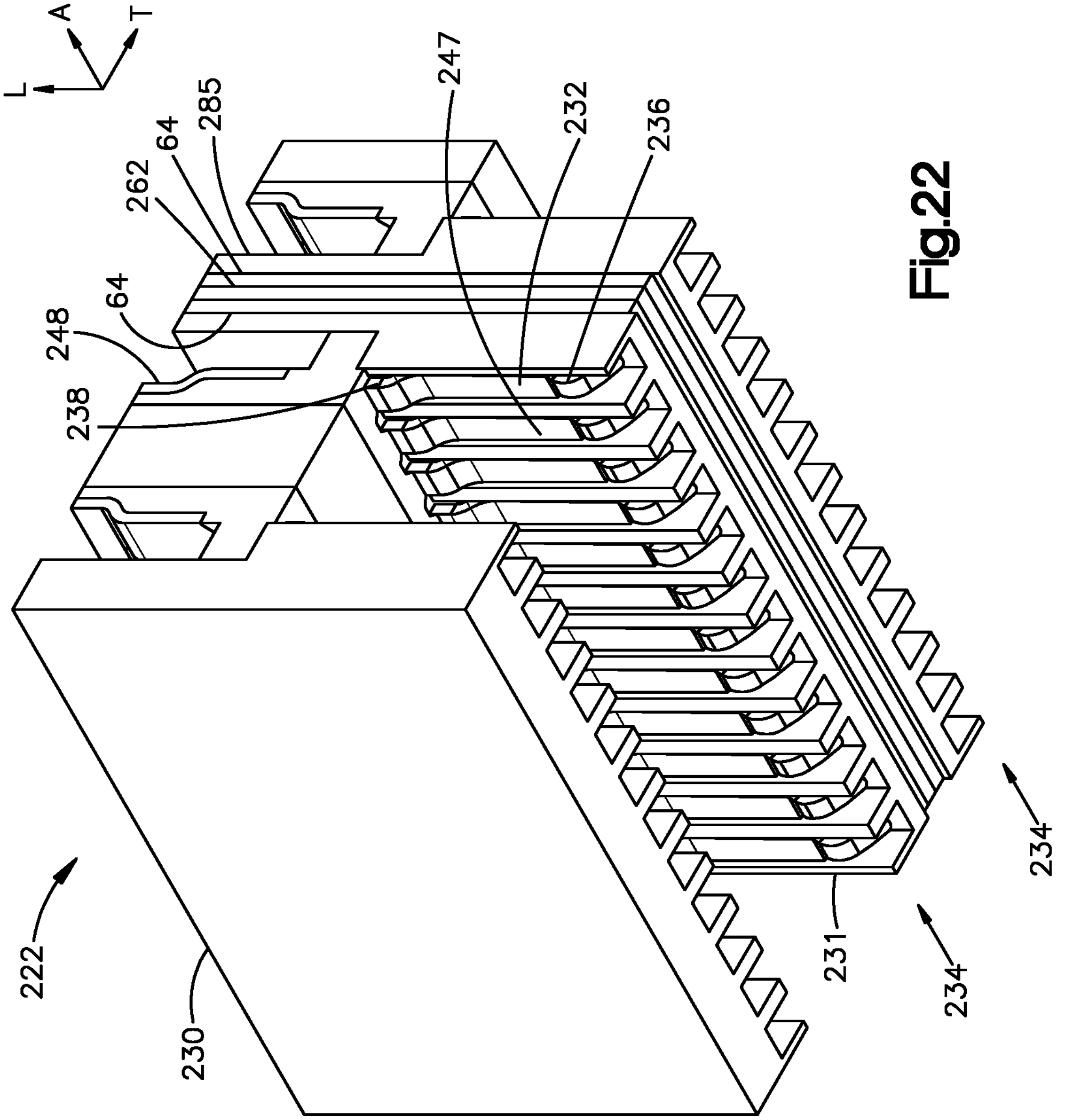
FIG. 22 is a perspective view of the first electrical connector illustrated in FIG. 21A.
Figure 23A:
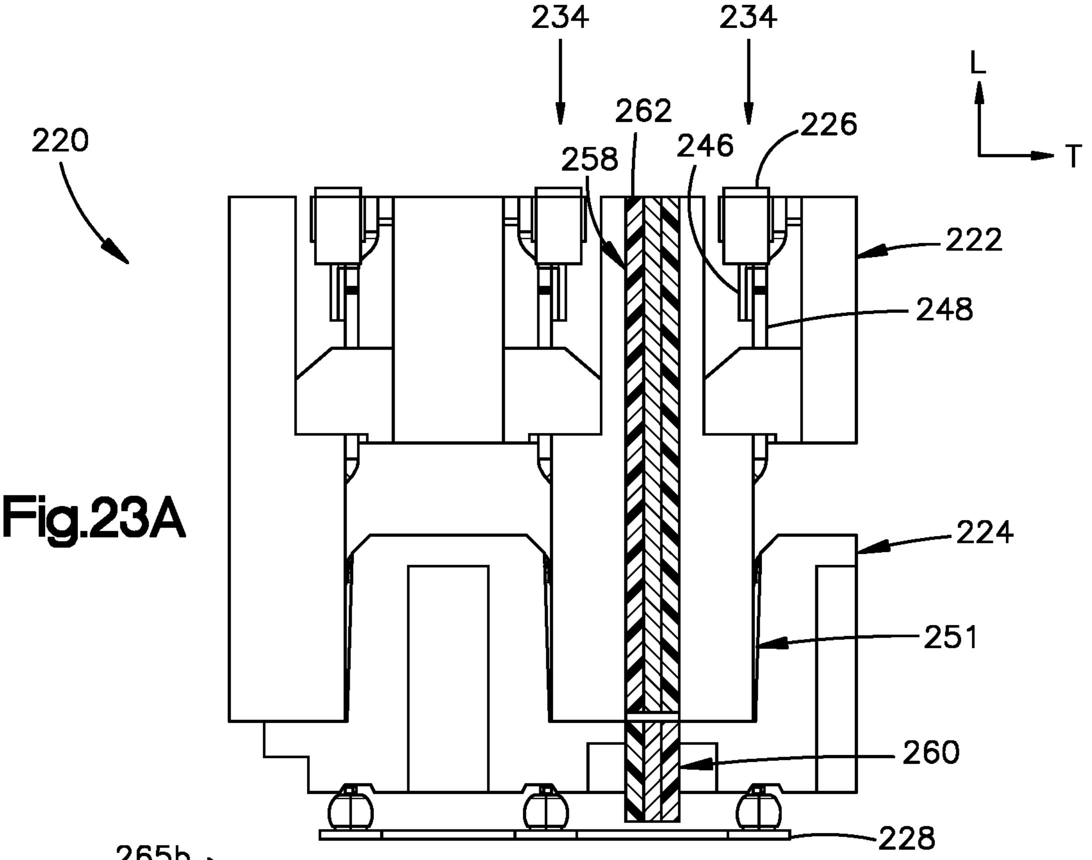
FIG. 23A is a sectional side elevation view of the electrical connector assembly illustrated in FIG. 21A.
Figure 23B:
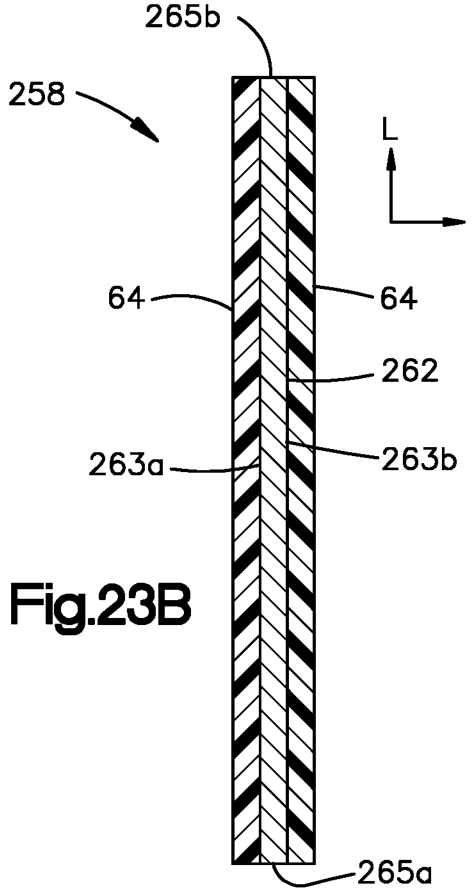
FIG. 23B is a sectional side elevation view of the first electrical shield illustrated in FIG. 21A.
Figure 23C:
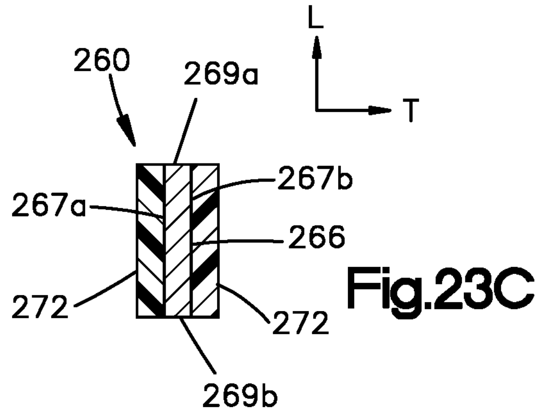
FIG. 23C is a sectional side elevation view of the second electrical shield illustrated in FIG. 21A.

Referring also to FIG. 22, the first electrical connector 222 can include a first electrically insulative connector housing 230, and a plurality of first electrical contacts 232 supported by the connector housing 230. The electrical contacts 32 can be arranged in a first plurality of rows 234. The rows 234 can be oriented along a lateral direction A that is perpendicular to the longitudinal direction L, and can also be referred to as a row direction. Further, adjacent rows 234 can be spaced from each other along a transverse direction T that is perpendicular to the lateral direction A and the longitudinal direction L.

Each of the electrical contacts 232 can define a mating end 236 and a mounting end 238 opposite the mating end. The mounting ends 238 can be configured to be mounted to the first electrical device. The mating ends 236 can be configured to mate with respective electrical contacts 240 of the second electrical connector 224 when the first and second electrical connectors 222 and 224 are mated with each other. The mating ends 236 and mounting ends 238 can be disposed opposite each other along the longitudinal direction L and oriented along the longitudinal direction L. Thus, the electrical contacts 232 can be referred to as vertical contacts, and the first electrical connector 222 can be referred to as a vertical electrical connector. Alternatively, the mating ends 236 and mounting ends 238 can be oriented perpendicular to each other, such that the electrical contacts 232 define right-angle contacts, and the first electrical connector 222 can be referred to as a right-angle electrical connector.

As described above, the first electrical connector 222 can be mounted to a plurality of electrical cables 226 so as to define a cable connector. The electrical cables 226 can each include at least one electrical signal conductor 242, and an electrical insulator 244 that surrounds the signal conductor 242. The electrical cables 226 can each further include an electrical ground. In one example, the electrical ground can be configured as an electrical shield that at least partially or entirely surrounds the electrical insulator 244, and thus the at least one signal conductor 242. Accordingly, it can be said that the at least one signal conductor 242, and thus the electrical cable 226, can be electrically shielded. In one example, the electrical cables 226 can be configured as twinaxial cables that each includes a pair of signal conductors 242 surrounded by the electrical insulator 244. The pair of signal conductors 242 of each of the electrical cables 226 can be arranged along a common one of the rows 234, or along the lateral direction A. Alternatively, the electrical cables 226 can be configured as coaxial cables, whereby the at least one electrical signal conductor 242 defines only a single electrical signal conductor. Adjacent ones of the electrical signal conductors 242 along the respective rows 234 can define a differential signal pair. Alternatively, the electrical signal conductors 242 can be single ended. A plurality of electrical cables can be disposed adjacent each other along each of the rows 234 as desired.

The electrical contacts 232 can include electrical signal contacts 247 and electrical ground contacts 248. Alternatively, the electrical contacts 232 can define an open pinfield, and not assigned as ground contacts or signal contacts prior to use. The mounting ends 238 of the electrical ground contacts 248 can be configured to contact the electrical ground of the electrical cables 226, respectively. Further, the electrical ground contacts 248 can be electrically commoned to each other. That is, the electrical ground contacts 248 can all be in electrical communication with each other. In one example, the electrical ground contacts 248 of each row can be defined by a single monolithic electrically conductive structure. The electrically conductive structure can be metallic. The mounting ends 238 of the electrical signal contacts 247 can be configured to contact a respective one of the electrical signal conductors 242 of the electrical cables 226. The mating ends 236 of the electrical ground contacts 248 can be disposed between adjacent ones of the mating ends 236 of the electrical signal contacts 247. For instance, at least one mating end 236 of the electrical ground contacts 248 can be disposed between adjacent pairs of the mating ends 236 of the electrical signal contacts 247 along each of the respective rows 234. In one example, a pair of mating ends 236 of the electrical ground contacts 248 can be disposed between adjacent pairs of the mating ends 236 of the electrical signal contacts 247 along each of the respective rows 234. Thus, the electrical contacts 232 can be arranged in a repeating S-S-G-G configuration along the respective row, where "S" designates one or more up to all of a mating end 236, a mounting end 238, and a body of an electrical signal contact 247, and "G" designates one or more up to all of a mating end 236, a mounting end 238, and a body of an electrical ground contact 248. The body of the electrical signal contact 247 and the electrical ground contact 248, respectively, can extend from the respective mating end 236 to the respective mounting end 238. Alternatively, the electrical contacts 232 can be arranged in a repeating S-S-G configuration along the respective row. In this regard, it should be appreciated, of course, that the electrical contacts 232 can be arranged in any suitable alternative configuration of signal contacts and ground contacts as desired. Further, the mating ends 236 of the electrical ground contacts 248 can be aligned with the mating ends 236 of the electrical signal contacts 247 along the respective rows 234. Similarly, the mounting ends 238 of the electrical ground contacts 248 can be aligned with the mounting ends of the electrical signal contacts 247 along the respective rows 234.

The second electrical connector 224 includes a second electrically insulative connector housing 250 and a plurality of second electrical contacts 240 supported by the second connector housing 250. The electrical contacts 232 of the first electrical connector 222 can be insert molded in the first connector housing 230. Alternatively, electrical contacts 232 of the first electrical connector 222 can be stitched into the first connector housing 230. Similarly, the electrical contacts 240 of the second electrical connector 224 can be insert molded in the second connector housing 250. Alternatively, electrical contacts 240 of the second electrical connector 224 can be stitched into the second connector housing 250.

The electrical contacts 240 can be arranged in a second plurality of rows 252. The rows 252 can be oriented along the lateral direction A. Further, adjacent rows 252 can be spaced from each other along the transverse direction T. Thus, the rows 234 and 252 can be oriented parallel to each other.

Each of the electrical contacts 240 of the second electrical connector 224 can define a mating end 254 and a mounting end 256 opposite the mating end. The mounting ends 256 can be configured to be mounted to the substrate 228, thereby placing the second electrical connector 224 in electrical communication with the substrate 228. The mating ends 254 can be configured to mate with the mating ends 236 of respective ones of the electrical contacts 232 of the first electrical connector 222 when the first and second electrical connectors 222 and 224 are mated with each other. The mating ends 254 and mounting ends 256 can be disposed opposite each other along the longitudinal direction L and oriented along the longitudinal direction L. Thus, the electrical contacts 240 can be referred to as vertical contacts, and the second electrical connector 224 can be referred to as a vertical electrical connector. Alternatively, the mating ends 254 and mounting ends 256 can be oriented perpendicular to each other, such that the electrical contacts 240 define right-angle contacts, and the second electrical connector 224 can be referred to as a right-angle electrical connector.

Referring now to FIGS. 21A-23C, the first electrical connector 222 can include at least one first electrical shield 258 that is configured to reduce near-end crosstalk in the first electrical connector 222. Further, the electrical shield 258 can be configured to reduce near-end crosstalk in the electrical connector assembly 220. Similarly, the second electrical connector can include at least one second electrical shield 260 that is configured to reduce near-end crosstalk in the second electrical connector 224. Further, the second electrical shield 260 can be configured to reduce near-end crosstalk in the electrical connector assembly 220. The first electrical shield 258 will now be described, followed by a description of the second electrical shield 260.

The first electrical shield 258 can include an electrically conducive substrate 262 that is supported by the connector housing 230. In one example, the electrically conductive substrate 262 can be configured as a plate. In another example, the electrically conductive substrate 262 can define a mesh. For instance, the electrically conductive substrate 262 can comprise a plurality of electrically conductive fibers. The fibers can be woven so as to define the mesh. It is appreciated that the mesh can define a plurality of openings. The openings can be defined by the interstices of the fibers. Alternatively, it is recognized that openings extending through the substrate 262 can be alternatively defined. For instance, a plurality of openings can be defined in a non-woven substrate or plate. In one example, the electrically conductive substrate 262 can be metallic. Thus, the plate or fibers can be metallic. For instance, the electrically conductive substrate 262 can be made from copper, which can be pure copper or a copper alloy. It should be appreciated, of course, that the electrically conductive substrate 262 can be made from and comprise any suitable alternative material as desired. The electrical shield 260, and thus the electrically conductive substrate 262, can be disposed between first and second signal contacts 247 so as to provide electrical shielding therebetween. For instance, the electrical shield 260, and thus the electrically conductive substrate 262, can be disposed between first and second adjacent rows of the plurality of rows 234 of electrical contacts, and can provide electrical shielding between the signal contacts 247 of the first row and the signal contacts 247 of the second row.

In one example, the electrically conductive substrate 262, and thus the electrical shield 258, can be ungrounded. Accordingly, the electrical shield 258, and thus the electrically conductive substrate 262, is not in contact with any electrically conductive structures that, in turn, are in contact with any of the ground contacts 248. Further, in one example, the electrical connector 222 can be configured such that no portion of the electrical shield 258, and thus the electrically conductive substrate 262, is in contact with any grounded electrically conductive structures of the electrical connector 222 and of any electrically conductive structures that are mated with or mounted to the electrical connector 222. Alternatively, in some examples, the electrically conductive substrate 262 can be in electrical communication with the electrical ground contacts 248 if desired. The electrically conductive substrate 262 can be planar along a plane defined by the longitudinal direction L and the lateral direction A. Further, the electrically conductive substrate 262 can be equidistantly positioned between the first and second rows 234 with respect to the transverse direction T. It should be appreciated, of course, that the electrically conductive substrate can define any suitable shape as desired. While the electrical shield 258 is described as being between the first and second rows, it is recognized that the electrical connector 222 can include a plurality of electrical shields disposed between respective different adjacent ones of the plurality of rows 234.

The electrical shield 258 can further include a lossy material 64 disposed on at least a portion up of the electrically conductive substrate 262. For instance, as described in more detail below, the lossy material 64 can be disposed on a majority of the electrically conductive substrate 262. In one example, the lossy material 64 can be disposed on an entirety of the electrically conductive substrate 262. The lossy material 64 can be electrically conductive in one example. In another example, the lossy material 64 can be electrically nonconductive. In one example, the lossy material 64 can be provided as commercially available by Ecosorb® having a place of business in Houston, TX For instance, the lossy material 64 can be Ecosorb® GDS. Alternatively, the lossy material 64 can be Ecosorb® LS-30. In another example, the lossy material can be HM2000 commercially available from Arc Technologies, Inc having a place of business in Massachusetts. In one example, the lossy material 64 can be a broadband lossy material. Thus, the lossy material 64 of the first electrical connector 222 of the electrical connector assembly 220 can be devoid of CMC that can be configured to tune the absorbing frequency of the lossy material 64 as described above.

The electrically conductive substrate 262 can define a first side 263*a* and a second side 263*b* opposite the first side 263*a* along the transverse direction T. The first side 263*a* can face the first row 234, and the second side 263*b* can face the second row 234. The electrically conductive substrate 262 can further define at least one edge that extends from the first side 263*a* to the second side 263*b*. For instance, the electrically conductive substrate 262 can define a first edge 265*a* and a second edge 265*b* that is opposite the first edge 265*a* along the longitudinal direction L. For instance, the first edge 265*a* can be spaced from the second edge 265*b* in the mating direction. Thus, the first edge 265*a* can be disposed adjacent a mating interface of the first electrical connector 222. Further, the first edge 265*a* can face the second electrical connector 224. The second edge 265*b* can be disposed adjacent a mounting interface of the first electrical connector 222. The mounting interface of the first electrical connector 222 can face away from the second electrical connector when the first electrical connector is configured as a vertical connector. The electrically conductive substrate 262 can define side edges 265*c* that are opposite each other along the lateral direction A, and extend from the first edge 265*a* to the second edge 265*b*, and from the first side 263*a* to the second side 263*b*.

In one example, the lossy material 64 can be disposed on at least one of the first side, 263*a*, the second side 263*b*, and the at least one edge of the electrically conductive substrate 262. For instance, the lossy material 64 can be disposed on at least one of the first and second sides 263*a* and 263*b*. For instance, the lossy material 64 can be disposed on a respective entirety of at least one of the first and second sides 263*a* and 263*b*. In one example, the lossy material 64 can be disposed on each of the first and second sides 263*a* and 263*b*. The lossy material 64 can extend from the first edge 265*a* to the second edge 265*b*, and from and to the opposed side edges 265*c*. Alternatively or additionally, the lossy material 64 can be impregnated in the electrically conductive substrate 262 in the manner described above.

Thus, the lossy material 64 can extend continuously between a plurality of the electrical contacts 232 of the first row and a plurality of the electrical contacts 232 of the second row. In one example, the lossy material 64 can extend continuously between all signal contacts 247 electrical of the first row 234 and all signal contacts 247 of the second row 234. For instance, the lossy material 64 can extend continuously between all electrical contacts 232 of the first row 234 and all electrical contacts 232 of the second row 234. Thus, it will be appreciated that the electrical shield 258, including the substrate 262 and the lossy material 64, can extend to a position aligned along the transverse direction T with the mounting ends 238 of the electrical signal contacts 247 of each of the first and second rows. The mounting location can be referred to as a location at the mounting ends 238 of the signal contacts 247 that contact, or are mounted to, the signal conductors 242 of the electrical cables 226. Further, the electrical shield 258, including the substrate 262 and the lossy material 64, can extend to a position aligned along the transverse direction T with the mating locations of the electrical signal contacts 247 of each of the first and second rows. The mating locations can be referred to as locations in the first electrical connector 222 at the mating ends 236 of the signal contacts 247 that contact, or are mated with, the signal contacts of the second electrical connector 224.

The electrically conductive substrate 262 can have a thickness from the first side 263*a* to the second side 263*b* along the transverse direction T. The lossy material 64 disposed on the first side 263*a* can also have a thickness along the transverse direction. The thickness of the lossy material 64 disposed on the first side 263*a* can be greater than, less than, or substantially equal to the thickness of the electrically conductive substrate 262. In one example, the thickness of the lossy material 64 disposed on the first side 263*a* can be within substantially 50% of the thickness of the electrically conductive substrate 262. Similarly, the lossy material 64 disposed on the second side 263*b* can also have a thickness along the transverse direction. The thickness of the lossy material 64 disposed on the second side 263*b* can be greater than, less than, or substantially equal to the thickness of the electrically conductive substrate 262. In one example, the thickness of the lossy material 64 disposed on the second side 263*b* can be within substantially 50% of the thickness of the electrically conductive substrate 262.

In one example, the thickness of the electrical shield 258 can range from substantially 5 microns to substantially 1000 microns, such as from substantially 5 microns to substantially 500 microns. For instance, the thickness of the electrical shield 258 can range from substantially 10 microns to substantially 500 microns, such as from substantially 50 microns to substantially 300 microns. The thickness of the electrically conductive substrate can range from substantially 5 microns to substantially 1000 microns, such as from substantially 5 microns to substantially 500 microns. For instance, the thickness of the substrate 262 can range from substantially 10 microns to substantially 500 microns, such as from substantially 50 microns to substantially 300 microns. It should be appreciated, of course, that the thickness of the electrical conductive substrate 262 and the lossy material disposed on each of the first and second sides 263*a* and 263*b* can vary as desired. For instance, it is recognized that the material or materials used for the lossy material 64 can result in different thicknesses.

In some examples, the lossy material 64 can be disposed on one or both of the edges 265*a* and 265*b*. Alternatively or additionally, the lossy material 64 can be disposed on one or both of the side edges 265*c*. Thus, it will be appreciated that the electrically conductive substrate 262 can be encapsulated by the lossy material 64 as desired.

It should be appreciated that a method can include the step of supporting the electrical shield 258 by the first connector housing 230. For instance, in one example, the lossy material 64 can be applied to the electrically conductive substrate 262 in suitable any manner desired. For instance, the lossy material 64 can be applied to the electrically conductive substrate in any manner described above with respect to the electrical contact, the connector housing, and the leadframe housing. Thus, the lossy material can define a coating on an outer side of the substrate 262. Alternatively, for instance, the first substrate 262 defines a plurality of openings therethrough, for instance when the first substrate 262 is a mesh, the first substrate 262 can be impregnated with the lossy material 64. Thus, the thickness of the electrical shield 258 can be less than the sum of the individual thickness of the lossy material and the individual thickness of the substrate 26. Next, the electrical shield 258 can be insert molded in the first connector housing 230. Alternatively, the electrical shield 258 can be fastened to the connector housing 230 in any manner as desired. Alternatively, the electrically conductive substrate 262 can be first supported by the first connector housing 230. For instance, the electrically conductive substrate 262 can be insert molded in the first connector housing. Alternatively, the electrically conductive substrate 262 can be fastened to the connector housing 230 in any manner as desired. Next, the lossy material 64 can be applied to the exposed portions of the electrically conductive substrate 262 as described above.

A portion of the electrical shield 258 can be cantilevered in the mating direction. For instance, the connector housing 230 can define a cantilevered portion 231, and a portion of the electrical shield 258 can be supported by the cantilevered portion. For instance, a first portion of the cantilevered portion 231 can be in contact with the lossy material 64 that is disposed on the first side 263*a* of the electrically conductive substrate 262, and a second portion of the cantilevered portion 231 can be in contact with the lossy material 64 that is disposed on the second side 263*b* of the electrically conductive substrate 262. The cantilevered portion 231 can define a plug that is received in a corresponding receptacle 251 defined by the second connector housing 250 of the second electrical connector 224 so as to mate the first and second electrical connectors 222 and 224 to each other. Alternatively, the second electrical connector 224 can define the plug, and the first electrical connector 222 can define the receptacle.

With continuing reference to FIGS. 21A-23C, the second electrical shield 260 can include a second electrically conducive substrate 266 that is supported by the second connector housing 250. Thus, the electrically conductive substrate 262 can be referred to as a first electrically conductive substrate. The second electrically conductive substrate 266 can be constructed as described above with respect to the electrically conductive substrate 262. Thus, for example, the substrate 266 can be configured as a plate. Alternatively, the substrate 266 can have openings. For instance, the substrate 266 can be configured as a mesh. The electrical shield 260, and thus the electrically conductive substrate 266, can be disposed between first and second electrical contacts 240 so as to provide electrical shielding therebetween. For instance, the second electrical shield 260, and thus the electrically conductive substrate 266, can be disposed between adjacent rows of the plurality of second rows 252 of electrical contacts 240. The electrical contacts 240 can include electrical signal contacts 268 and electrical ground contacts 270. The mating ends 254 of the electrical signal contacts 268 can be configured to mate with respective ones of the mating ends 236 of the electrical signal contacts 247 of the first electrical connector 222. The mounting ends 256 of the electrical ground contacts 270 can be mounted to the substrate 228. Similarly, the mating ends 254 of the electrical ground contacts 270 can be configured to mate with respective ones of the mating ends 236 of the electrical ground contacts 270 of the first electrical connector 222. The mounting ends 256 of the electrical ground contacts 270 can be mounted to the substrate 228.

The second electrical shield 260 can provide electrical shielding between the signal contacts 268 of the first row and the signal contacts 268 of the second row. In one example, the electrically conductive substrate 266 is metallic. For instance, the electrically conductive substrate 266 can be made from copper, which can be pure copper or a copper alloy. It should be appreciated, of course, that the electrically conductive substrate 266 can be made from any suitable alternative material as desired.

In one example, the second electrically conductive substrate 266, and thus the second electrical shield 260, can be ungrounded. Accordingly, the second electrical shield 260, and thus the electrically conductive substrate 266, is not in contact with any electrically conductive structures that, in turn, are in contact with any of the ground contacts 270. Further, in one example, the electrical connector 224 can be configured such that no portion of the second electrical shield 260, and thus the electrically conductive substrate 266, is in contact with any grounded electrically conductive structures of the electrical connector 224 and of any electrically conductive structures that are mated with or mounted to the electrical connector 224. Alternatively, in some examples, the electrically conductive substrate 266 can be in electrical communication with the electrical ground contacts 270 if desired. The electrically conductive substrate 266 can be planar along a plane defined by the longitudinal direction L and the lateral direction A. Further, the electrically conductive substrate 266 can be equidistantly positioned between the first and second rows 252 with respect to the transverse direction T. It should be appreciated, of course, that the electrically conductive substrate 266 can define any suitable shape as desired. While the second electrical shield 260 is described as being disposed between the first and second rows 252, it is recognized that the electrical connector 222 can include a plurality of electrical shields disposed between respective different adjacent ones of the plurality of rows 252.

The second electrical shield 260 can further include a lossy material 272 disposed on at least a portion up of the electrically conductive substrate 266. The lossy material 272 can be as described above with respect to the lossy material 64. Thus, the lossy material 272 can be referred to as a second lossy material to the extent that it is included in the second electrical shield 260, but it can be the same material as the lossy material 64, which can be referred to as a first lossy material to the extent that it is included in the first electrical shield 258. The lossy material 272 For instance, as described in more detail below, the lossy material 272 can be disposed on a majority of the electrically conductive substrate 266. In one example, the lossy material 272 can be disposed on an entirety of the electrically conductive substrate 266. The lossy material 272 can be electrically conductive in one example. In another example, the lossy material 272 can be electrically nonconductive. In one example, the lossy material 272 can be provide as commercially available by Ecosorb® having a place of business in Houston, TX. In this regard, the lossy material 272 can be the same material as the lossy material 64 of the first electrical shield 258.

The second electrically conductive substrate 266 can define a first side 267*a* and a second side 267*b* opposite the first side 267*a* along the transverse direction T. The first side 267*a* can face the first row 252, and the second side 267*b* can face the second row 252. The second electrically conductive substrate 266 can further define at least one edge that extends from the first side 267*a* to the second side 267*b*. For instance, the electrically conductive substrate 266 can define a first edge 269*a* and a second edge 269*b* that is opposite the first edge 269*a* along the longitudinal direction L. For instance, the first edge 269*a* can be spaced from the second edge 269*b* in the mating direction. Thus, the first edge 269*a* can be disposed adjacent a mating interface of the first electrical connector 222. Further, the first edge 269*a* can face the first electrical connector 222. The second edge 269*b* can be disposed adjacent a mounting interface of the second electrical connector 224. Thus, the second edge 269*b* can face the substrate 228. The second electrically conductive substrate 266 can define side edges that are opposite each other along the lateral direction A, and extend from the first edge 269*a* to the second edge 269*b*, and from the first side 267*a* to the second side 267*b*.

In one example, the lossy material 272 can be disposed on at least one of the first side 267*a*, the second side 267*b*, and the at least one edge of the electrically conductive substrate 266. For instance, the lossy material 272 can be disposed on at least one of the first and second sides 267*a* and 267*b*. For instance, the lossy material 272 can be disposed on a respective entirety of at least one of the first and second sides 267*a* and 267*b*. In one example, the lossy material 272 can be disposed on each of the first and second sides 267*a* and 267*b*. The lossy material 272 can extend from the first edge 269*a* to the second edge 269*b*, and from and to the opposed side edges. Alternatively or additionally, the lossy material 272 can be impregnated in the second electrically conductive substrate 266 in the manner described above.

Thus, the lossy material 272 can extend continuously between a plurality of the electrical contacts 240 of the first row 252 and a plurality of the electrical contacts 240 of the second row 252. In one example, the lossy material 272 can extend continuously between all signal contacts 268 electrical of the first row 262 and all signal contacts 268 of the second row 262. For instance, the lossy material 272 can extend continuously between all electrical contacts 240 of the first row 262 and all electrical contacts 240 of the second row 252. Thus, it will be appreciated that the second electrical shield 260, including the substrate 266 and the lossy material 272, can extend to a position aligned along the transverse direction T with the mounting ends 256 of the electrical signal contacts 268 of each of the first and second rows 252. The mounting location can be referred to as a location at the mounting ends 256 of the signal contacts 268 that contact, or are mounted to, solder balls that, in turn, are mounted to the substrate 228. The second electrical shield 260 can extend out from a mounting end of the connector housing 250 toward the substrate 228 to a location that is spaced from the substrate 228 along the longitudinal direction L so as to define a gap that extends from the second electrical shield 260 to the substrate 228. For instance, the gap can extend from the second edge 269*b* to the substrate 28. In one example, the gap can be less than substantially 0.5 mm. For instance, the gap can be less than substantially 0.3 mm. In one example, the gap can be substantially 0.1 mm. The mounting end of the connector housing 250 can face the substrate 228 when the second electrical connector 224 is mounted to the substrate 228. It can be desirable to minimize the gaps, and all gaps disclosed herein, in order to enhance the effective shielding of the electrical shields 258 and 260. It can further be desirable to eliminate the gaps.

Further, the second electrical shield 260, including the substrate 266 and the lossy material 272, can extend to a position aligned along the transverse direction T with the mating locations of the electrical signal contacts 268 of each of the first and second rows 252. The mating locations can be referred to as locations in the second electrical connector 24 at the mating ends 254 of the signal contacts 268 that contact, or are mated with, the signal contacts 247 of the first electrical connector 222.

The electrically conductive substrate 266 can have a thickness from the first side 267*a* to the second side 267*b* along the transverse direction T. The lossy material 272 disposed on the first side 267*a* can also have a thickness along the transverse direction. The thickness of the lossy material 272 disposed on the first side 267*a* can be greater than, less than, or substantially equal to the thickness of the electrically conductive substrate 266. In one example, the thickness of the lossy material 272 disposed on the first side 267*a* can be within substantially 50% of the thickness of the electrically conductive substrate 266. Similarly, the lossy material 272 disposed on the second side 267*b* can also have a thickness along the transverse direction. The thickness of the lossy material 272 disposed on the second side 267*b* can be greater than, less than, or substantially equal to the thickness of the electrically conductive substrate 266. In one example, the thickness of the lossy material 272 disposed on the second side 267*b* can be within substantially 50% of the thickness of the electrically conductive substrate 266.

In one example, the thickness of the second electrical shield 260 can range from substantially 5 microns to substantially 1000 microns, such as from substantially 5 microns to substantially 500 microns. For instance, the thickness of the second electrical shield 260 can range from substantially 10 microns to substantially 500 microns, such as substantially 50 microns to substantially 300 microns. Thus, it should be appreciated that the second electrical shield 260 can have substantially the same thickness as the first electrical shield 258. Further, the lossy material 272 can have the same thickness as the lossy material 64. The thickness of the second electrically conductive substrate 266 can range from substantially 5 microns to substantially 1000 microns, such as from substantially 5 microns to substantially 500 microns. For instance, the thickness of the substrate 266 can range from substantially 10 microns to substantially 500 microns, such as substantially 50 microns to substantially 300 microns. It should be appreciated, of course, that the thickness of the electrically conductive substrate 266 and the lossy material 272 disposed on each of the first and second sides 267*a* and 267*b* can vary as desired In some examples, the lossy material 272 can be disposed on one or both of the edges 267*a* and 267*b*. Alternatively or additionally, the lossy material 272 can be disposed on one or both of the side edges. Thus, it will be appreciated that the electrically conductive substrate 262 can be encapsulated by the lossy material 272 as desired.

It should be appreciated that a method can include the step of supporting the second electrical shield 260 by the second connector housing 250. For instance, in one example, the lossy material 272 can be applied to the electrically conductive substrate 266 as described above with respect to the application of the lossy material 64 to the electrically conductive substrate 262. Next, the second electrical shield 260 can be insert molded in the second connector housing 250. Alternatively, the second electrical shield 260 can be fastened to the connector housing 250 in any manner as desired. Alternatively, the electrically conductive substrate 266 can be first supported by the second connector housing 250. For instance, the electrically conductive substrate 266 can be insert molded in the second connector housing 250. Alternatively, the electrically conductive substrate 266 can be fastened to the connector housing 250 in any manner as desired. Next, the lossy material 272 can be applied to the exposed portions of the electrically conductive substrate 266 as described above.

Referring now to FIGS. 21B and 23A-23C, and as described above, the first and second electrical connectors 222 and 224 are configured to be mated with each other. Further, in one example, the first and second electrical shields 258 and 260 can be aligned with each other along the longitudinal direction L. Further, the electrical connector assembly 220 can define a gap that extends from the first electrical shield 258 to the second electrical shield 260 along the longitudinal direction L. In particular, the first electrical shield 258 can extend to a mounting end of the connector housing 230 along the longitudinal direction L. The mounting end of the connector housing 230 can face the second electrical connector 224 when the first and second electrical connectors 222 and 224 are mated with each other. Alternatively, the first electrical shield 258 can be inwardly recessed with respect to the mounting end of the connector housing 30 along the longitudinal direction L. The mounting end of the connector housing 230 can be aligned with the first electrical shield 258, and in particular with the first edge 265*a*, along the longitudinal direction L. Further, the second electrical shield 260 can extend to a mating end of the second connector housing 250, in particular at a region of the mating end that is aligned with the second electrical shield 260 along the longitudinal direction L.

When the first and second electrical connectors 222 and 224 are mated with each other, the mating ends of the respective first and second connector housings 230 and 250 can abut each other. Because the first electrical shield 258 can be recessed from the mating end of the first housing 230, and the second electrical shield 260 extends to the mating end of the second housing 250, the electrical connector assembly 220 can define a gap that extends from the first electrical shield 258 to the second electrical shield 258 along the longitudinal direction. Alternatively, the first electrical shield 258 can extend to the mating end of the first housing 230, and the second electrical shield 260 can be recessed from the mating end of the second housing 250. Alternatively still, each of the first electrical shield 258 and the second electrical shield 260 can be recessed from the mating end of the first housing 230 and the mating end of the second housing 250, respectively. In one example, the gap can be less than substantially 0.5 mm. For instance, the gap can be less than substantially 0.3 mm.

In one example, each of the first and second electrical connectors 222 and 224 can be configured to transmit signals along the respective electrical signal contact at data transfer speeds of 256 gigabits per second with no more than 4% worst-case asynchronous multiactive crosstalk at a rise time that ranges from substantially 5 picoseconds to substantially 240 picoseconds. For instance, each of the first and second electrical connectors 222 and 224 can be configured to transmit signals along the respective electrical signal contact at data transfer speeds of 256 gigabits per second with no more than 5% worst-case asynchronous multiactive crosstalk at a rise time that ranges from substantially 5 picoseconds to substantially 240 picoseconds. In another example, each of the first and second electrical connectors 222 and 224 can be configured to transmit signals along the respective electrical signal contact at data transfer speeds of 256 gigabits per second with no more than 5% worst-case asynchronous multiactive crosstalk at a rise time that ranges from substantially 5 picoseconds to substantially 240 picoseconds.

In one example, the first and second electrical shields 258 and 260 can be aligned with each other along the longitudinal direction. For instance, the first and second electrical shields 258 and 260 can be coplanar with each other along a plane that is defined by the longitudinal direction L and the lateral direction A. Thus, the first and second electrically conductive substrates 262 and 266 can be aligned with each other along the longitudinal direction L. Further, the first and second electrical shields 258 and 260 can be coplanar with each other along a plane that is defined by the longitudinal direction L and the lateral direction A. Additionally, the lossy material 64 disposed on the first side 263*a* of the first electrically conductive substrate 262 can be aligned with the lossy material 272 disposed on the first side 267*a* of the second electrically conductive substrate 266. For instance, the lossy material 64 disposed on the first side 263*a* of the first electrically conductive substrate 262 can be coplanar with the lossy material 272 disposed on the first side 267*a* along a plane that is defined by the longitudinal direction L and the lateral direction A. Further still, the lossy material 64 disposed on the second side 263*b* of the first electrically conductive substrate 262 can be aligned with the lossy material 272 disposed on the second side 267*b* of the second electrically conductive substrate 266. For instance, the lossy material 64 disposed on the second side 263*b* of the first electrically conductive substrate 262 can be coplanar with the lossy material 272 disposed on the second side 267*b* along a plane that is defined by the longitudinal direction L and the lateral direction A.

Figure 24:
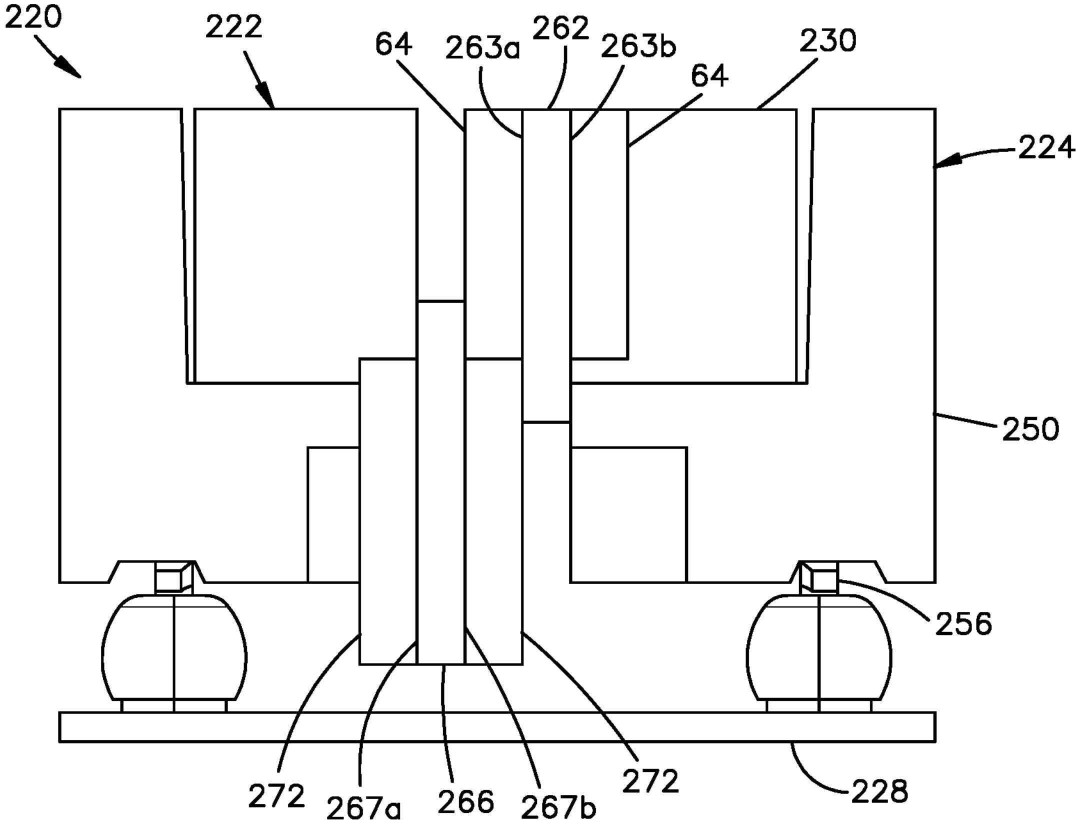
FIG. 24 is a schematic sectional side elevation view of the electrical connector assembly illustrated in FIG. 21A, but constructed in accordance with another example.
Figure 25:
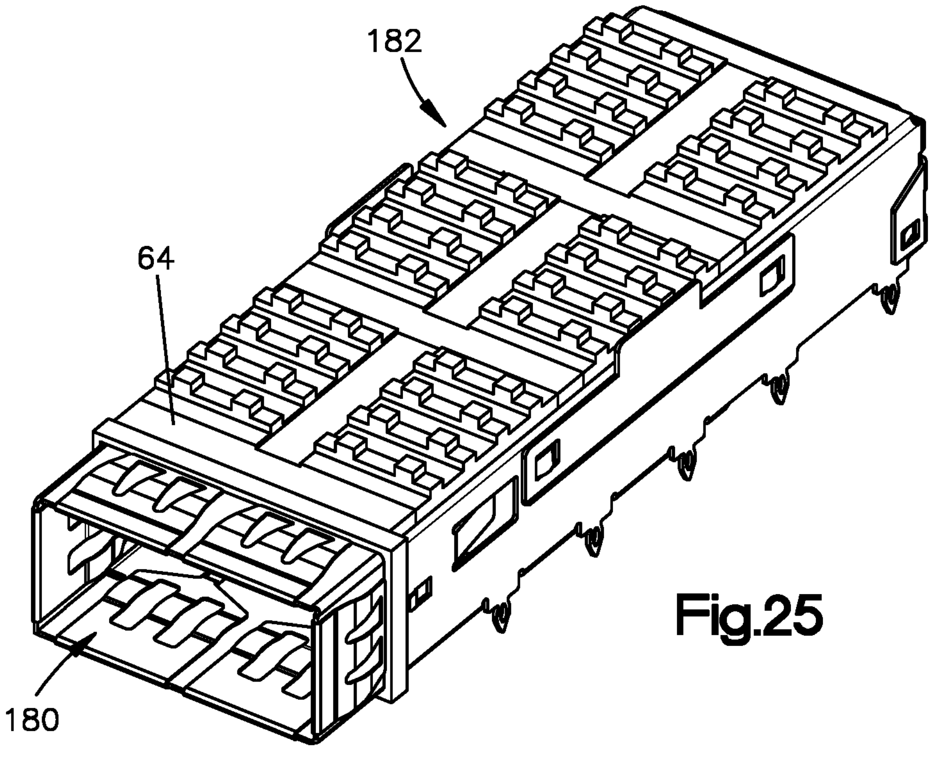
FIG. 25 is a perspective view of an electrically conductive cage having lossy material disposed about an opening to an interior of the cage in accordance with one example.

Referring now to FIG. 24, in another example, at least respective portions of the first and second shields 258 and 260 can overlap each other along the transverse direction T. In particular, the first and second electrically conductive substrates 262 and 266 can be offset with respect to each other along the transverse direction T. Further, the first electrically conductive substrate 262 can extend out from the connector housing 230 toward the second electrical connector 224. Further, a portion of the first substrate 262 can be received by the second connector housing 250. Alternatively or additionally, the second electrically conductive substrate 266 can extend out from the connector housing 250 toward the first electrical connector 222. Further, a portion of the second substrate 266 can be received by the first connector housing 220.

Thus, a portion of the first substrate 262 can overlap a portion of the second substrate 266, such that a straight line oriented along the transverse direction T can pass through each of the first substrate 262 and the second substrate 266. In one example, a portion of the first side 263*a* of the first substrate 262 and the second side 267*b* of the second substrate 266 can face each other along the transverse direction T. The first and second substrates 262 and 266 can overlap each other any suitable distance along the longitudinal direction L as desired. For instance, the first and second substrates 262 and 266 can overlap each other up to substantially 2.5 mm along the longitudinal direction L in one example. For instance, the first and second substrates 262 and 266 can overlap each other up to substantially 1 mm along the longitudinal direction L. In another example, the first and second substrates 262 and 266 can overlap each other substantially 0.5 mm along the longitudinal direction L.

Further still, the first electrically conductive substrate 262 can overlap the lossy material 272 that is disposed on one or both of the first and second sides 267*a* and 267*b* of the second electrically conductive substrate 266 at a first region of overlap. Further, the first side 263*a* of the first electrically conductive substrate 262 can abut the lossy material 272 that is disposed on the second side 267*b* of the second electrically conductive substrate 266. Thus, the lossy material that is disposed on the second side 267*b* of the second electrically conductive substrate 266 can be disposed between the first and second electrically conductive substrates 262 and 266 at the first region of overlap.

Similarly, the second electrically conductive substrate 266 can overlap the lossy material 64 that is disposed on one or both of the first and second sides 263*a* and 263*b* of the first electrically conductive substrate 262 at a second region of overlap. Further, the second side 267*b* of the second electrically conductive substrate 266 can abut the lossy material 64 that is disposed on the first side 263*a* of the first electrically conductive substrate 262. Thus, the lossy material 64 that is disposed on the first side 263*a* of the first electrically conductive substrate 262 can be disposed between the first and second electrically conductive substrates 262 and 266 at the second region of overlap. In one example, the first region of overlap and the second region of overlap can have substantially equal distances along the longitudinal direction L. The distances can range from greater than 0 mm to substantially 1.5 mm. For instance, the distances can range from greater than 0 mm to substantially 1 mm. In particular, the distances can range from greater than 0 mm to substantially 0.5 mm. In one specific example, the distances can be substantially 0.25 mm.

Further, the lossy material 64 disposed on the first side 263*a* of the first electrically conductive substrate 262 can be aligned with the lossy material 272 disposed on the second side 267*b* of the second electrically conductive substrate 266 along the longitudinal direction L. Further still, the lossy material 64 disposed on the first side 263*a* of the first electrically conductive substrate 262 can abut the lossy material 272 disposed on the second side 267*b* of the second electrically conductive substrate 266. Alternatively, a gap can extend along the longitudinal direction L from the lossy material 64 disposed on the first side 263*a* of the first electrically conductive substrate 262 to the lossy material 272 disposed on the second side 267*b* of the second electrically conductive substrate 266. Otherwise stated, the lossy material 64 and 272 that is disposed on the sides 263*a* and 267*b*, of the respective first and second substrates 262 and 266, that face each other is aligned with each other along the mating direction.

Referring now to FIGS. 26A and 27A-27D at least a portion of the first and second shields 258 and 260 can have aligned portions that are aligned with each other along the longitudinal direction L, and jogged portions that are offset from each other along the longitudinal direction L. For instance, the first and second substrates 262 and 266 can have aligned portions that are aligned with each other along the longitudinal direction L, and jogged portions that are offset from each other. The jogged portions can overlap each other along the transverse direction T. Thus, a straight line oriented along the transverse direction T can intersect the jogged portion of each of the first and second substrates 262 and 266.

As shown in FIGS. 26A and 27A-27D, either or both of the first and second electrical shields 258 and 260 as described above, for instance of respective first and second electrical connectors 22 and 24 of an electrical connector assembly 20, can be jogged. Either or both of the first and second electrical connectors 22 and 24 can be board connectors configured to mount to a respective substrate such as a printed circuit board. Alternatively or additionally, either or both of the first and second electrical connectors 22 and 24 can be electrical cable connectors configured to be mounted to respective electrical cables.

Figure 27A:
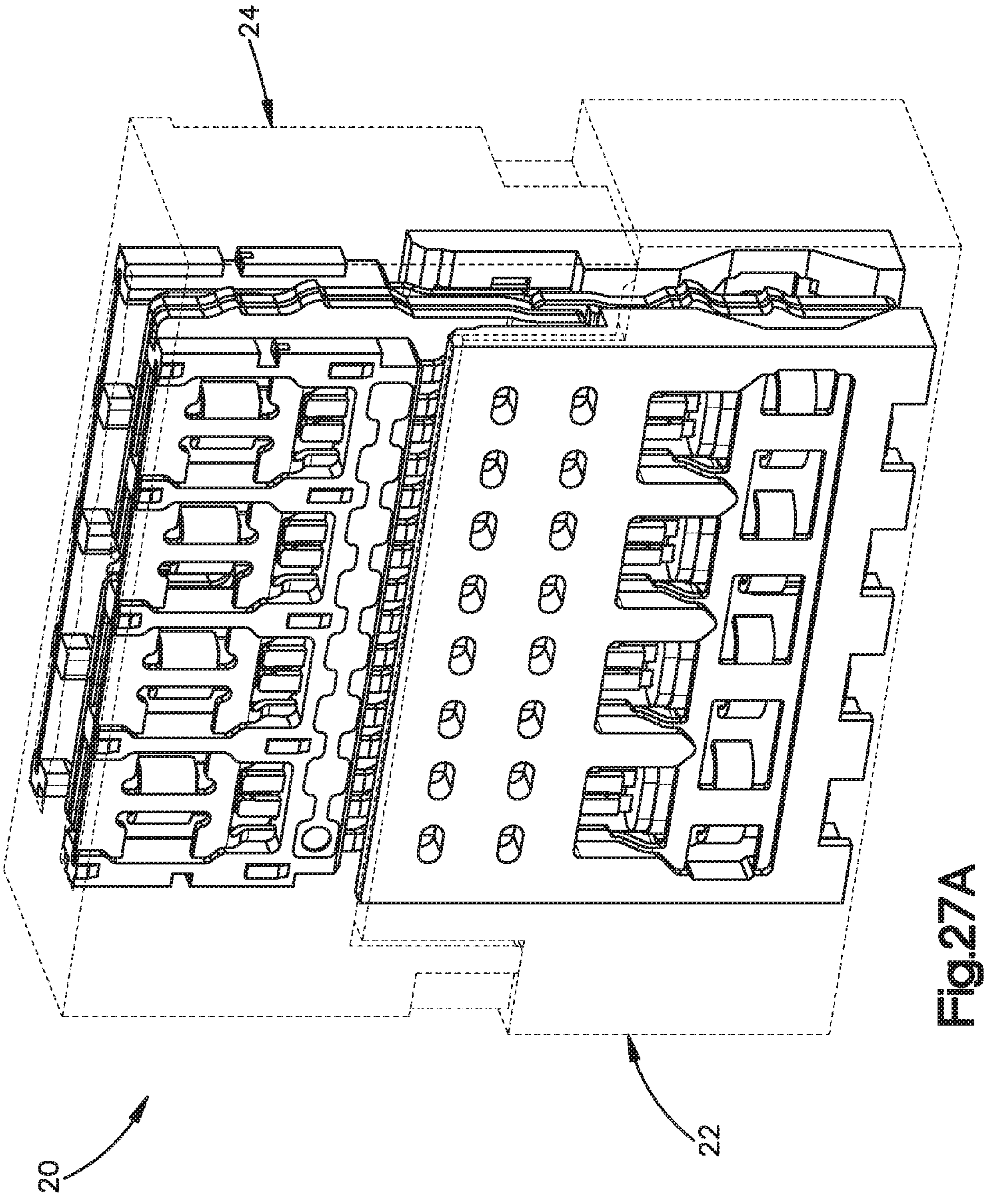
FIG. 27A is a perspective view of an electrical connector assembly similar to the electrical connector assembly illustrated in FIG. 26A, but wherein the first and second electrical connectors are electrical cable connectors.
Figure 27D:
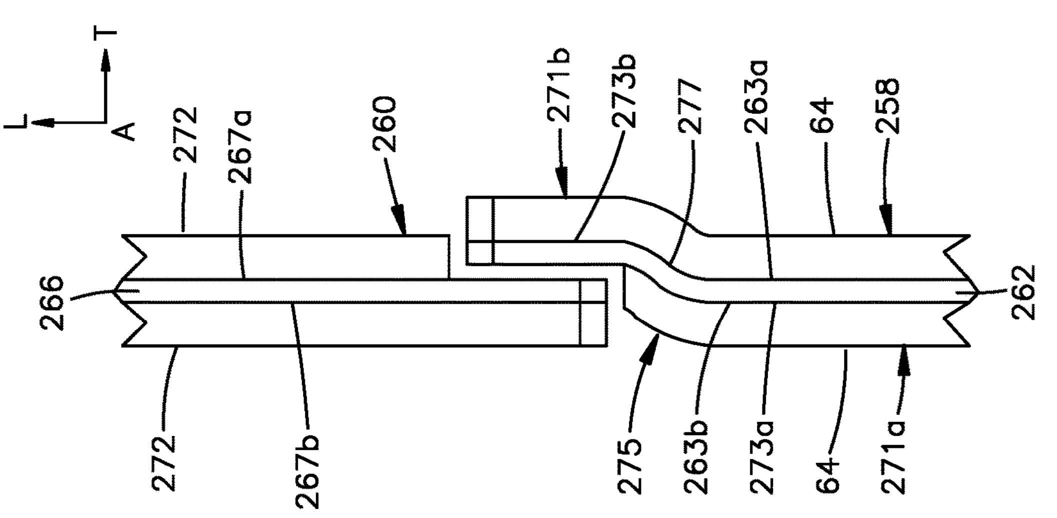
FIG. 27D is an enlarged portion of the sectional side elevation view similar to FIG. 27C, but with only the one of the first and second shields shown jogged.
Figure 27C:
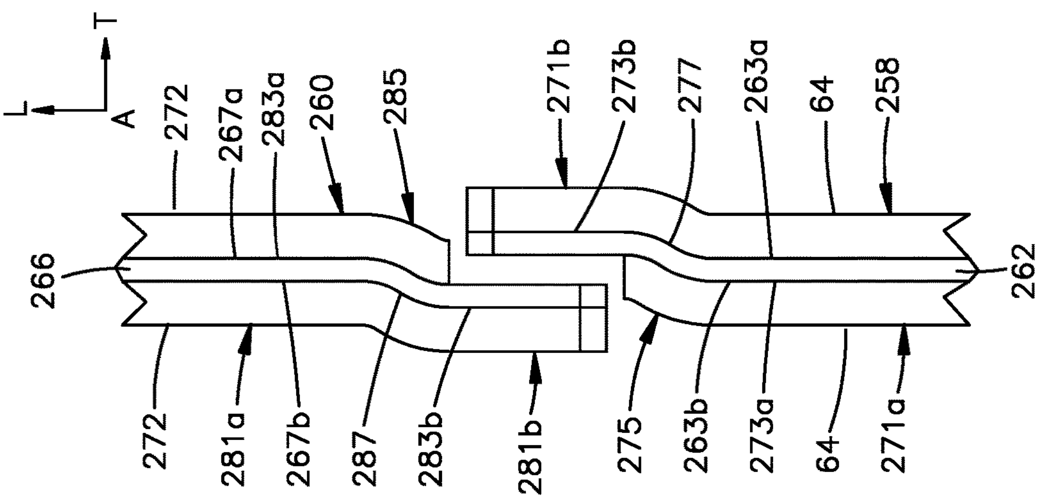
FIG. 27C is an enlarged portion of the sectional side elevation view illustrated in FIG. 27B.
Figure 27B:
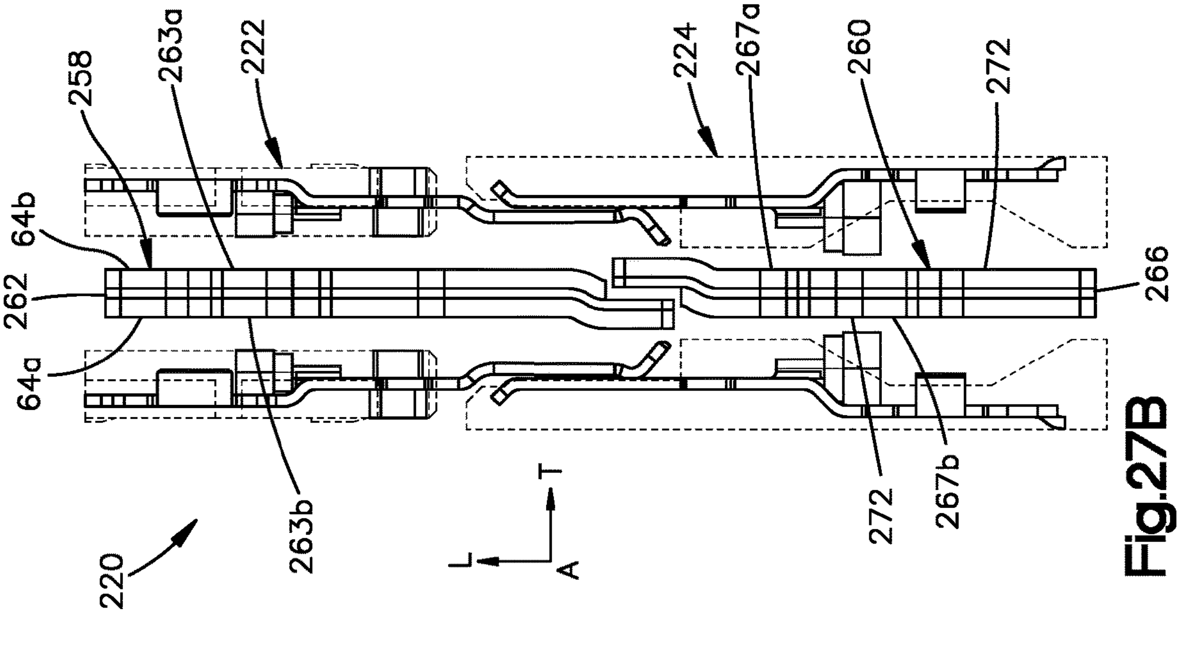
FIG. 27B is a sectional side elevation view of the electrical connector assembly illustrated in FIG. 27A with portions removed to illustrate the jogged first and second electrical shields of the first and second electrical connectors, respectively.

Referring now to FIGS. 27B-27D in particular, each of the first and second electrical shields 258 and 260 can define respective first and second substrates 262 and 262. However, the electrical shields 258 and 260 can be alternative constructed as described herein. The substrates 262 and 266 can be configured as first and second plates that can be electrically conductive. Either or both of the first and second electrical shields can be jogged.

For instance, referring in particular to FIGS. 27B-27C, the first electrical shield 258 can define a respective first portion 271*a* and a respective second portion 271*b* that is offset with respect to the respective first portion 271*a* along the transverse direction T. Thus, the first substrate 262 can define a respective first portion 273*a* and a respective second portion 273*b* that is offset with respect to the respective first portion 273*a* along the transverse direction T. It can therefore be said that when the first electrical shield 258 is disposed between first and second rows of electrical contacts of the first electrical connector 22, the first electrical shield 258 is jogged toward the first row and away from the second row.

The second portions 271*b* and 273*b* can be defined by distal portions of the first electrical shield 258 and first substrate 262, respectively. Thus, the second portions 271*b* and 273*b* can be spaced from the first portions 271*a* and 273*a*, respectively, along the mating direction along which the first electrical connector 22 mates with the second electrical connector 24. The first portions 271*a* and 273*a* can be longer than the second portions 271*b* and 273*b*, respectively, along the mating direction. Thus, as will be described in more detail below, the second electrical shield 260 of the second electrical connector 24 can better nest in the jogged second portion 271*b* of the first electrical shield 258. The transverse direction T is oriented perpendicular to a direction of elongation of the first electrical shield 258 and the first substrate 262, which can be either or both of the longitudinal direction L and the lateral direction A.

The first and second portions 271*a*, 273*a*, 271*b*, and 273*b* can be substantially planar. That is, at least a portion of the respective outer sides of the first and second portions can be substantially planar, for instance along the lateral direction A and the longitudinal direction L. Thus, the first portion 271*a* of the electrical shield 258 can extend parallel to the second portion 271*b* of the electrical shield. Similarly, the first portion 273*a* of the first substrate 262 can extend parallel to the second portion 273*b* of the first substrate 262. The first electrical shield 258 can define a first jogged transition region 275 that extends from the first portion 271*a* to the second portion 271*b*. Thus, the first substrate 262 can define a jogged region 277 that extends from the first portion 273*a* to the second portion 273*b*.

The first electrically conductive substrate 262, and thus the first electrical shield 258, can define the first side 263*a* that faces the first row, the second side 263*b* that is opposite the first side 263*a* and faces the second row. The second portions 271*b* and 273*b* can be offset, or jogged, with respect to the first portions 271*a* and 273*a* along a first direction that is from the first side 263*a* to the second side 263*b*. The first electrically conductive substrate 262, and thus the first electrical shield 258, further defines at least one edge 263*c* that extends from the first side 263*a* to the second side 263*b* along the transverse direction. In one example, the first electrical shield 258 can define an EMI absorber is disposed on at least one of the first side 263*a*, the second side 263*b*, and the at least one edge 263*c*. In one example, the EMI absorber can be configured as lossy material 64. However, as is described below, the first electrical shield 258 can have any suitable alternative configuration suitable to absorb EMI at a predetermined frequency within +/−5 GHz. As described herein, the predetermined frequency can be tunable by varying at least one characteristic of the first electrical shield 258.

With continuing reference to FIGS. 27B-27C, the second electrical shield 260 can similarly define a respective first portion 281*a* and a respective second portion 281*b* that is offset with respect to the respective first portion 281*a* along the transverse direction T. Thus, the second substrate 266 can define a respective first portion 283*a* and a respective second portion 283*b* that is offset with respect to the respective first portion 283*a* along the transverse direction T. The transverse direction T is oriented perpendicular to a direction of elongation of the second electrical shield 260 and the second substrate 266, which can be either or both of the longitudinal direction L and the lateral direction A. It can therefore be said that when the second electrical shield 260 is disposed between first and second rows of electrical contacts of the second electrical connector 24, the second electrical shield 260 is jogged toward the first row and away from the second row.

The second portions 281*b* and 283*b* can be defined by distal portions of the second electrical shield 260 and first substrate 266, respectively. Thus, the second portions 281*b* and 283*b* can be spaced from the first portions 281*a* and 283*a*, respectively, along the mating direction along which the first electrical connector 22 mates with the second electrical connector 24. The first portions 281*a* and 283*a* can be longer than the second portions 281*b* and 283*b*, respectively, along the mating direction. The mating direction of the second electrical connector 24 can be opposite the mating end of the first electrical connector 22. Thus, as will be described in more detail below, the second portion 281*b* of the second electrical shield 260 can nest in the jogged second portion 271*b* of the first electrical shield 258. However, an entirety of the second electrical shield 260 can be spaced from the first electrical shield 258. Alternatively, the first and second electrical shields 258 and 260 can contact each other.

The first and second portions 281*a*, 283*a*, 281*b*, and 283*b* can be substantially planar. That is, at least a portion of the respective outer sides of the first and second portions can be substantially planar, for instance along the lateral direction A and the longitudinal direction L. Thus, the first portion 281*a* of the second electrical shield 260 can extend parallel to the second portion 281*b* of the second electrical shield 260. Similarly, the first portion 283*a* of the second substrate 266 can extend parallel to the second portion 283*b* of the second substrate 266. The second electrical shield 260 can define a second jogged transition region 285 that extends from the first portion 281*a* to the second portion 281*b*. Thus, the second substrate 266 can define a jogged region 287 that extends from the first portion 283*a* to the second portion 283*b*.

The first electrically conductive substrate 262, and thus the first electrical shield 258, can define the first side 267*a* that faces the first row of electrical contacts of the second electrical connector 24, the second side 267*b* that is opposite the first side 263*a* and faces the second row. The first sides 263*a* and 267*a* can face the same direction, and the second sides 263*b* and 267*b* can face the same direction. The second portions 281*b* and 283*b* can be offset, or jogged, with respect to the first portions 281*a* and 283*a* along a second direction that is from the second side 267*b* to the first side 267*a*. Thus, the first and second directions can be oriented along the transverse direction, and can further be opposite each other. The second electrically conductive substrate 266, and thus the second electrical shield 260, further defines at least one edge 273*c* that extends from the first side 267*a* to the second side 267*b* along the transverse direction T. In one example, the second electrical shield 260 can define an EMI absorber is disposed on at least one of the first side 267*a*, the second side 267*b*, and the at least one edge 267*c*. In one example, the EMI absorber can be configured as lossy material 272. However, as is described below, the second electrical shield 260 can have any suitable alternative configuration suitable to absorb EMI at a predetermined frequency within +/−5 GHz. As described herein, the predetermined frequency can be tunable by varying at least one characteristic of the second electrical shield 260.

The first side 263*a* of the first substrate 262 can face the second surface 267*b* of the second substrate 266 at the distal ends of the first and second substrates 262 and 266, or at the second portions 271*b* and 281*b* of the first and second electrical shields 258 and 260, respectively. Further, the first electrical shield 258 and the second electrical shield 60 can be devoid of lossy material at the first and second sides 263*a* and 267*b* along at least some up to all of the second portions 271*b* and 281*b*, respectively. Accordingly, an air gap can extend from the first side 263*a* of the first substrate 262 to the second side 267*b* of the second substrate 266 at the respective second portions 271*b* and 281*b*, respectively.

At least a portion of the second electrical shield 260 can be substantially coplanar with the first portion 271*a* of the first electrical shield 258 when the first and second electrical connectors 22 and 24 are mated to each other. For instance, the first portion 281*a* of the second electrical shield 260 can be coplanar with the first portion 271*a* of the first electrical shield 258. Further, when the first and second electrical connectors 22 and 24 are mated with each other, a portion less than an entirety of the lossy material 272 that is disposed on the first side 267*a* of the second substrate 266 at the first portion 281*a* of the second electrical shield 258 can be aligned along the mating direction with lossy material 64 on the first side 263*a* of the first substrate 262 at the second portion of the first electrical shield. Additionally, a portion of the lossy material 272 less than an entirety of lossy material 272 that is disposed on the second side 278*b* of the second substrate 266 at the first portion 281*a* of the second electrical shield 260 can be aligned along the mating direction with lossy material 62 that is on the second side 264*b* of the first substrate 262 at the second portion 281*b* of the first electrical shield 260. Further still, the second substrate 266 at the first portion 281*a* of the second electrical shield 260 can be coplanar with the first substrate 262 at the first portion 271*a* of the first electrical shield 258 when the first and second electrical connectors are mated to each other.

The second portions 271*b* and 281*b* of the first and second electrical shields 258 and 260 can overlap each other along the second direction at a region of overlap. Thus, a straight line that extends along the transverse direction can extend through each of the second portions 271*b* and 281*b*. In particular, a portion of the second side 263*a* of the first substrate 262 can face a portion of the first side 267*a* of the second substrate 266 at the second portion 281*b* of the second electrical shield 260 along the second direction. The first and second electrical shields 258 and 260 can be devoid of lossy material between the portion of the second side 263*b* of the first substrate 258 and the portion of the first side 267*a* of the second substrate 260. Accordingly, an air gap can extend from the portion of the second side 263*b* of the first substrate 258 to the portion of the first side 267*a* of the second substrate 260. The first electrical shield 258 can include lossy material 64 at the first side 263*a* of the first substrate 262 that is opposite the portion of the second side 263*b* of the first substrate 262 and aligned with the portion of the second side 263*b* of the first substrate 262 in the first direction. Similarly, the second electrical shield 260 can include lossy material 272 at the second side 267*b* of the second substrate 266 that is opposite the portion of the first side 267*a* of the second substrate 266 and aligned with the portion of the first side 267*a* of the second substrate 266 in the second direction.

Referring now to FIG. 27D, it is recognized that one of the first and second electrical shields 258 and 260 can be jogged as described above, and the other of the first and second shields 258 and 260 is not jogged in one example. Thus, an entirety of the other of the first and second shields 258 and 260 can be substantially planar along the longitudinal direction L and the lateral direction A. In one example, the first electrical shield 258 is jogged and the second electrical shield 260 is not jogged. Thus, a substantial entirety of the second electrical shield 260 can be substantially coplanar with the first portion 271*a* of the first electrical shield 258 when the first and second electrical connectors 22 and 24 are mated to each other. Further, the lossy material 272 disposed on the first side 267*a* of the second substrate 266 can be substantially fully aligned with the lossy material 64 that is disposed on the first side 263*a* of the first substrate 262 at the first portion 271*a* of the first electrical shield 258. Similarly, the lossy material 272 disposed on the second side 267*b* of the second substrate 266 can be substantially fully aligned with the lossy material 64 disposed on the second side 263*b* of the first electrically conductive substrate 262 at the first portion 271*a* of the first electrical shield 258.

Thus, the first and second electrical shields 258 and 260 can define a region of overlap whereby the first and second electrical shields 258 and 260 are aligned along the transverse direction T, such that a straight line oriented along the transverse direction T passes through each of the first and second electrical shields 258 and 260. In particular, the straight line can pass through the second portion 271*b* of the first electrical shield 258. In the region of overlap, a portion of the first side 263*a* of the second substrate 266 faces a portion of the second side 267*b* of the first substrate 62. The portion of the second side 267*b* is disposed at the second portion 271*b* of the first electrical shield. The first and second electrical shields 258 and 260 can be devoid of lossy material between the portion of the first side 267*a* of the second substrate 260 and the portion of the second side 263*b* of the first substrate 258. Thus, an air gap can extend from the portion of the first side 267*a* of the second substrate 260 to the portion of the second side 263*b* of the first substrate 258. The first electrical shield 258 can include lossy material 64 at the first side 263*a* of the first substrate 262 that is opposite the portion of the second side 263*b* of the first substrate 262 and aligned with the portion of the second side 263*b* of the first substrate 262 in the first direction. The second electrical shield 260 can include lossy material 272 at the second side 267*b* of the second substrate 260 that is opposite the portion of the first side 267*a* of the second substrate 260 and aligned with the portion of the first side 267*a* of the second substrate 260 in the second direction.

Figure 26A:
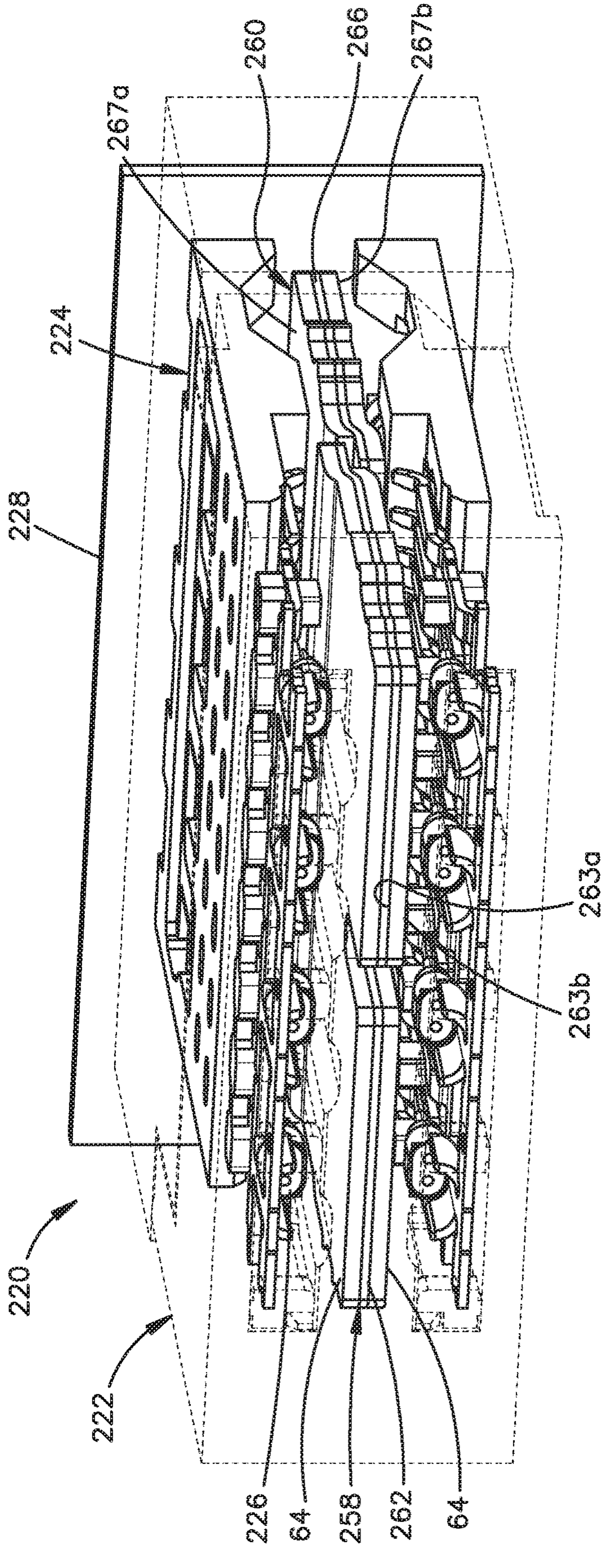
FIG. 26A is a perspective view of an electrical connector assembly similar to the electrical connector assembly illustrated in FIG. 21A, but showing the first and second electrical shields jogged in accordance with another example.
Figure 26B:
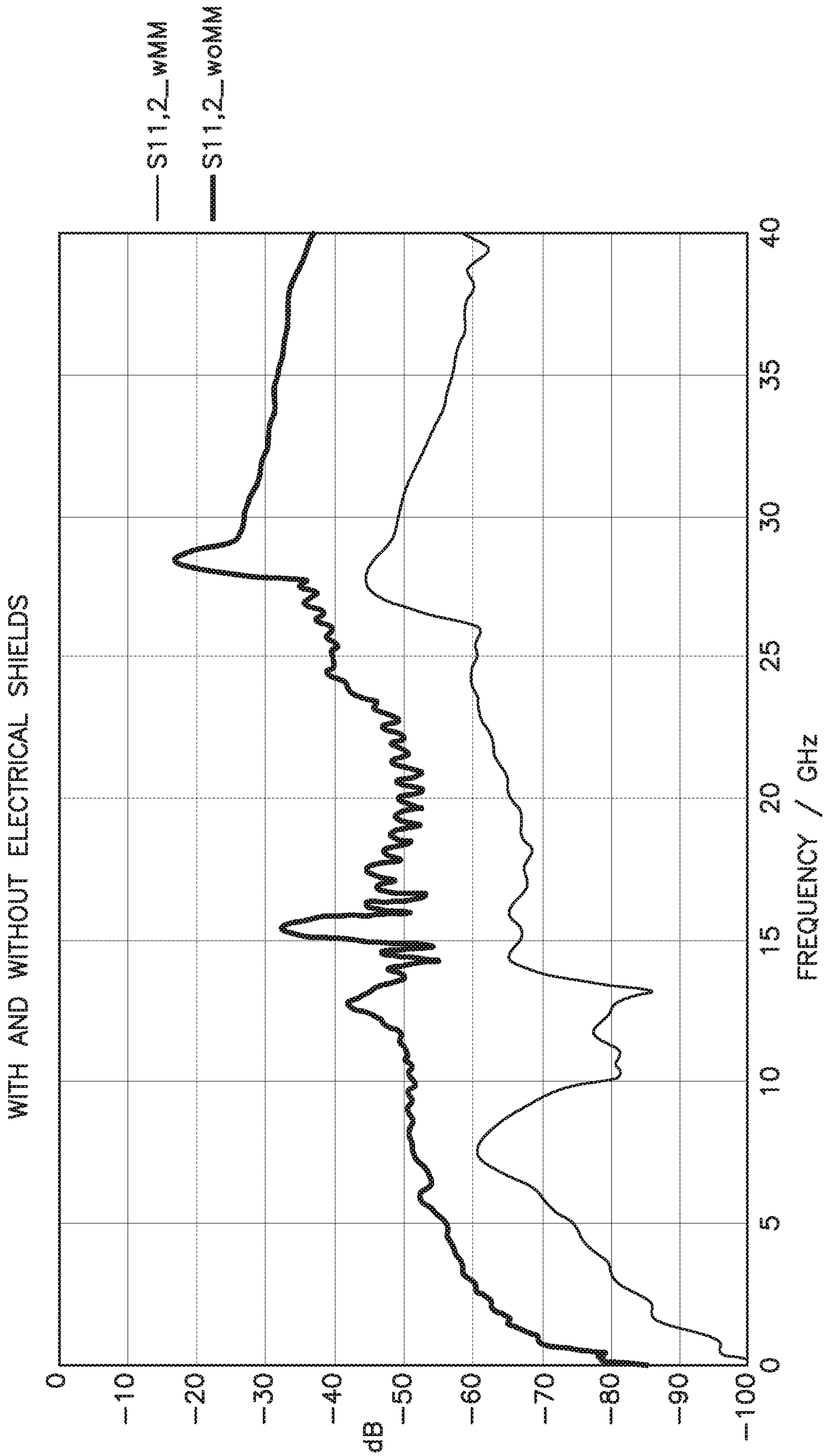
FIG. 26B is a chart that plots NEXT of the electrical connector assembly both with and without electrical shields as a function of operating frequency.

Referring now to FIG. 26B, the NEXT of the electrical connector assembly 220 illustrated in FIG. 26A is reduced with respect to an otherwise identical electrical connector assembly, but without the first and second electrical shields 258 and 260, respectively. For instance, NEXT of the electrical connector assembly 220 without the first and second electrical shields 258 and 260 reaches −60 dB (decibels) at approximately 3 GHz operating frequency. NEXT of the electrical connector assembly 220 with the first and second electrical shields 258 and 60 reaches −60 dB (decibels) at approximately 26 GHz operating frequency. Thus, the first and second electrical shields 258 and 260 can allow the operating frequency to at least double with respect to the operating frequency without the first and second electrical shields while remaining below −60 dB. For instance, the operating frequency can triple. In one example, the operating frequency can be 5 times greater with the first and second electrical shields 258 and 260 with respect to the operating frequency without the first and second electrical shields. For instance, the operating frequency can be up to approximately 8 times greater with the first and second electrical shields 258 and 260 with respect to the operating frequency without the first and second electrical shields.

Figure 26C:
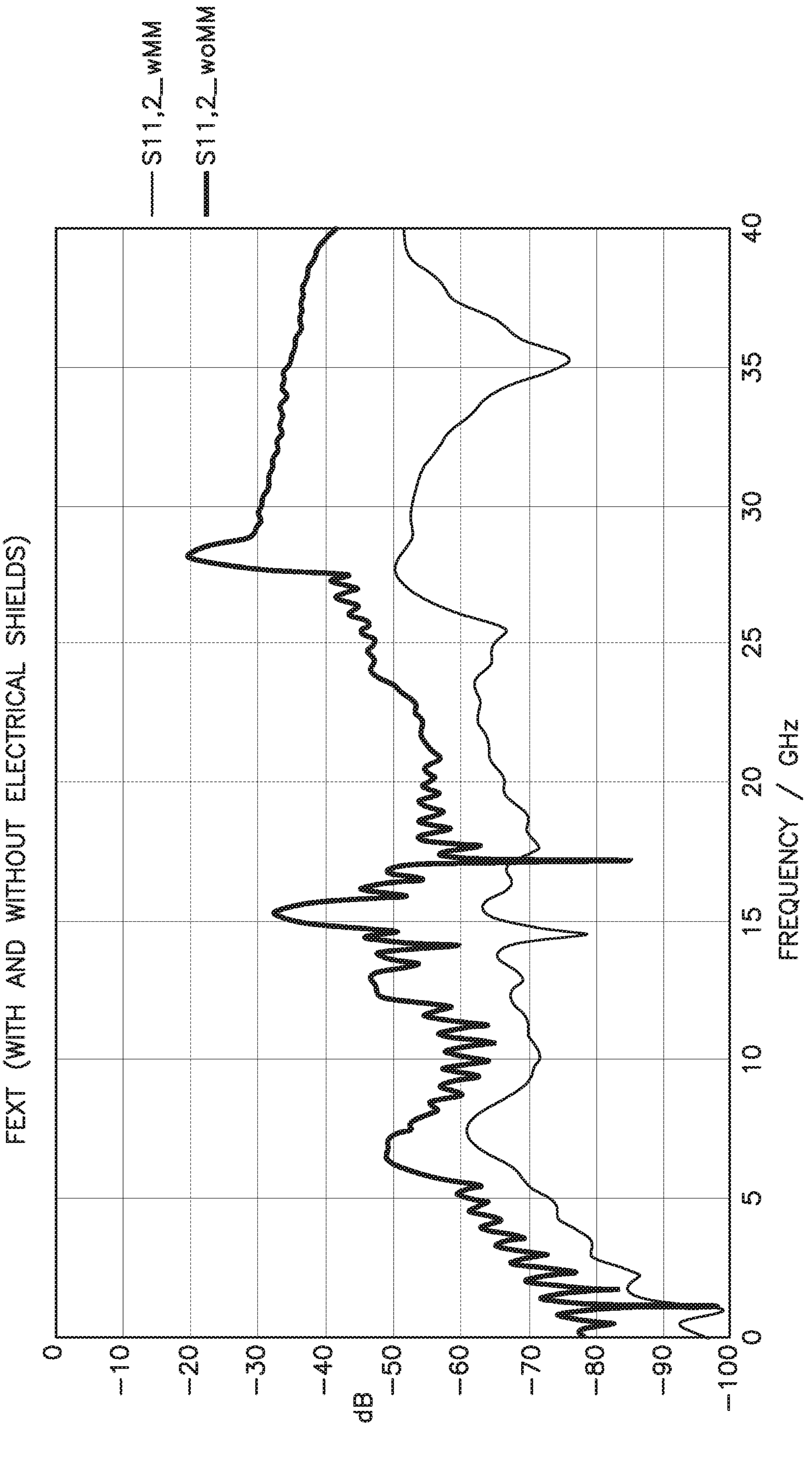
FIG. 26C is a chart that plots FEXT of the electrical connector assembly as a function of frequency both with and without electrical shields.

Referring now to FIG. 26C, the FEXT of the electrical connector assembly 220 illustrated in FIG. 26A is reduced with respect to an otherwise identical electrical connector assembly, but without the first and second electrical shields 258 and 260, respectively. For instance, FEXT of the electrical connector assembly 220 without the first and second electrical shields 258 and 260 reaches −60 dB (decibels) at approximately 5 GHz operating frequency. FEXT of the electrical connector assembly 220 with the first and second electrical shields 258 and 260 reaches −60 dB (decibels) at approximately 26 GHz operating frequency. Thus, the first and second electrical shields 258 and 260 can allow the operating frequency to at least double with respect to the operating frequency without the first and second electrical shields while remaining below −60 dB. For instance, the operating frequency can triple. In one example, the operating frequency can be approximately 5 times greater with the first and second electrical shields 258 and 260 with respect to the operating frequency without the first and second electrical shields.

Figure 27E:
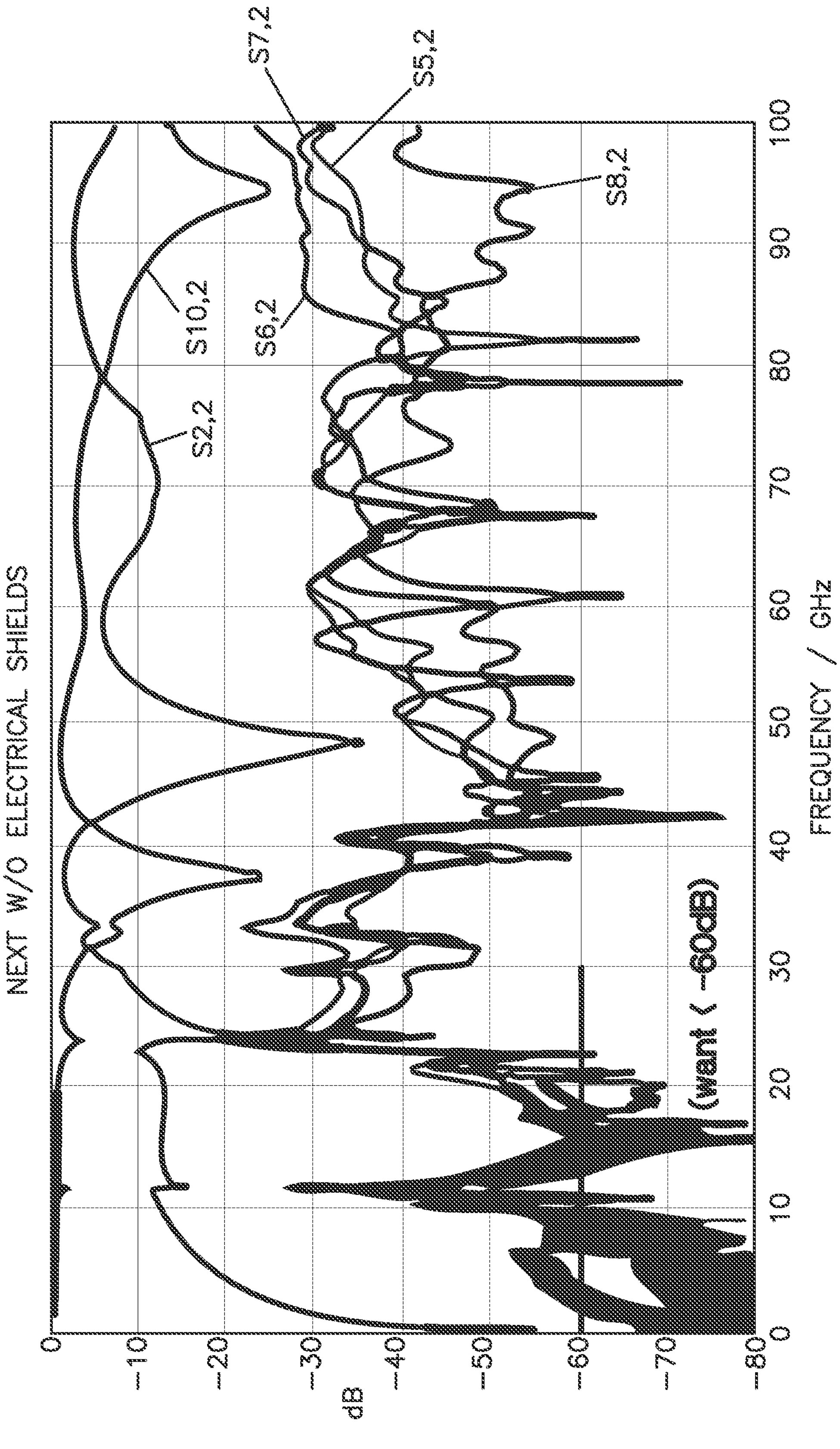
FIG. 27E is a chart that plots NEXT of the electrical connector assembly as a function of frequency without the electrical shields shown in FIGS. 27A-27C.
Figure 27F:
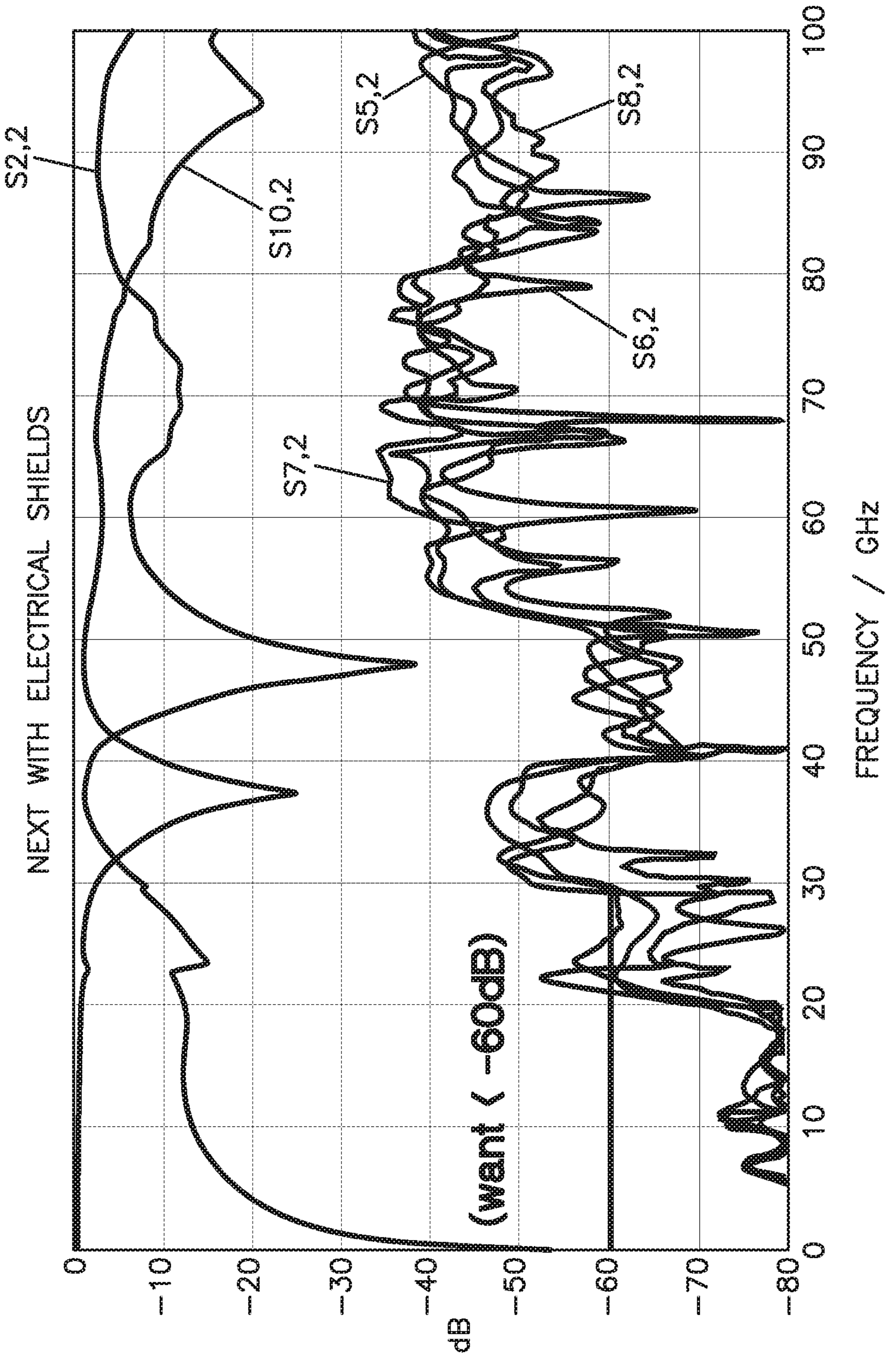
FIG. 27F is a chart that plots NEXT of the electrical connector assembly as a function of frequency with the electrical shields shown in FIGS. 27A-27C.

Referring now to FIGS. 27E-27F, the NEXT of the electrical connector assembly 220 illustrated in FIGS. 27A-27C is reduced with respect to an otherwise identical electrical connector assembly, but without the first and second electrical shields 258 and 260, respectively. For instance, NEXT of the electrical connector assembly 220 without the first and second electrical shields 258 and 260 reaches −40 dB (decibels) at approximately 11 GHz operating frequency. NEXT of the electrical connector assembly 20 with the first and second electrical shields 258 and 260 reaches −40 dB (decibels) at approximately 55 GHz operating frequency. Thus, the first and second electrical shields 258 and 260 can allow the operating frequency to at least double with respect to the operating frequency without the first and second electrical shields while remaining below −40 dB. For instance, the operating frequency can triple. In one example, the operating frequency can be approximately 5 times greater with the first and second electrical shields 258 and 260 with respect to the operating frequency without the first and second electrical shields.

Figure 27G:
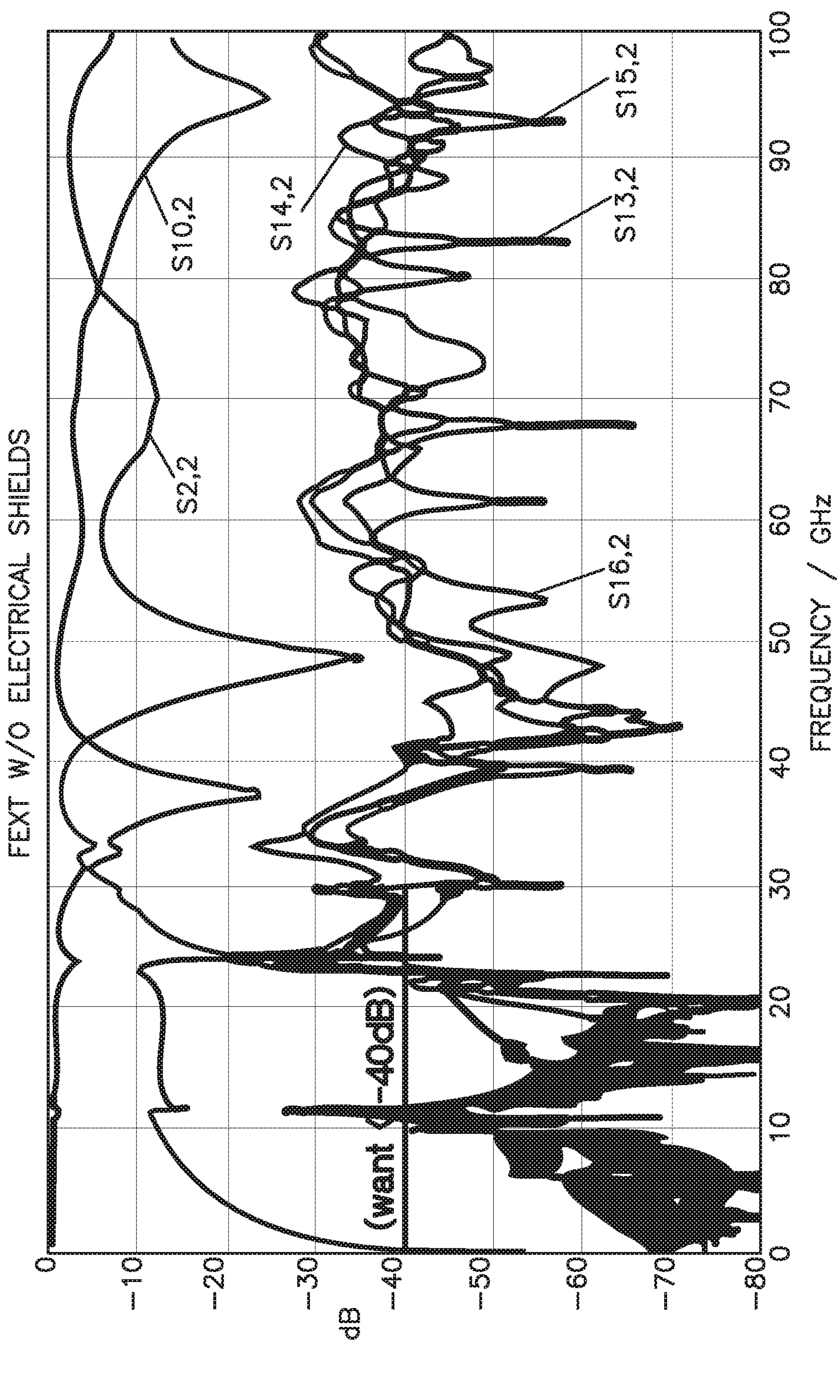
FIG. 27G is a chart that plots FEXT of an otherwise identical electrical connector assembly as a function of frequency without the electrical shields shown in FIGS. 27A-27C.
Figure 27H:
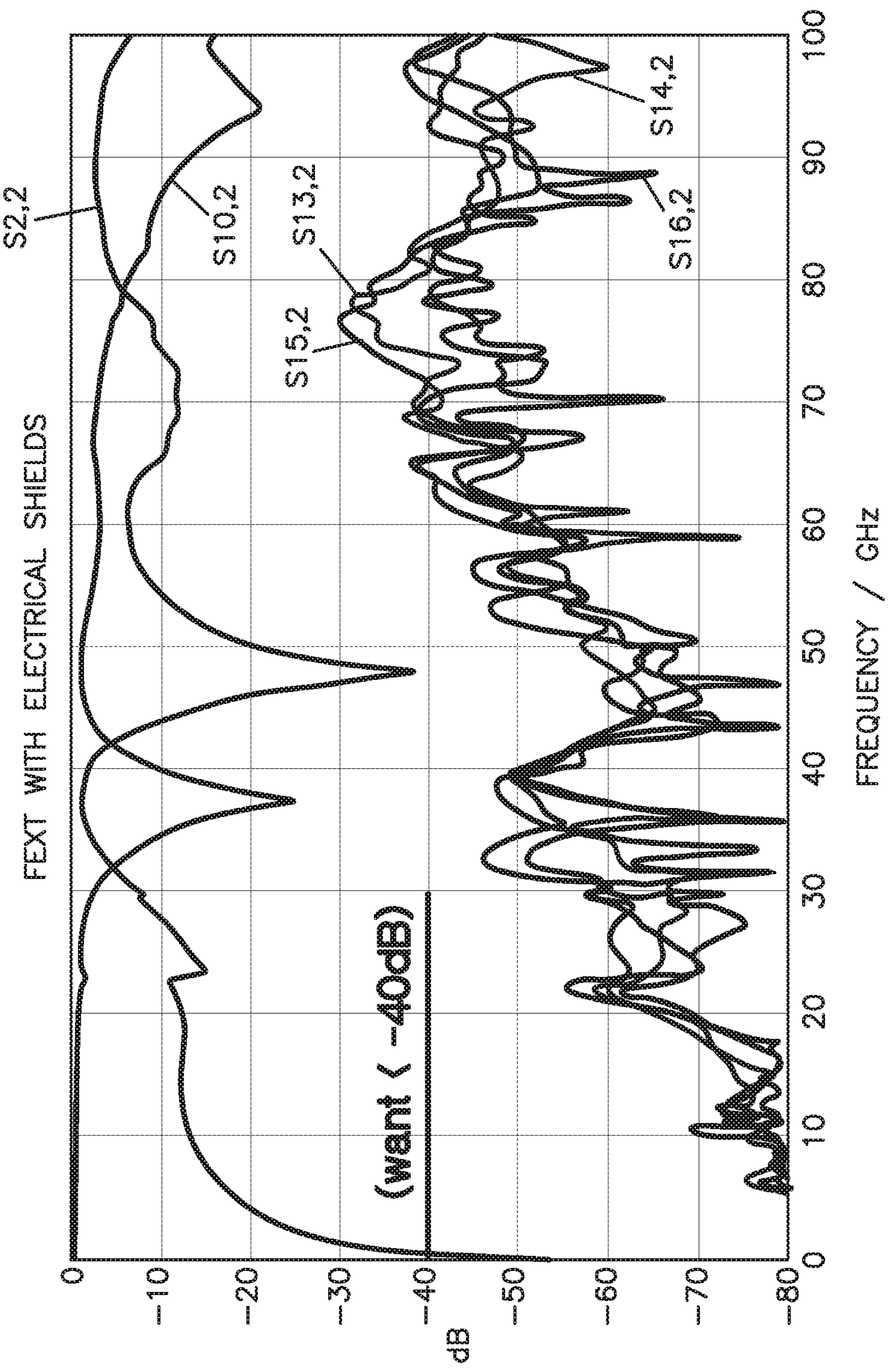
FIG. 27H is a chart that plots FEXT of the electrical connector assembly as a function of frequency with the electrical shields shown in FIGS. 27A-27C.

Referring now to FIGS. 27G-27H, the FEXT of the electrical connector assembly 220 illustrated in FIGS. 27A-27C is reduced with respect to an otherwise identical electrical connector assembly, but without the first and second electrical shields 258 and 260, respectively. For instance, FEXT of the electrical connector assembly 220 without the first and second electrical shields 58 and 60 reaches −40 dB (decibels) at approximately 11 GHz operating frequency. FEXT of the electrical connector assembly 220 with the first and second electrical shields 258 and 260 reaches −40 dB (decibels) at approximately 65 GHz operating frequency. Thus, the first and second electrical shields 258 and 260 can allow the operating frequency to at least double with respect to the operating frequency without the first and second electrical shields while remaining below −40 dB. For instance, the operating frequency can triple. In one example, the operating frequency can be approximately 5 times greater with the first and second electrical shields 258 and 260 with respect to the operating frequency without the first and second electrical shields.

Figure 28:
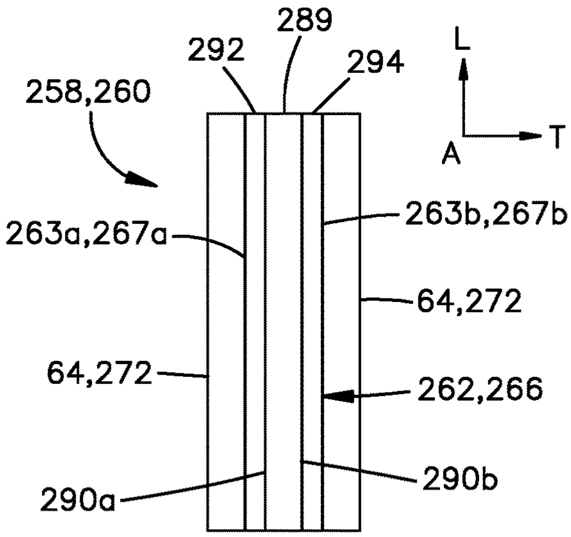
FIG. 28 is a schematic view of an electrical shield constructed in accordance with another example.

Referring now to FIG. 28, and as described above, either or both of the first and second electrical shields 258 and 260 can be constructed in accordance with any suitable alternative embodiment. For instance, while either or both of the first and second electrically conductive substrates 262 and 266 can comprise metallic plates that are homogenous and unitary in one example, the first and second substrates 262 and 266 can be alternatively constructed. For instance, either or both of the first and second substrates 262 and 266 can be configured as a hybrid structure that includes layers of different materials.

For instance, either or both of the first and second substrates 262 and 266 can include a respective electrically nonconductive layer 289 that defines a first outer side 290*a* and a second outer side 290*b* opposite the first outer side 290*a*. The first and second outer sides 290*a* and 290*b* can be opposite each other along the transverse direction T as described above. Either or both of the first and second substrates 262 and 266 can further include a first electrically conductive layer 292 disposed on the first outer side 290*a*, and a second electrically conductive layer 294 disposed on the second outer side 290*b*. The first and second electrically conductive layers 292 and 294 can define respective inner sides that face the electrically nonconductive layer 289, and outer sides opposite the inner sides. The outer sides of the electrically conductive layers 292 and 294 can define respective outer sides of the one or both of the first and second substrates 262 and 266. The electrical shield 258 or 260 can further include a lossy material 64 or 272 that is disposed on each of the outer sides of the first and second electrically conductive layers 292 and 294.

The electrically nonconductive layer 289 can be configured as any suitable electrical insulator. For instance, the electrically nonconductive layer 289 can be configured as a plastic. In one example, the electrically nonconductive layer 289 can be an epoxy. In another example, the electrically nonconductive layer can be configured as glass. Thus, it is appreciated that the electrically nonconductive layer 289 can be made of any suitable electrically nonconductive material as desired. The electrically conductive layers 292 and 294 can be configured as any suitable electrically conductive material. For instance, the electrically conductive layers 292 and 294 can be configured as electrically conductive ink. The electrically conductive ink can be printed onto the outer sides of the electrically nonconductive layer 289. In one example, the electrically conductive ink can be a silver ink. However, the electrically conductive ink can be made from any suitable alternative material as desired.

As described above, the resulting electrical shield can be configured to absorb an electromagnetic interference frequency within +/−5 GHz. Further, the interference frequency that is absorbed can be tuned in any manner described above. In this regard, the lossy material 64 or 272 can be constructed in accordance with any example described herein.

Figure 29A:
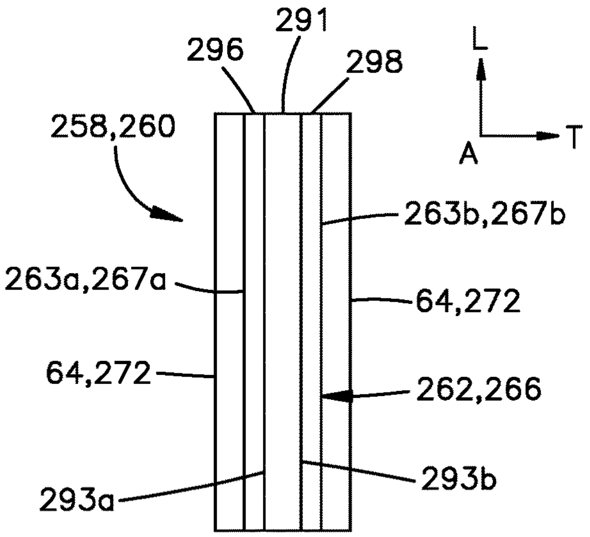
FIG. 29A is a schematic view of an electrical shield constructed in accordance with yet another example.

Referring now to FIG. 29A, either or both of the first and second electrical shields 258 and 260 can be constructed in accordance with still another alternative embodiment. For instance, either or both of the first and second substrates 262 and 266 can be configured as a hybrid structure that includes layers of different materials. In particular, either or both of the first and second substrates 262 and 266 can include a respective inner electrically conductive layer 291 that defines a first outer side 293*a* and a second outer side 293*b* opposite the first outer side 293*a*. The first and second outer sides 293*a* and 293*b* can be opposite each other along the transverse direction T as described above. Either or both of the first and second substrates 262 and 266 can further include a first electrically conductive layer 296 disposed on the first outer side 293*a*, and a second electrically conductive layer 298 disposed on the second outer side 293*b*. The first and second electrically conductive layers 292 and 294 can define respective inner sides that face the electrically nonconductive layer 289, and outer sides opposite the inner sides. Thus, the electrically conductive layer 291 can be disposed between the first and second electrically conductive layers 292 and 294. The outer sides of the electrically conductive layers 292 and 294 can define respective first outer sides 263*a* or 267*a*, respectively, and second outer sides 263*b* or 267*b*, respectively, of the first or second substrates 262 and 266. The electrical shield 258 or 260 can further include a lossy material 64 or 272 that is disposed on each of the outer sides of the first and second electrically conductive layers 292 and 294. The lossy material 64 or 272 can be constructed in accordance with any example described herein.

The electrically conductive layer 291 can be configured as any suitable electrically conductive material, such as an electrically conductive adhesive in some examples. In one example, the electrically conductive adhesive can be pressure-sensitive adhesive (PSA). Thus, the electrically conductive layer s 292 and 294 can be pressure bonded to the electrically conductive layer 291. The electrically conductive layers 292 and 294 can be configured as any suitable electrically conductive material. For instance, each of the electrically conductive layers 292 and 294 can be configured as electrically conductive coating, which can be any electrically conductive metal such as a silver, or any suitable electrically conductive material. The electrically conductive coatings. The electrically conductive coatings can extend along respective inner sides of the lossy material 64 or 272.

The inner electrically conductive layer 291 can be thicker along the transverse direction T than each of the electrically conductive layers 292 and 294. Further, each of the first and second layers of lossy material 64 or 272 can be thicker than each of the electrically conductive layers 292 and 294 along the transverse direction T. In one example, the inner electrically conductive layer 291 can have a thickness in a range from approximately 10 micrometers to approximately 50 micrometers. For instance, the thickness of the inner electrically conductive layer 291 can be approximately 30 micrometers. Each of the first and second electrically conductive layers 292 and 294 can have a thickness along the transverse direction T that is in a range from approximately 1 micrometer to approximately 5 micrometers. For instance, the thickness of each of the first and second electrically conductive layers can be approximately 2 micrometers. Each of the first and second layers of lossy material 62 or 272 can have a thickness along the transverse direction T that is in a range from approximately 100 micrometers to approximately 400 micrometers. For instance, the thickness of each of the first and second layers 62 or 272 of lossy material can be approximately 250 micrometers. It should be appreciated that these thicknesses are described by way of example, and that other thicknesses are envisioned.

As described above, the resulting electrical shield 258 or 260 can be configured to absorb an electromagnetic interference frequency within +/−5 GHz. Further, the interference frequency that is absorbed can be tuned in any manner described above.

The electrical shield 258 or 260 can be fabricated in accordance with any suitable method as desired. In one example, referring to FIGS. 29B-29G, the method can begin by providing a layer of lossy material 64 or 272 at FIG. 29B. Next, at FIG. 29C, the layer of lossy material 64 or 272 can be cut and separated into first and second layers of lossy material 64 or 272. Next at FIG. 29D, the first and second electrically conductive layers 296 and 298 can be applied to, for instance coated onto, the respective inner sides of the first and second layers of lossy material 64 or 272. Next, at FIG. 29E, the material of the inner electrically conductive layer 291 can be applied, for instance sprayed, to one or both of the inner sides of the first and second electrically conductive layers 296 and 298. Next, at FIG. 29F, the first and second electrically conductive layers 296 and 298 can then be brought toward each other, with the inner electrically conductive layer 291 therebetween. Because the inner electrically conductive layer 291 can be a pressure-sensitive adhesive, the first and second electrically conductive layers 296 and 298 can be pressure-bonded to each other. Finally, at FIG. 29G, the resulting structure can be cut as desired to produce the final electrically conductive shields 258 or 260 having desired dimensions along the lateral and longitudinal directions.

Figure 29B:
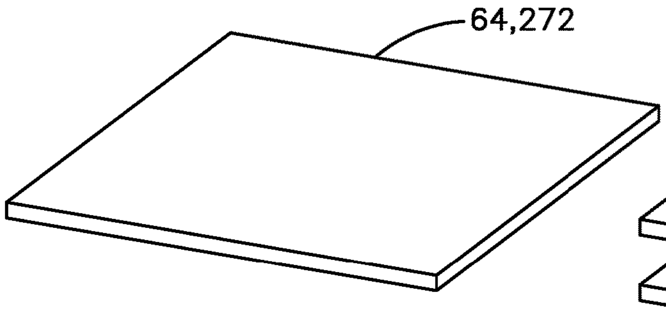
FIG. 29B illustrates a first step of fabricating the electrical shield illustrated in FIG. 29A.
Figure 29C:
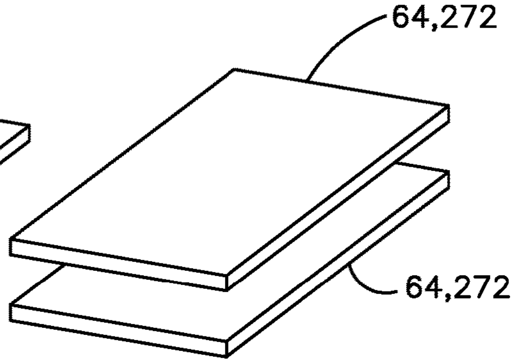
FIG. 29C illustrates a second step of fabricating the electrical shield illustrated in FIG. 29A.
Figure 29D:
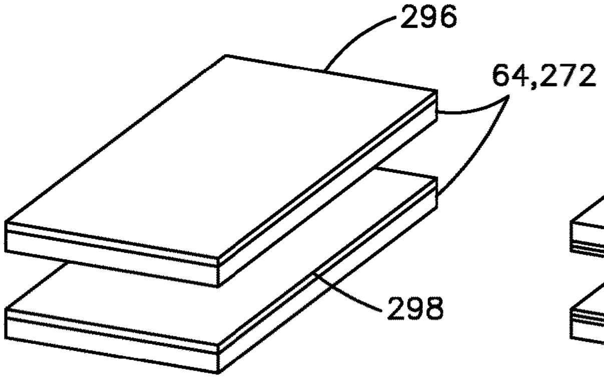
FIG. 29D illustrates a third step of fabricating the electrical shield illustrated in FIG. 29A.
Figure 29E:
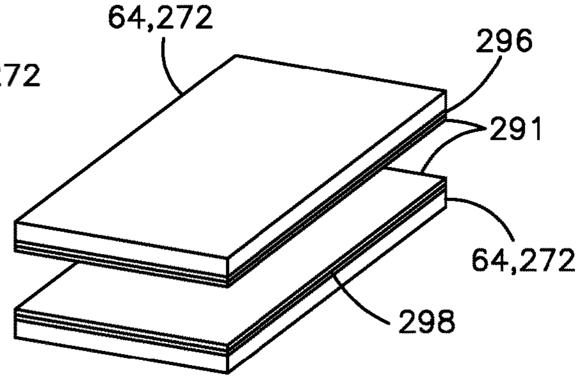
FIG. 29E illustrates a fourth step of fabricating the electrical shield illustrated in FIG. 29A.
Figure 29F:
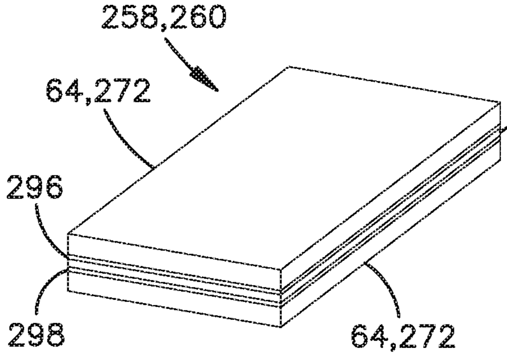
FIG. 29F illustrates a fifth step of fabricating the electrical shield illustrated in FIG. 29A.
Figure 29G:
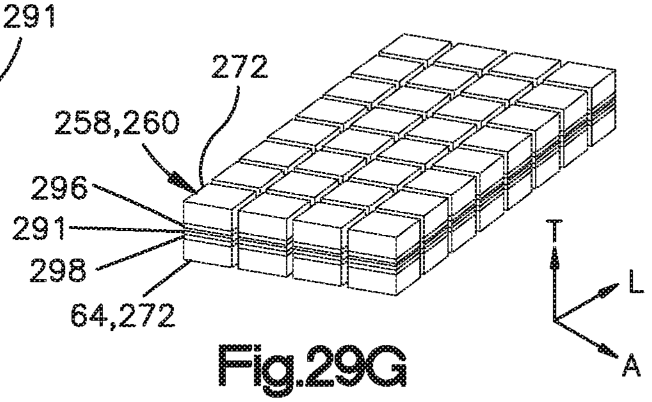
FIG. 29G illustrates a final step of fabricating the electrical shield illustrated in FIG. 29A.
Figure 30A:
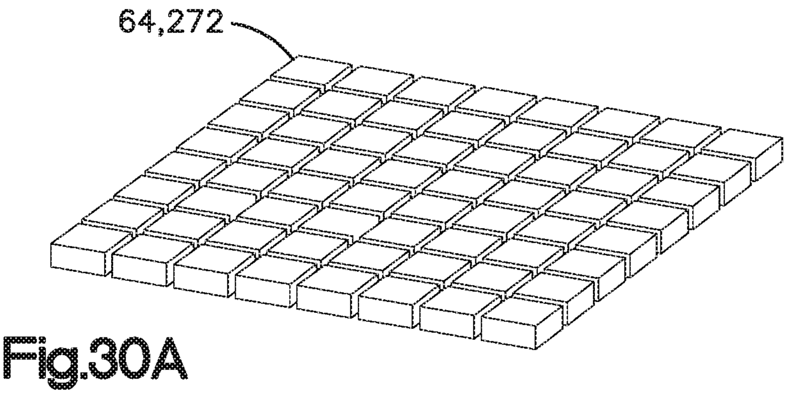
FIG. 30A illustrates a step of a second method for fabricating the electrical shield illustrated in FIG. 29A.
Figure 30B:
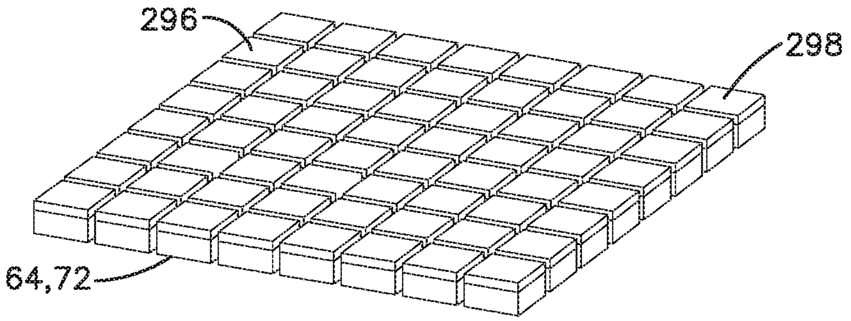
FIG. 30B illustrates another step of the second method for fabricating the electrical shield subsequent to the step illustrated in FIG. 30A.
Figure 30C:
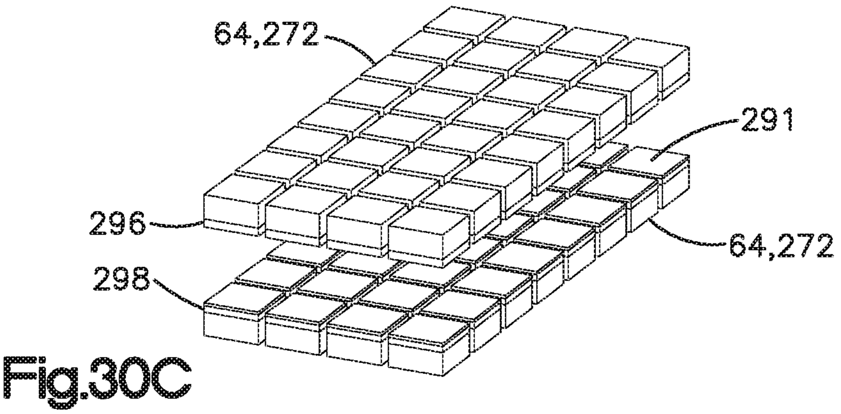
FIG. 30C illustrates another step of the second method for fabricating the electrical shield subsequent to the step illustrated in FIG. 30B.

Alternatively, as illustrated in FIGS. 29B and 30A, the layer of lossy material 64 or 272 can be cut as desired to produce the desired final dimensions of the resulting electrical shields 258 or 260 along the lateral and longitudinal directions. Next, at FIG. 30B, the electrically conductive material that defines first and second electrically conductive layers 296 and 298 can be applied to, for instance coated onto, the inner side of the lossy material 64 or 272. Next, at FIG. 30C, the material of the inner electrically conductive layer 291 can be applied, for instance sprayed, onto the inner side of at least one of the first and second electrically conductive layers 296 and 298. The first and second electrically conductive layers can then be bonded to each other in the manner described above with respect to FIG. 29G.

It should be appreciated that either of the methods described with respect to FIGS. 20B-29G and 30A-3C can also be used to fabricate the electrical shields 258 or 260 shown at FIG. 28, whereby the inner electrically conductive layer 291 would be replaced by the electrically nonconductive layer 289, which can be an epoxy as described above. Further, the first and second electrically conductive layers 292 and 294 replace the first and second electrically conductive layers 296 and 298, respectively. The epoxy can be applied to the first and second electrically conductive layers 292 and 294 using any known suitable technique. Alternatively, the first and second electrically conductive layers 292 and 294 can be applied to glass in any suitable manner, when the inner electrically conductive layer 289 defines a glass.

Referring now to FIGS. 31A-31D, either or both of the electrical shields 258 or 260 can be fabricated without lossy material. In particular, and as described above with respect to FIG. 28, the electrical shields 258 or 260 can include a respective substrate 262 or 266 that includes the inner electrical insulator, or electrically nonconductive layer 289 described above, and the first electrically conductive layer 292 described above disposed on the first outer side of the electrically nonconductive layer 289, and the second electrically conductive layer 294 described above disposed on the second outer side of the electrically nonconductive layer 289. The first and second sides of the electrical insulator 289 can be planar and parallel to each other. As described above, the inner electrically nonconductive layer 289 and the first and second electrically conductive layers 292 and 294 can combine to define the respective substrate 262 or 266. However, instead of including a lossy material, either or both of the first and second electrically conductive layers 292 and 294 can be patterned on the inner electrically nonconductive layer 289 so as to define the electrical shield 258 or 260. In this regard, the respective outer sides of the first and second electrically conductive layers 292 and 294 can define the outer surfaces of the respective shield 258 or 260. Accordingly, in the electrical connectors 22 and 24 described above, the respective substrate can be replaced with the electrically nonconductive layer 289, and the first and second lossy material can be replaced by the first and second patterned electrically conductive layers 292 and 294, respectively.

The first and second electrically conductive layers 292 and 294 can be patterned as desired. For instance, the first and second electrically conductive layers 292 and 294 can coat the opposed surfaces of the electrically nonconductive layer 289, and then can be patterned using a masking and etching process. Alternatively, the first and second electrically conductive layers 292 and 294 can be patterned onto the respective outer surfaces of the electrically nonconductive layer 289. The pattern of the first and second electrically conductive layers 292 and 294 can be tuned to determine the frequency of electromagnetic interference which the electrical shield 258 and 260 is configured to shield, +/−5 GHz as described above. In this regard, the first electrically conductive layer 292 can be patterned so as to define a first frequency at which the electrical shield is configured to shield the electromagnetic interference at the first side of the electrical shield. The second electrically conductive layer 292 can be patterned so as to define a second frequency at which the electrical shield is configured to shield the electromagnetic interference at the second side of the electrical shield. In some examples, the first and second electrically conductive layers 292 and 294 are identically patterned so as to define a common pattern, such that the first frequency is substantially equal to the second frequency. Alternatively, the first electrically conductive layer 292 can define a different pattern than the second electrically conductive layer 294, such that the first and second sides of the electrical shield are configured to shield electromagnetic interference substantially at first and second different frequencies, within.

Figure 31A:
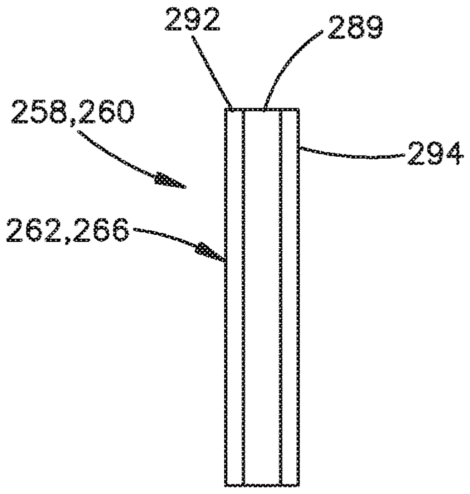
FIG. 31A is a schematic view of an electrical shield constructed in accordance with still another example, whereby an electrically conductive layer is patterned onto an electrically insulative layer.
Figure 31B:
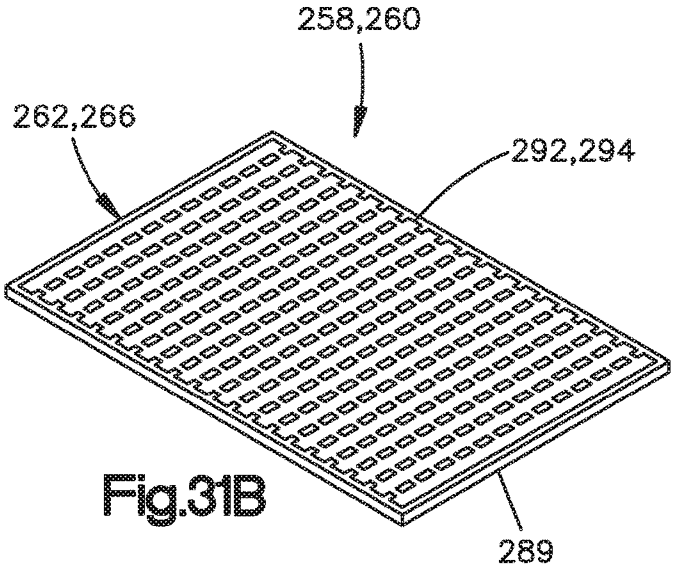
FIG. 31B is a schematic perspective view of the electrical shield illustrated in FIG. 31A, wherein the electrically conductive layer defines a first pattern.

As illustrated in FIG. 31B, the pattern defined by either or both of the first and second electrically conductive layers 292 and 294 can be a grid with a plurality of interconnected links. The grid can define a plurality of openings that extend through the respective electrically conductive layer along the transverse direction. The openings can be the same size and shape along an entirety of the respective first and second electrically conductive layer. Further, the openings can have a first dimension and a second dimension, wherein the first dimension is greater than the second dimension. The first and second dimensions can be oriented perpendicular to each other. The first dimension can oriented along the longitudinal direction and the second dimension can be oriented along the lateral direction. Alternatively, the second dimension can oriented along the longitudinal direction and the first dimension can be oriented along the lateral direction. Alternatively still, each of the first and second dimensions can be angled with respect to each of the lateral direction and the longitudinal direction. Alternatively still, the openings defined by the respective electrically conductive layer can have different sizes and/or shapes along the respective side of the inner electrically insulative layer 289. While the openings can define the same size and shape in one example, it should be appreciated that the openings can alternatively have different sizes and/or shapes as desired. It is recognized that the sizes and shapes of the openings can determine the frequency at which the electrical shield is configured to shield electromagnetic interference between electrical contacts of an electrical connector.

Figure 31C:
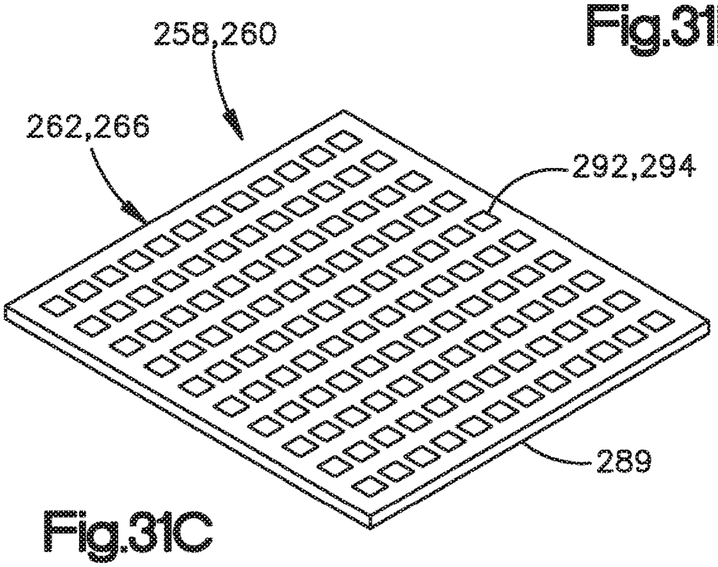
FIG. 31C is a schematic perspective view of the electrical shield illustrated in FIG. 31A, wherein the electrically conductive layer defines a second pattern.

Referring now to FIG. 31C, in another example, the pattern can be defined by a plurality of geometric shapes disposed on the electrical insulator. The geometric shapes can define the same size and shape. Alternatively, the geometric shapes can be different along the side of the electrically insulative layer 289. At least some up to all of the geometric shapes can be spaced from all other geometric shapes on the respective side of the electrically insulative layer 289. The shapes can be squares, rectangles, triangles, other polygons, or any regular geometric shapes. Alternatively, the shapes can define irregular geometric shapes. Further, the geometric shapes can be spaced from each other at the same distances or at varying distances across the side of the electrically insulative layer 289.

Figure 31D:
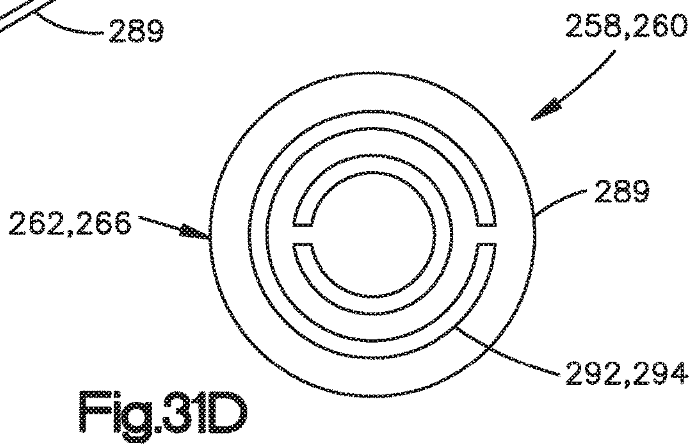
FIG. 31D is a schematic perspective view of the electrical shield illustrated in FIG. 31A, wherein the electrically conductive layer defines a third pattern.

Alternatively still, referring to FIG. 31D, the pattern can be configured such that the electrically conductive layer defines a plurality of rings. The rings can be concentric with each other, or non-concentric. In some examples, the rings can be discontinuous so as to define ring segments that are spaced from each other. The ring segments can be spaced from each other radially and/or circumferentially. Radially spaced rings can be spaced from each other in their respective entireties in one example. Alternatively, the electrically conductive layer can join two or more radially spaced rings to each other. It should be appreciated that the patterns illustrated in FIGS. 31B-D are presented by way of example only, and that other patterns are envisioned. It is further appreciated that the shielding frequency of the resulting electrical shield can be tuned based on the pattern of the electrically conductive layer, which can be a metallic layer as described above.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. An electrical connector comprising:

an electrically insulative connector housing;

a plurality of electrical contacts supported by the connector housing; and an electrical shield that is configured to absorb electromagnetic interference, wherein the electrical shield is jogged so as to define a first portion and a second portion that is offset with respect to the first portion in a first direction perpendicular to a direction of elongation of the electrical shield, and the second portion is spaced from the first portion in a mating direction along which the electrical connector is configured to mate with a complementary electrical connector.

2. The electrical connector of claim 1, wherein the electrical shield comprises an ungrounded electrically conductive substrate supported by the connector housing, wherein the electrical shield further comprises an EMI absorber disposed on at least one side of the substrate.

3. The electrical connector of claim 2, wherein the electrical contacts are arranged along a plurality of rows, and the electrical shield is disposed between adjacent ones of the rows.

4. The electrical connector of claim 2, wherein the lossy material comprises carbon microcoils.

5. The electrical connector of claim 2, wherein the substrate comprises a plate.

6. The electrical connector of claim 2, wherein the substrate is nonwoven.

7. The electrical connector of claim 2, wherein the substrate is woven.

8. The electrical connector of claim 2, wherein the electrically conductive substrate is not in mechanical contact with any grounded metallic structures.

9. The electrical connector of claim 1, wherein the electrical shield comprises an electrical insulator defining a first side and a second side opposite the first side, and a first patterned metallic layer on the first side, wherein the first patterned metallic layer is tuned to shield electromagnetic interference at a first frequency within +/−5 GHz.

10. The electrical connector of claim 9, wherein the electrical shield further comprises a second patterned metallic layer on the second side, wherein the second patterned metallic layer is tuned to shield electromagnetic interference at a second frequency+/−5 GHz.

11. The electrical connector of claim 10, wherein the second frequency is equal to the first frequency.

12. The electrical connector of claim 10, wherein the first and second patterned metallic layers define a common pattern.

13. The electrical connector of claim 10, wherein the second frequency is different than the first frequency.

14. The electrical connector of claim 13, wherein the first and second patterned metallic layers define different patterns.

15. The electrical connector of claim 9, wherein the electrical insulator comprises epoxy.

16. The electrical connector of claim 9, wherein the electrical insulator comprises glass.

17. The electrical connector of claim 9, wherein the metallic layer comprises an electrically conductive ink or silver.

18. The electrical connector of claim 9, wherein the first patterned metallic layer comprises an interconnected grid.

19. The electrical connector of claim 9, wherein the first patterned metallic layer comprises a plurality of geometric shapes disposed on the electrical insulator.

20. The electrical connector of claim 9, wherein the first patterned metallic layer comprises concentric rings.

21. The electrical connector of claim 9, wherein the first frequency is tunable by changing one of a shape of a pattern of the patterned metallic layer and a size of the patterned metallic layer.

22. The electrical connector of claim 1, wherein the electrical shield comprises first and second electrically conductive layers, an adhesive disposed between the first and second electrically conductive layers, and lossy material disposed on respective outer sides of the first and second electrically conductive layers.

23. An electrical shield for an electrical connector, the electrical shield comprising:

a substrate including 1) an electrically nonconductive layer having first and second outer sides, and 2) first and second electrically conductive layers disposed on the first and second sides, respectively, of the electrically nonconductive layer, wherein the electrical shield is jogged so as to define a first portion and a second portion that is offset with respect to the first portion in a first direction perpendicular to a direction of elongation of the electrical shield, and wherein the electrical shield is configured to absorb a tunable electromagnetic interference frequency within +/−5 GHz.

24. The electrical shield of claim 23, wherein the electrically nonconductive layer comprises a plastic, an epoxy, glass, or an electrically conductive ink.

25. The electrical shield of claim 23, further comprising a lossy material disposed on respective outer sides of the electrically conductive layers, wherein the outer sides are opposite respective inner sides that face the electrically nonconductive layer.

26. The electrical shield of claim 25, wherein the lossy material includes a polymer and a plurality of particles embedded in the polymer.

27. The electrical shield of claim 26, wherein the particles comprise iron.

28. The electrical shield of claim 27, further comprising graphene particles embedded in the polymer.

29. The electrical shield of claim 23, wherein the first and second electrically conductive layers are ungrounded in the electrical connector.

30. The electrical shield of claim 23, wherein, the first electrically conductive layer is a patterned metallic layer on the first side, and wherein the patterned metallic layer is tuned such that the electrical shield is configured to shield electromagnetic interference at a tunable frequency within +/−5 GHz.

* * * * *